United States Patent
Bachrach et al.

(10) Patent No.: US 11,749,124 B2
(45) Date of Patent: Sep. 5, 2023

(54) USER INTERACTION WITH AN AUTONOMOUS UNMANNED AERIAL VEHICLE

(71) Applicant: Skydio, Inc., Redwood City, CA (US)

(72) Inventors: Abraham Galton Bachrach, Redwood Ctiy, CA (US); Adam Parker Bry, Redwood City, CA (US); Matthew Joseph Donahoe, Redwood City, CA (US); Hayk Martirosyan, San Francisco, CA (US)

(73) Assignee: Skydio, Inc., San Mateo, CA (US)

( * ) Notice: Subject to any disclaimer, the term of this patent is extended or adjusted under 35 U.S.C. 154(b) by 698 days.

(21) Appl. No.: 16/439,448

(22) Filed: Jun. 12, 2019

(65) Prior Publication Data

US 2019/0378423 A1  Dec. 12, 2019

Related U.S. Application Data

(60) Provisional application No. 62/683,971, filed on Jun. 12, 2018.

(51) Int. Cl.

| | |
|---|---|
| *G08G 5/00* | (2006.01) |
| *G06T 19/00* | (2011.01) |
| *G06T 7/70* | (2017.01) |
| *G05D 1/10* | (2006.01) |
| *B64C 39/02* | (2023.01) |
| *G05D 1/00* | (2006.01) |

(Continued)

(52) U.S. Cl.
CPC ......... *G08G 5/0069* (2013.01); *B64C 39/024* (2013.01); *G05D 1/0088* (2013.01); *G05D 1/106* (2019.05); *G06T 7/70* (2017.01); *G06T 19/003* (2013.01); *G06T 19/006* (2013.01); *G08G 5/0039* (2013.01); *H04L 67/131* (2022.05); *B64U 2101/30* (2023.01); *B64U 2201/10* (2023.01); *G06T 2207/10032* (2013.01); *G06T 2219/024* (2013.01)

(58) Field of Classification Search
CPC ...... G08G 5/0069; G08G 5/0039; G06T 7/70; G06T 19/003; G06T 19/006; G06T 2207/10032; G06T 2219/024; G05D 1/106; G05D 1/0088; B64C 39/024; B64C 2201/123; B64C 2201/141; H04L 67/38
USPC .......................................................... 701/3
See application file for complete search history.

(56) References Cited

U.S. PATENT DOCUMENTS

2016/0217615 A1* 7/2016 Kraver ................... G09G 5/003
2016/0349835 A1* 12/2016 Shapira ................... G06F 3/016
(Continued)

*Primary Examiner* — Mahmoud S Ismail

(57) ABSTRACT

A technique for user interaction with an autonomous unmanned aerial vehicle (UAV) is described. In an example embodiment, perception inputs from one or more sensor devices are processed to build a shared virtual environment that is representative of a physical environment. The sensor devices used to generate perception inputs can include image capture devices onboard an autonomous aerial vehicle that is in flight through the physical environment. The shared virtual environment can provide a continually updated representation of the physical environment which is accessible to multiple network-connected devices, including multiple UAVs and multiple mobile computing devices. The shared virtual environment can be used, for example, to display visual augmentations at network-connected user devices and guide autonomous navigation by the UAV.

39 Claims, 27 Drawing Sheets

(51) Int. Cl.
*H04L 67/131* (2022.01)
*B64U 101/30* (2023.01)

(56) References Cited

U.S. PATENT DOCUMENTS

| | | | | |
|---|---|---|---|---|
| 2017/0256096 A1* | 9/2017 | Faaborg | ................ | G06T 19/003 |
| 2019/0220002 A1* | 7/2019 | Huang | .................... | G06F 1/163 |
| 2019/0251752 A1* | 8/2019 | Rodriguez, II | ....... | G06T 19/006 |
| 2019/0302761 A1* | 10/2019 | Huang | ................ | G05D 1/0221 |
| 2021/0058397 A1* | 2/2021 | Shuster | ................ | G06F 3/0487 |
| 2021/0074068 A1* | 3/2021 | Spivack | ............ | G06F 16/90332 |
| 2021/0084045 A1* | 3/2021 | Spivack | .................. | A63F 13/69 |
| 2021/0120054 A1* | 4/2021 | Andon | .................... | G06T 19/20 |

* cited by examiner

USER INTERACTION WITH AN AUTONOMOUS UNMANNED AERIAL VEHICLE

CROSS-REFERENCE TO RELATED APPLICATION(S)

This application is entitled to the benefit and/or right of priority of U.S. Provisional Application No. 62/683,971, titled, "USER INTERACTION WITH AN AUTONOMOUS UNMANNED AERIAL VEHICLE," filed Jun. 12, 2018, the contents of which are hereby incorporated by reference in their entirety for all purposes. This application is therefore entitled to a priority date of Jun. 12, 2018.

TECHNICAL FIELD

The present disclosure relates to autonomous aerial vehicle technology.

BACKGROUND

Vehicles can be configured to autonomously navigate a physical environment. For example, an autonomous vehicle with various onboard sensors can be configured to generate perception inputs based on the surrounding physical environment that are then used to estimate a position and/or orientation of the autonomous vehicle within the physical environment. In some cases, the perception inputs may include images of the surrounding physical environment captured by cameras on board the vehicle. An autonomous navigation system can then utilize these position and/or orientation estimates to guide the autonomous vehicle through the physical environment.

DETAILED DESCRIPTION

Example Aerial Vehicle

Figure 1A:
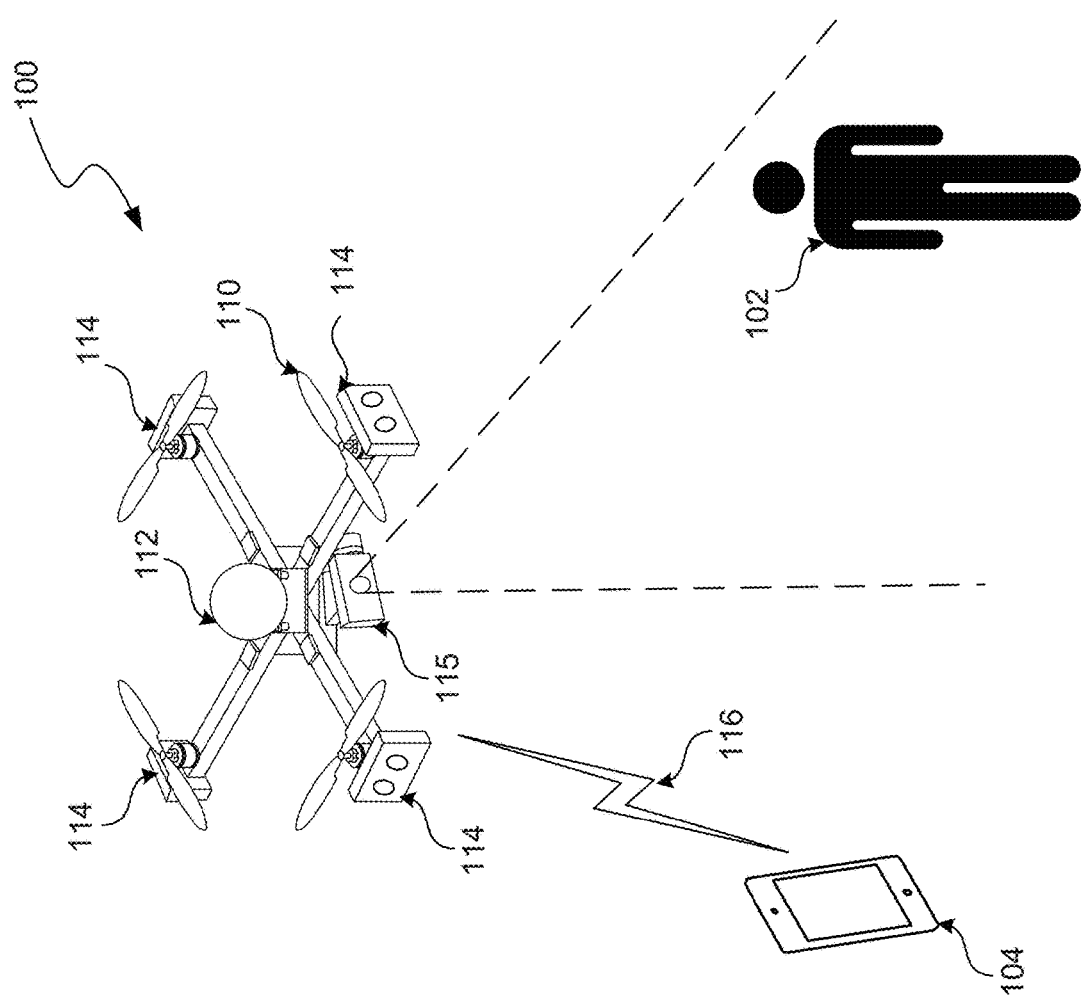
FIG. 1A shows a first example autonomous unmanned aerial vehicle (UAV)
Figure 1B:
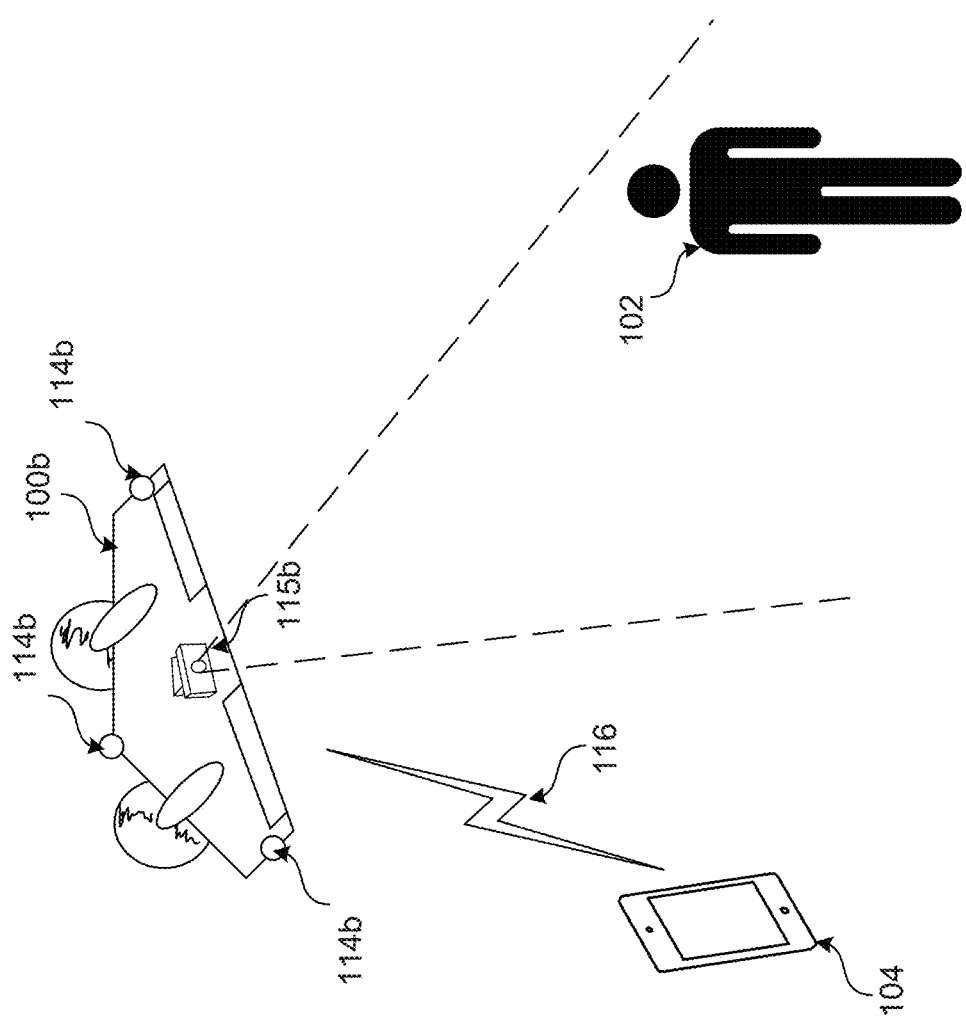
FIG. 1B shows a second example autonomous UAV.

FIGS. 1A and 1B shows example aerial vehicles within which certain techniques described herein may be applied. Specifically, FIG. 1A shows an example unmanned aerial vehicle (UAV) 100 in the form of a rotor-based aircraft (e.g., a "quadcopter"), although the other introduced technique can similarly be applied in other types of aerial vehicles such as fixed-wing aircraft as depicted in FIG. 1B. The example UAV 100 includes control actuators 110 for maintaining controlled flight. The control actuators 110 may comprise or be associated with a propulsion system (e.g., rotors) and/or one or more control surfaces (e.g., flaps, ailerons, rudder, etc.) depending on the configuration of the UAV. The example UAV 100 depicted in FIG. 1A includes control actuators 110 in the form of electronic rotors that comprise a propulsion system of the UAV 100. The UAV 100 also includes various sensors for automated navigation and flight control 112, and one or more image capture devices 114 and 115 for capturing images of the surrounding physical environment while in flight. "Images," in this context, include both still images and captured video. Although not shown in FIG. 1A, UAV 100 may also include other sensors (e.g., for capturing audio) and systems for communicating with other devices, such as a mobile device 104, via a wireless communication channel 116.

In the example depicted in FIG. 1A, the image capture devices 114 and/or 115 are depicted capturing an object 102 in the physical environment that happens to be a person. In some cases, the image capture devices may be configured to capture images for display to users (e.g., as an aerial video platform) and/or, as described above, may also be configured for capturing images for use in autonomous navigation. In other words, the UAV 100 may autonomously (i.e., without direct human control) navigate the physical environment, for example, by processing images captured by any one or more image capture devices. While in flight, UAV 100 can also capture images using any one or more image capture devices that can be displayed in real time and or recorded for later display at other devices (e.g., mobile device 104).

FIG. 1A shows an example configuration of a UAV 100 with multiple image capture devices configured for different purposes. In the example configuration shown in FIG. 1A, the UAV 100 includes multiple image capture devices 114 arranged about a perimeter of the UAV 100. The image capture device 114 may be configured to capture images for use by a visual navigation system in guiding autonomous flight by the UAV 100 and/or a tracking system for tracking other objects in the physical environment (e.g., as described with respect to FIG. 2). Specifically, the example configuration of UAV 100 depicted in FIG. 1A includes an array of multiple stereoscopic image capture devices 114, for example placed around a perimeter of the UAV 100, so as to provide stereoscopic image capture up to a full 360 degrees around the UAV 100.

In addition to the array of image capture devices 114, the UAV 100 depicted in FIG. 1A also includes another image capture device 115 configured to capture images that are to be displayed, but not necessarily used, for navigation. In some embodiments, the image capture device 115 may be similar to the image capture devices 114, except in how captured images are utilized. However, in other embodiments, the image capture devices 115 and 114 may be configured differently to suit their respective roles.

In many cases, it is generally preferable to capture images that are intended to be viewed at as high a resolution as possible given certain hardware and software constraints. On the other hand, if used for visual navigation and/or object tracking, lower resolution images may be preferable in certain contexts to reduce processing load and provide more robust motion planning capabilities. Accordingly, in some embodiments, the image capture device 115 may be configured to capture relatively high resolution (e.g., 3840×2160 or higher) color images, while the image capture devices 114 may be configured to capture relatively low resolution (e.g., 320×240 or lower) grayscale images.

The UAV 100 can be configured to track one or more objects such as a human subject 102 through the physical environment based on images received via the image capture devices 114 and/or 115. Further, the UAV 100 can be configured to track image capture of such objects, for example, for filming purposes. In some embodiments, the image capture device 115 is coupled to the body of the UAV 100 via an adjustable mechanism that allows for one or more degrees of freedom of motion relative to a body of the UAV 100. The UAV 100 may be configured to automatically adjust an orientation of the image capture device 115 so as to track image capture of an object (e.g., human subject 102) as both the UAV 100 and object are in motion through the physical environment. In some embodiments, this adjustable mechanism may include a mechanical gimbal mechanism that rotates an attached image capture device about one or more axes. In some embodiments, the gimbal mechanism may be configured as a hybrid mechanical-digital gimbal system coupling the image capture device 115 to the body of the UAV 100. In a hybrid mechanical-digital gimbal system, orientation of the image capture device 115 about one or more axes may be adjusted by mechanical means, while orientation about other axes may be adjusted by digital means. For example, a mechanical gimbal mechanism may handle adjustments in the pitch of the image capture device 115, while adjustments in the roll and yaw are accomplished digitally by transforming (e.g., rotating, panning, etc.) the captured images so as to effectively provide at least three degrees of freedom in the motion of the image capture device 115 relative to the UAV 100.

In some embodiments, an aerial vehicle may instead be configured as a fixed-wing aircraft, for example, as depicted in FIG. 1B. Similar to the UAV 100 described with respect to FIG. 1A, the fixed-wing UAV 100*b* shown in FIG. 1B may include multiple image capture devices 114*b* arranged around the UAV 100*b* that are configured to capture images for use by a visual navigation system in guiding autonomous flight by the UAV 100*b*. The example fixed-wing UAV 100*b* may also include a subject image capture device 115*b* configured to capture images (e.g., of subject 102) that are to be displayed but not necessarily used for navigation. For simplicity, certain embodiments of the introduced technique may be described herein with reference to the UAV 100 of FIG. 1A; however, a person having ordinary skill in the art will recognize that such descriptions can be similarly applied in the context of the fixed-wing UAV 100*b* of FIG. 1B.

Mobile device 104 may include any type of mobile device such as a laptop computer, a table computer (e.g., Apple iPad™), a cellular telephone, a smart phone (e.g., Apple iPhone™), a handled gaming device (e.g., Nintendo Switch™), a single-function remote control device, or any other type of device capable of receiving user inputs, transmitting signals for delivery to the UAV 100 (e.g., based on the user inputs), and/or presenting information to the user (e.g., based on sensor data gathered by the UAV 100). In some embodiments, the mobile device 104 may include a touch screen display and an associated graphical user interface (GUI) for receiving user inputs and presenting information. In some embodiments, the mobile device 104 may include various sensors (e.g., an image capture device, accelerometer, gyroscope, GPS receiver, etc.) that can collect sensor data. In some embodiments, such sensor data can be communicated to the UAV 100, for example, for use by an onboard navigation system of the UAV 100.

Figure 2:
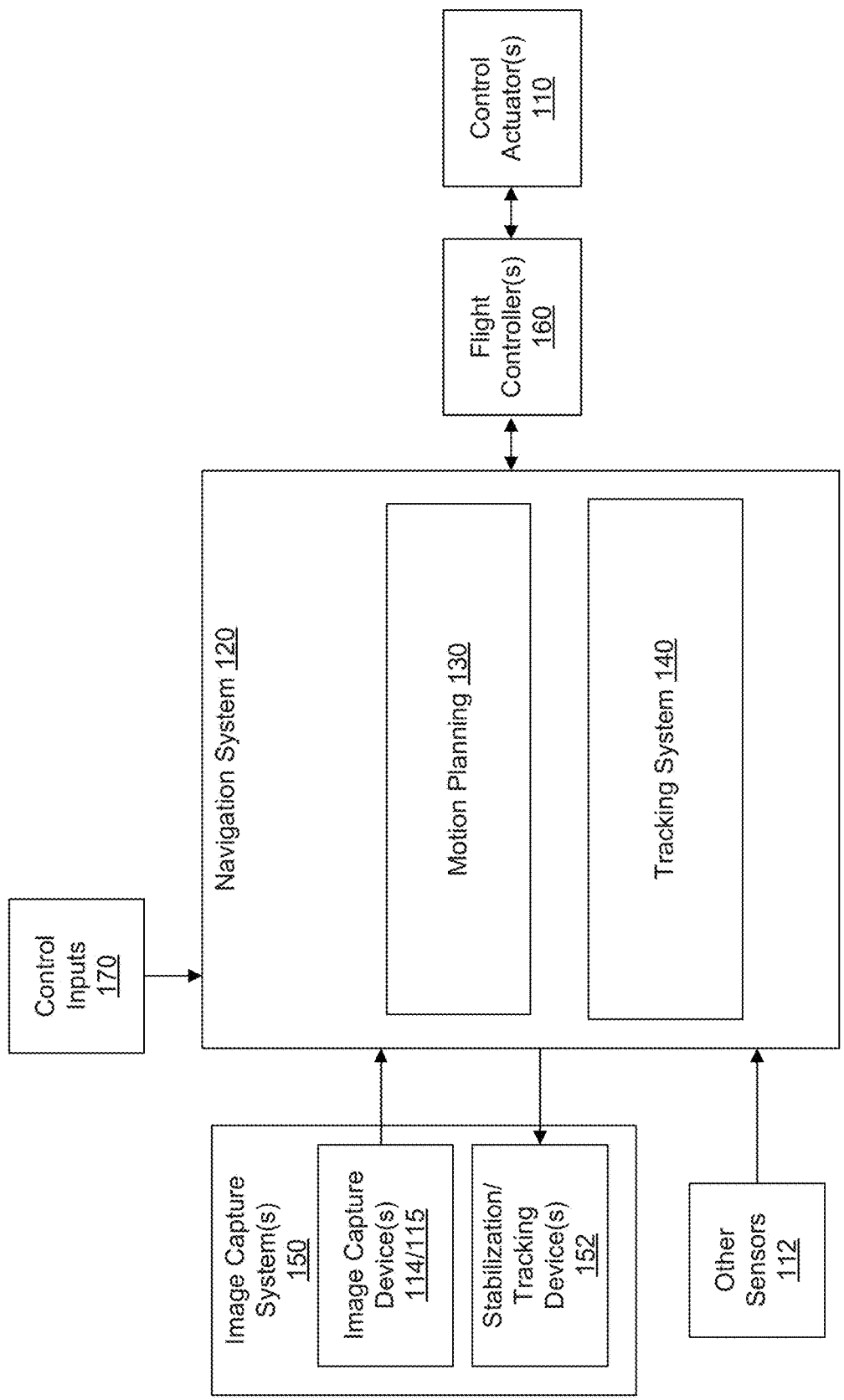
FIG. 2 shows a block diagram of an example navigation system for a UAV.

FIG. 2 is a block diagram that illustrates an example navigation system 120 that may be implemented as part of the example UAV 100. The navigation system 120 may include any combination of hardware and/or software. For example, in some embodiments, the navigation system 120 and associated subsystems may be implemented as instructions stored in memory and executable by one or more processors.

As shown in FIG. 2, the example navigation system 120 includes a motion planner 130 (also referred to herein as a "motion planning system") for autonomously maneuvering the UAV 100 through a physical environment and a tracking system 140 for tracking one or more objects in the physical environment. Note that the arrangement of systems shown in FIG. 2 is an example provided for illustrative purposes and is not to be construed as limiting. For example, in some embodiments, the tracking system 140 may be separate from the navigation system 120. Further, the subsystems making up the navigation system 120 may not be logically separated as shown in FIG. 2 and instead may effectively operate as a single integrated navigation system.

In some embodiments, the motion planner 130, operating separately or in conjunction with the tracking system 140, is configured to generate a planned trajectory through a three-dimensional (3D) space of a physical environment based, for example, on images received from image capture devices 114 and/or 115, data from other sensors 112 (e.g., an IMU, a global positioning system (GPS) receiver, proximity sensors, etc.), and/or one or more control inputs 170. Control inputs 170 may be from external sources such as a mobile device operated by a user or may be from other systems on board the UAV 100.

In some embodiments, the navigation system 120 may generate control commands configured to cause the UAV 100 to maneuver along the planned trajectory generated by the motion planner 130. For example, the control commands may be configured to control one or more control actuators 110 (e.g., powered rotors and/or control surfaces) to cause the UAV 100 to maneuver along the planned 3D trajectory. Alternatively, a planned trajectory generated by the motion planner 130 may be output to a separate flight controller 160 that is configured to process trajectory information and generate appropriate control commands configured to control the one or more control actuators 110.

The tracking system 140, operating separately or in conjunction with the motion planner 130, may be configured to track one or more objects in the physical environment based, for example, on images received from image capture devices 114 and/or 115, data from other sensors 112 (e.g., IMU, GPS, proximity sensors, etc.), one or more control inputs 170 from external sources (e.g., from a remote user, navigation application, etc.), and/or one or more specified tracking objectives. Tracking objectives may include, for example, a designation by a user to track a particular detected object in the physical environment or a standing objective to track objects of a particular classification (e.g., people).

As alluded to above, the tracking system 140 may communicate with the motion planner 130, for example, to maneuver the UAV 100 based on measured, estimated, and/or predicted positions, orientations, and/or trajectories of the UAV 100 itself and of other objects in the physical environment. For example, the tracking system 140 may communicate a navigation objective to the motion planner 130 to maintain a particular separation distance to a tracked object that is in motion.

In some embodiments, the tracking system 140, operating separately or in conjunction with the motion planner 130, is further configured to generate control commands configured to cause one or more stabilization/tracking devices 152 to adjust an orientation and/or position of any image capture devices 114/115 relative to the body of the UAV 100 based on the motion of the UAV 100 and/or the tracking of one or more objects. Such stabilization/tracking devices 152 may include a mechanical gimbal or a hybrid digital-mechanical gimbal, as previously described. For example, while tracking an object in motion relative to the UAV 100, the tracking system 140 may generate control commands configured to adjust an orientation of an image capture device 115 so as to keep the tracked object centered in the FOV of the image capture device 115 while the UAV 100 is in motion. Similarly, the tracking system 140 may generate commands or output data to a digital image processor (e.g., that is part of a hybrid digital-mechanical gimbal) to transform images captured by the image capture device 115 to keep the tracked object centered in the FOV of the image capture device 115 while the UAV 100 is in motion. The image capture devices 114/115 and associated stabilization/tracking device 152 are collectively depicted in FIG. 2 as an image capture system 150.

The UAV 100 shown in FIG. 1A and the associated navigation system 120 shown in FIG. 2 are examples provided for illustrative purposes. An aerial vehicle, in accordance with the present teachings, may include more or fewer components than are shown. Further, the example UAV 100 and associated navigation system 120 depicted in FIG. 2 may include or be part of one or more of the components of the example UAV system 3000 described with respect to FIG. 30 and/or the example computer processing system 3100 described with respect to FIG. 31. For example, the aforementioned navigation system 120 and associated motion planner 130 and tracking system 140 may include or be part of the system 3000 and/or computer processing system 3100.

The example aerial vehicles and associated systems described herein are described in the context of a UAV such as the UAV 100 for illustrative simplicity; however, the introduced aerial vehicle configurations are not limited to unmanned vehicles. The introduced technique may similarly be applied to configure various types of UAV, such as a manned rotor craft (e.g., helicopters) or a manned fixed-wing aircraft (e.g., airplanes). For example, a manned aircraft may include an autonomous navigation system (similar to navigation systems 120) in addition to a manual control (direct or indirect) system. During flight, control of the craft may switch over from a manual control system in which an onboard pilot has direct or indirect control, to an automated control system to autonomously maneuver the craft without requiring any input from the onboard pilot or any other remote individual. Switchover from manual control to automated control may be executed in response to pilot input and/or automatically in response to a detected event such as a remote signal, environmental conditions, operational state of the aircraft, etc.

Objective-Based Autonomous Navigation

The complex processing by a navigation system 120 to affect the autonomous behavior of a UAV 100 can be abstracted into one or more behavioral objectives. A "behavioral objective" or "objective" in this context generally refers to any sort of defined goal or target configured to guide an autonomous response by the UAV 100. In some embodiments, a navigation system 120 (e.g., specifically a motion planning component 130) is configured to incorporate multiple objectives at any given time to generate an output such as a planned trajectory that can be used to guide the autonomous behavior of the UAV 100. For example, certain built-in objectives, such as obstacle avoidance and vehicle dynamic limits, can be combined with other input objectives (e.g., a tracking objective) as part of a trajectory generation process. In some embodiments, the trajectory generation process can include gradient-based optimization, gradient-free optimization, sampling, end-to-end learning, or any combination thereof. The output of this trajectory generation process can be a planned trajectory over some time horizon (e.g., 10 seconds) that is configured to be interpreted and utilized by a flight controller 160 to generate control commands (usable by control actuators 110) that cause the UAV 100 to maneuver according to the planned trajectory. A motion planner 130 may continually perform the trajectory generation process as new perception inputs (e.g., images or other sensor data) and objective inputs are received. Accordingly, the planned trajectory may be continually updated over some time horizon, thereby enabling the UAV 100 to dynamically and autonomously respond to changing conditions.

FIG. 3A shows a block diagram that illustrates an example system for objective-based motion planning. As shown in FIG. 3A, a motion planner 130 (e.g., as discussed with respect to FIG. 2) may generate and continually update a planned trajectory 320 based on a trajectory generation process involving one or more objectives (e.g., as previously described) and/or more perception inputs 306. The perception inputs 306 may include images received from one or more image capture devices 114/115, results of processing such images (e.g., disparity images, depth values, semantic data, etc.), sensor data from one or more other sensors 112 on board the UAV 100 or associated with other computing devices (e.g., mobile device 104) in communication with the UAV 100, and/or data generated by, or otherwise transmitted from, other systems on board the UAV 100. The one or more objectives 302 utilized in the motion planning process may include built-in objectives governing high-level behavior (e.g., avoiding collision with other objects, maneuvering within dynamic limitations, etc.), as well as objectives based on control inputs 308 (e.g., from users or other onboard systems). Each of the objectives 302 may be encoded as one or more equations for incorporation in one or more motion planning equations utilized by the motion planner 130 when generating a planned trajectory to satisfy the one or more objectives. The control inputs 308 may be in the form of control commands from a user or from other components of the navigation system 120 such as a tracking system 140.

In some embodiments, the underlying processes performed by a navigation system 120 for causing a UAV 100 to autonomously maneuver through an environment and/or perform image capture can be exposed through an application programming interface (API). Accordingly, in some embodiments, certain inputs to the navigation system may be received in the form of calls to an API.

Figure 3:
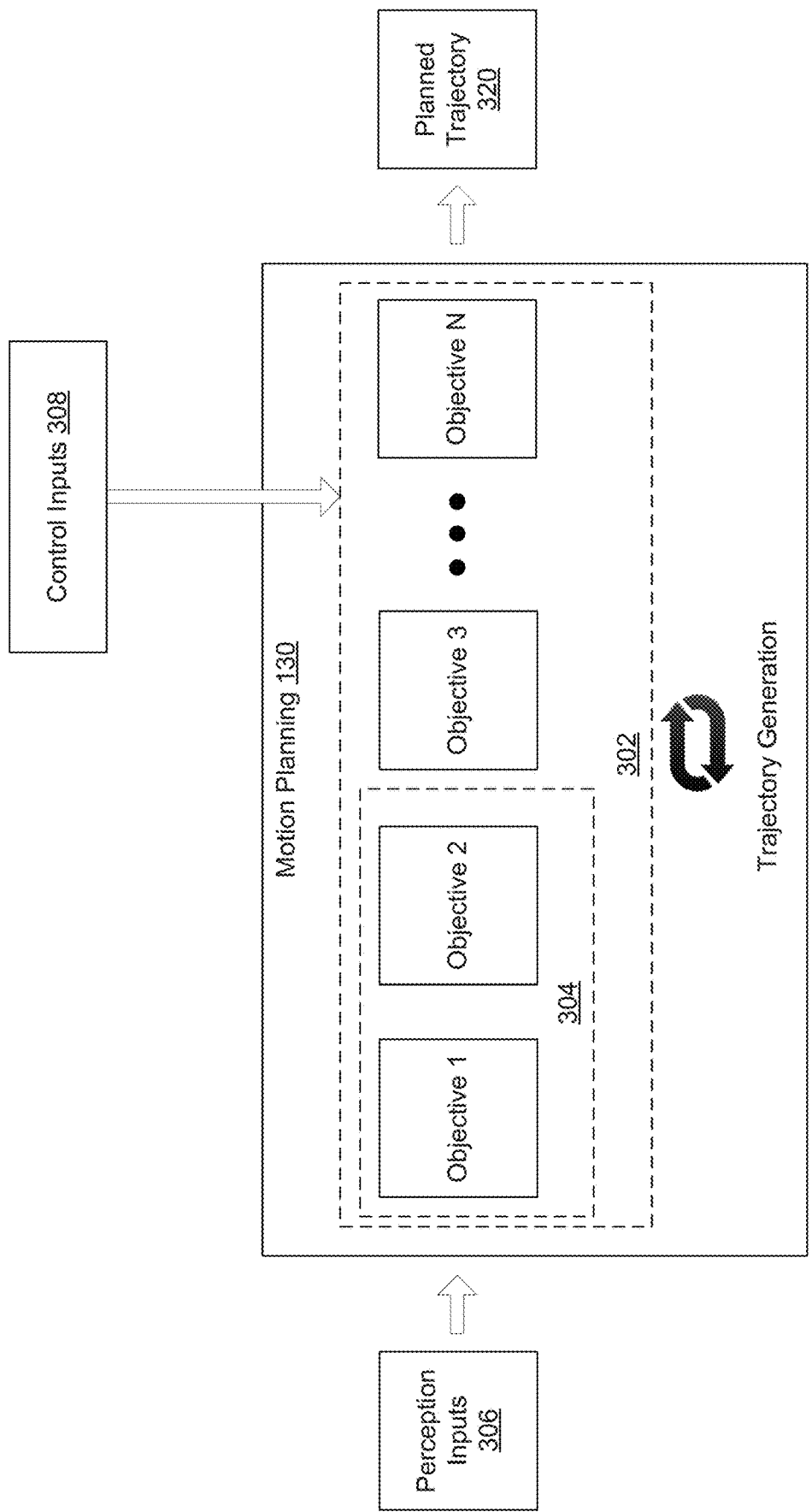
FIG. 3 shows a block diagram that illustrates objective-based motion planning by the navigation system of FIG. 2.
Figure 4:
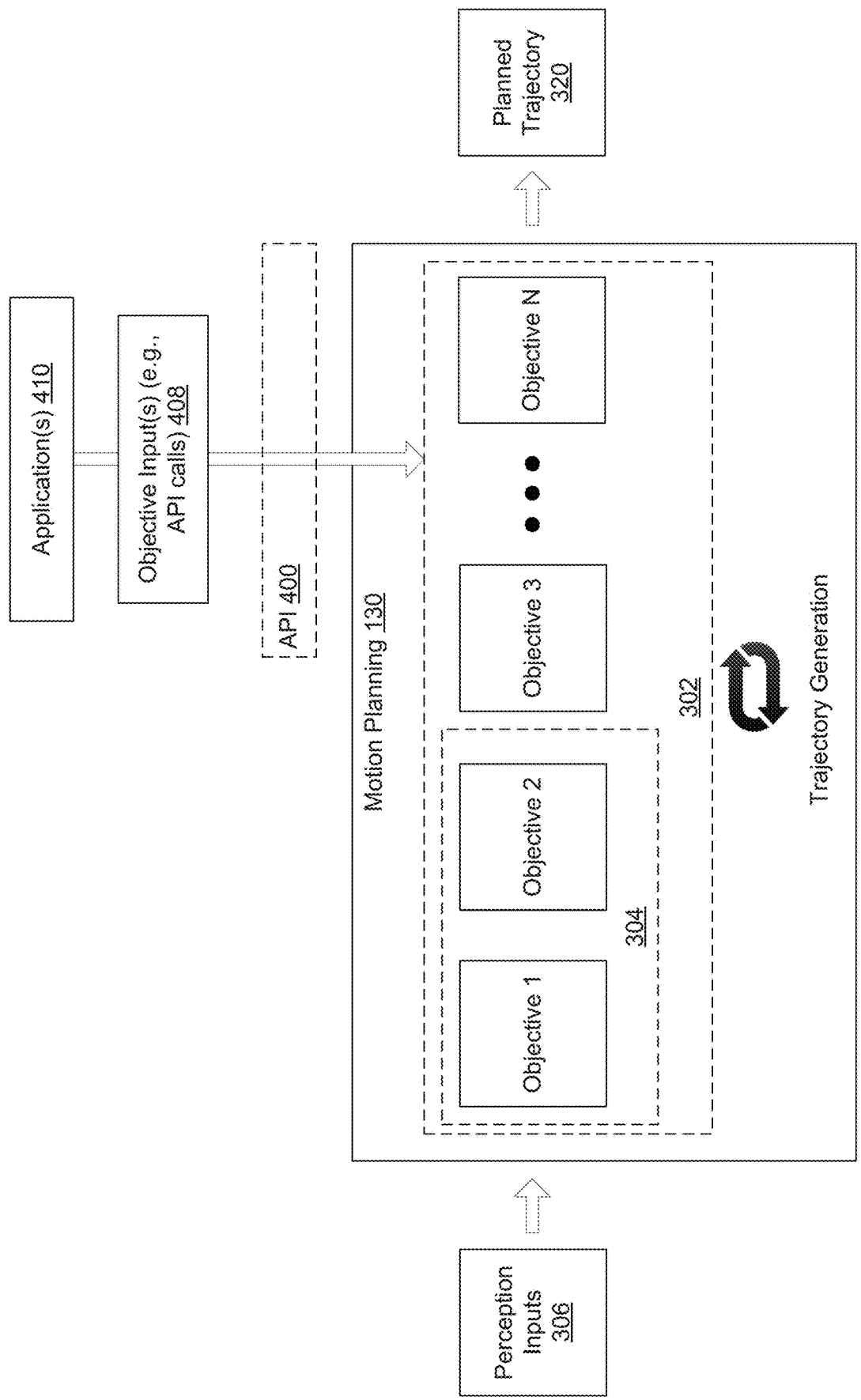
FIG. 4 shows a block diagram illustrating multi-objective optimization-based motion planning by the navigation system of FIG. 2 based on objective inputs received via an API.

FIG. 4 shows a block diagram that illustrates an example system for objective-based motion planning similar to the system depicted in FIG. 3, but configured to incorporate certain objective inputs 408 using an API 400. In some embodiments, the API 400 may be configured as a public facing API that may be utilized by a developer to create applications configured to enable certain user interactions with the UAV 100 without specific knowledge of the underlying processes of the navigation system 120 that enable autonomous behavior by the UAV 100. In some cases, the developer creating such applications may be a "second-party" or "third-party" developer, meaning that the developer may be an entity other than the original developer of the navigation system 120 (or one or more internal components of the navigation system 120).

The objective inputs 408 may be in the form of calls to an API 400 by one or more applications 410 associated with the UAV 100. An "application" in this context may include any set of instructions for performing a process to control or otherwise alter the behavior of the UAV 100 through an API 400. A developer (e.g., a third-party developer) can configure an application 410 to send a command to the UAV 100 while in flight over a network API to alter one or more of the objectives 302 utilized by the motion planner 130 to alter the behavior of the UAV 100. As previously noted, the UAV 100 may be configured to maintain safe flight regardless of commands sent by an application. In other words, an application 410 may not have access via the API 400 to alter certain core built-in objectives 304 such as obstacle avoidance. The API 400 can therefore be used to implement applications such as a customized vehicle control interface, for example, implemented using a mobile device 104. Such applications 410 may be stored in a memory associated with the UAV 100 and/or stored in a memory of another computing device (e.g., mobile device 104) that is in communication (e.g., wireless communication) with the UAV 100.

Figure 5:
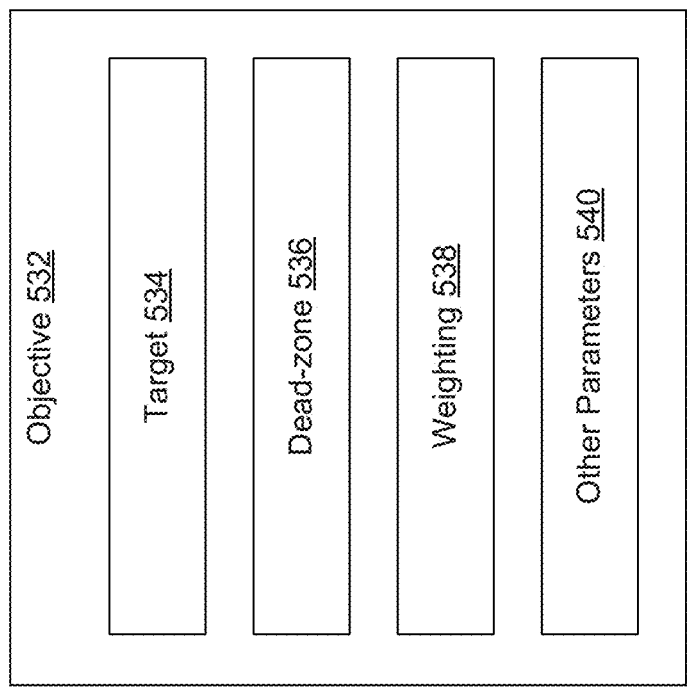
FIG. 5 shows a block diagram of an example objective that can be applied as part of the objective-based motion planning illustrated in FIG. 3 and/or FIG. 4.

Each objective of a given set of one or more objectives 302 utilized in the motion planning process may include one or more defined parameterizations. For example, FIG. 5 shows a block diagram that represents the various parameters associated with an example objective 532. As shown in FIG. 5, the example objective 532 include a target 534, a dead-zone 536, a weighting factor 538, and other parameters 540. The defined parameterizations can be utilized to define how an objective is utilized by a motion planning process to guide the autonomous behavior of a UAV 100. In some embodiments, the parameters of a given objective can be exposed through an API 400. For example, an application 410 (e.g., for sports or fitness application) may be configured to set certain parameter values of a particular objective through calls to API 400.

The target 544 defines the goal of the particular objective that the motion planner 130 will attempt to satisfy when generating a planned trajectory 320. For example, the target 534 of a given objective may be to maintain line of sight with one or more detected objects or to fly to a particular position in the physical environment.

The dead-zone defines a region around the target 534 in which the motion planner 130 may not take action to correct. This dead-zone 536 may be thought of as a tolerance level for satisfying a given target 534. For example, a target of an example image-relative objective may be to maintain image capture of a tracked object such that the tracked object appears at a particular position in the image space of a captured image (e.g., at the center). To avoid continuous adjustments based on slight deviations from this target, a dead-zone is defined to allow for some tolerance. For example, a dead-zone can be defined in a y-direction and x-direction surrounding a target location in the image space. In other words, as long as the tracked object appears within an area of the image bounded by the target and respective dead-zones, the objective is considered satisfied.

The weighting factor 536 (also referred to as an "aggressiveness" factor) defines a relative level of impact the particular objective 532 will have on the overall trajectory generation process performed by the motion planner 130. Recall that a particular objective 532 may be one of several objectives 302 that may include competing targets. In an ideal scenario, the motion planner 130 will generate a planned trajectory 320 that perfectly satisfies all of the relevant objectives at any given moment. For example, the motion planner 130 may generate a planned trajectory that maneuvers the UAV 100 to a particular GPS coordinate while following a tracked object, capturing images of the tracked object, maintaining line of sight with the tracked object, and avoiding collisions with other objects. In practice, such an ideal scenario may be rare. Accordingly, the motion planner system 130 may need to favor one objective over another when the satisfaction of both is impossible or impractical (for any number of reasons). The weighting factors for each of the objectives 302 define how they will be considered by the motion planner 130.

In an example embodiment, the weighting factor 538 is a numerical value on a scale of 0.0 to 1.0. A value of 0.0 for a particular objective may indicate that the motion planner 130 can completely ignore the objective (if necessary), while a value of 1.0 may indicate that the motion planner 130 will make a maximum effort to satisfy the objective while maintaining safe flight. A value of 0.0 may similarly be associated with an inactive objective and may be set to zero, for example, in response to toggling the objective from an active state to an inactive state. Low weighting factor values (e.g., 0.0-0.4) may be set for certain objectives that are based around subjective or aesthetic targets such as maintaining visual saliency in the captured images. Conversely, high weighting factor values (e.g., 0.5-1.0) may be set for more critical objectives such as avoiding a collision with another object.

In some embodiments, the weighting factor values may remain static as a planned trajectory is continually updated while the UAV 100 is in flight. Alternatively, or in addition, weighting factors for certain objectives may dynamically change based on changing conditions, while the UAV 100 is in flight. For example, an objective to avoid an area associated with uncertain depth value calculations in captured images (e.g., due to low light conditions) may have a variable weighting factor that increases or decreases based on other perceived threats to the safe operation of the UAV 100. In some embodiments, an objective may be associated with multiple weighting factor values that change depending on how the objective is to be applied. For example, a collision avoidance objective may utilize a different weighting factor depending on the class of a detected object that is to be avoided. As an illustrative example, the system may be configured to more heavily favor avoiding a collision with a person or animal as opposed to avoiding a collision with a building or tree.

Representations of Objects in a Shared Virtual Environment

An autonomous aerial vehicle such as UAV 100 can be utilized to detect and track one or more physical objects in a physical environment. The estimated positions of the detected objects can then be utilized to build a virtual representation of at least a portion of the physical environment (including virtual representations of the tracked objects) that can be accessed by multiple users from multiple devices. This shared virtual representation of the physical environment is referred to herein as a "shared virtual environment" or "shared virtual reality."

Figure 6:
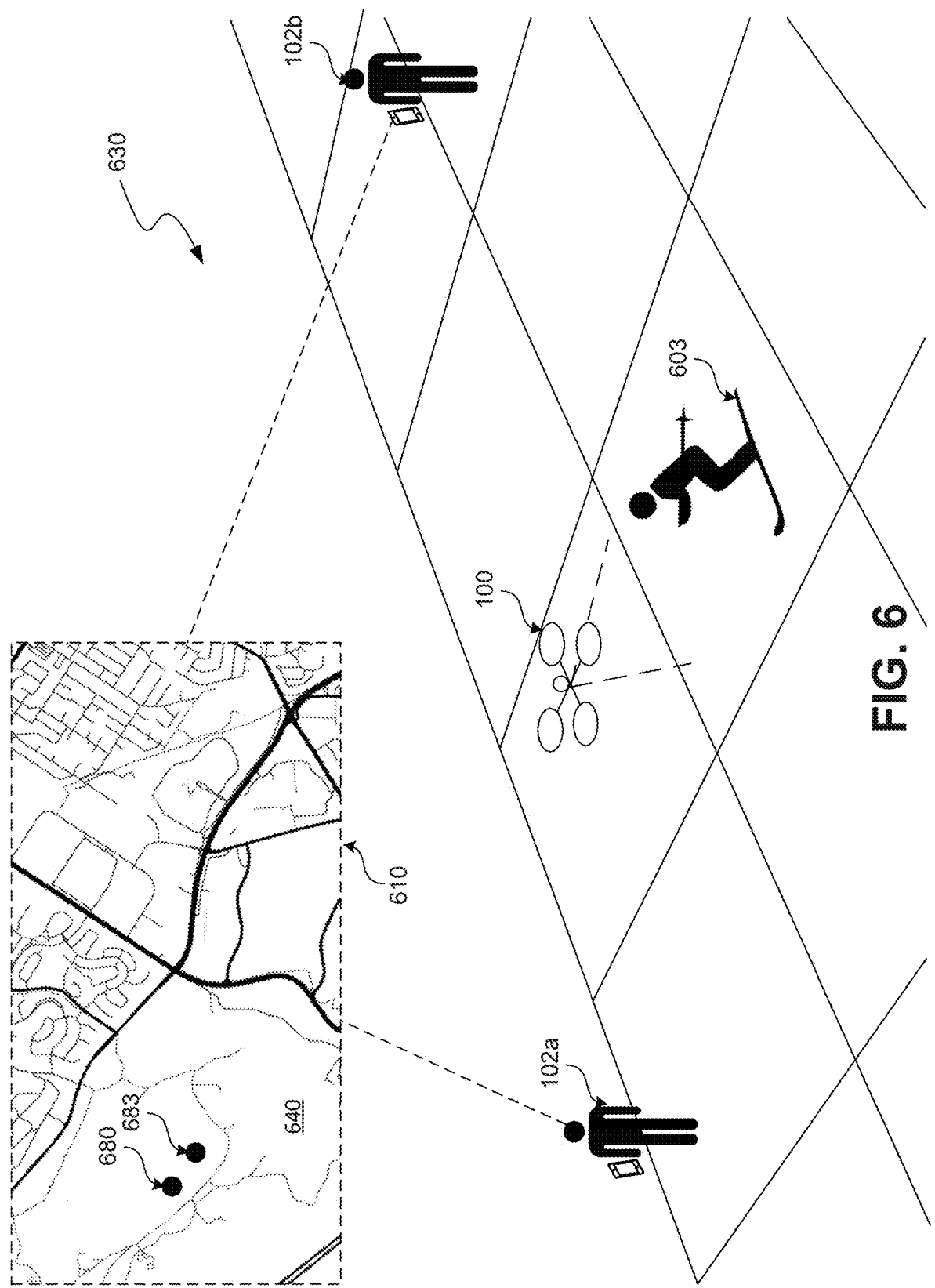
FIG. 6 shows a diagram that illustrates an example implementation of a shared virtual environment.

FIG. 6 shows a diagram that illustrates an example implementation of a shared virtual environment that is based on data gathered by one or more autonomous aerial vehicles. Specifically, FIG. 6 depicts a UAV 100, a first and second user 102a and 102b (respectively), and a tracked object 603 (in this example, a skier) all occupying a physical environment 630. Using various localization and object tracking techniques, the relative positions, orientations, motion, etc. of the UAV 100 and/or other objects, such as tracked object 603, can be estimated based on perception inputs from various sensors on board the UAV 100 and/or other devices. Techniques for detecting and tracking objects based on perception inputs are described in more detail with regard to FIGS. 16-24. The estimated positions and/or orientations of the multiple tracked objects can then be used to generate representations of the UAV 100 and the multiple tracked objects in a shared virtual environment.

The shared virtual environment includes a virtual representation of a physical environment. The "physical environment" in this context may be global (i.e., representing the entire physical Earth) or may be confined to some frame of reference such as a particular region, city, property, or any other arbitrary boundary. The shared virtual environment may include a 3D representation of the physical environment or a 2D representation of the physical environment. For example, a 3D representation of the physical environment may include computer generated 3D models that are dimensioned, oriented, positioned, etc. to represent the various detected physical objects in the physical environment.

FIG. 6 shows an example view 610 of the shared virtual environment 640 in the form of a 2D digital map that corresponds with a portion of the physical Earth. The view 610 may be of a 2D shared virtual environment (i.e., only including location data in two dimensions) or the view 610 may be a 2D view of an otherwise 3D shared virtual environment (i.e., an overhead view of a 3D model). In an example implementation, the locations of various physical objects can be represented in the view 610 of the shared virtual environment 640, for example, using graphical markers of some type. Multiple users can then access the shared virtual environment 640 to, for example, view the relative locations (in real-time or otherwise) of the UAV 100 and various other objects such as other UAVs or objects 603 that are tracked by the UAVs. In FIG. 6, two users 102a-b are depicted accessing respective views of the shared virtual environment 640 that corresponds with the physical environment 630. For example, the dotted line box surrounding view 610 may represent a display of a device (e.g., mobile device 104) utilized by the users 102a-b to access the shared virtual environment. In the example of FIG. 6, the location of the UAV 100 in the shared virtual environment is depicted by marker 680, and the location of tracked object 603 is depicted by marker 683.

FIG. 6 shows an example of how presence within a shared virtual environment may be depicted (in 2D) and is provided for illustrative purposes. Other embodiments may enable users to access a shared digital 3D map within which representations of the UAV 100 and other objects are depicted. For example, using network-connected devices, multiple users may access a shared 3D virtual environment that corresponds with the physical environment 630. Representations of the UAV and other objects, for example, in the form of rendered 3D virtual objects may occupy the 3D virtual environment at locations corresponding to their actual real-time locations in the physical environment 630.

Figure 7:
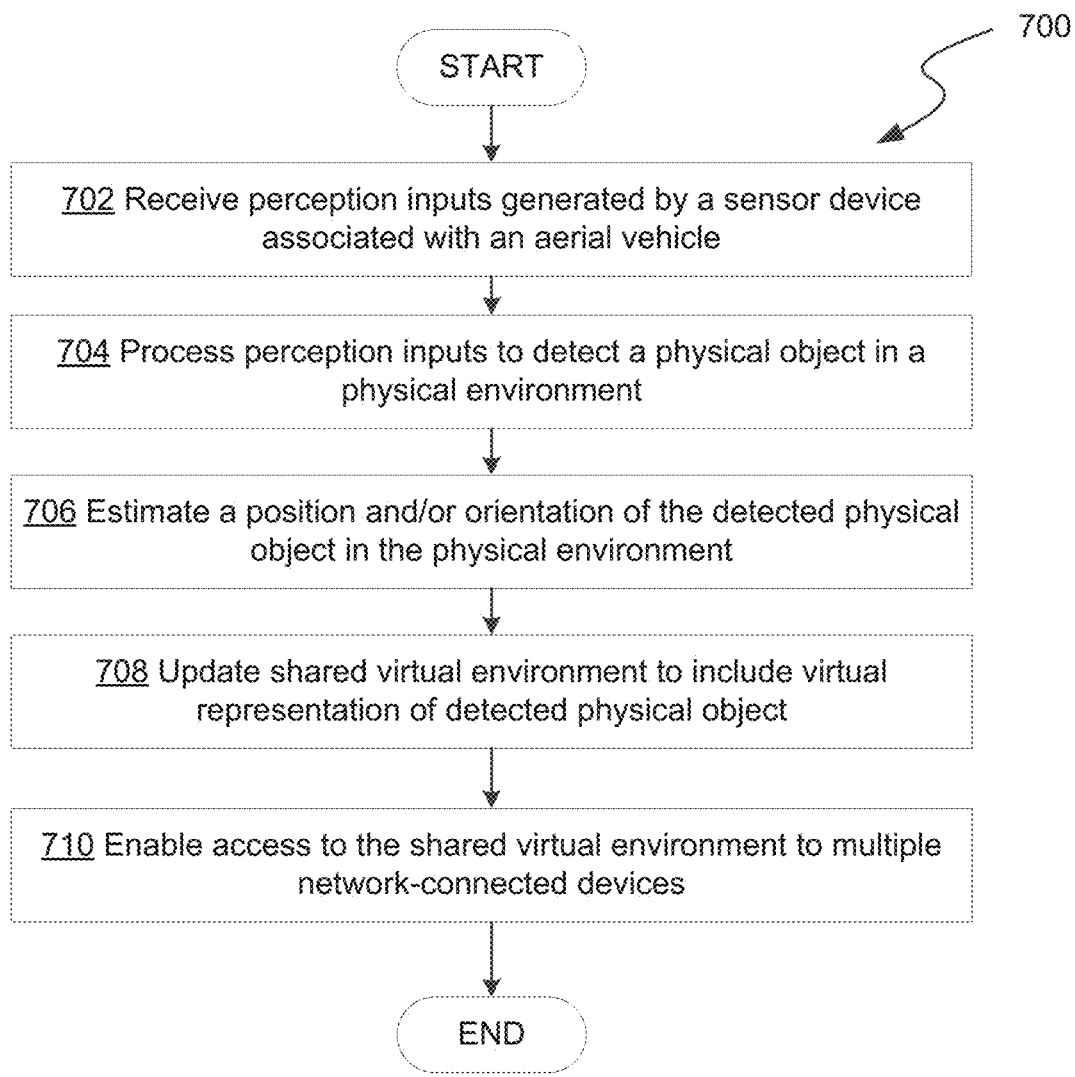
FIG. 7 shows a flow diagram of an example process for generating and enabling access to a shared virtual environment.

FIG. 7 shows a flow diagram of an example process 700 for generating and enabling access to a shared virtual environment. One or more steps of the example process 700 may be performed by any one or more of the components of the example systems described with respect to FIG. 25 or 26. For example, the process 700 depicted in FIG. 7 may be represented in instructions stored in memory that are then executed by a processing unit. The process 700 described with respect to FIG. 7 is an example provided for illustrative purposes and is not to be construed as limiting. Other processes may include more or fewer steps than depicted while remaining within the scope of the present disclosure. Further, the steps depicted in example process 700 may be performed in a different order than is shown.

Example process 700 begins at step 702 with receiving perception inputs generated by one or more sensor devices associated with an autonomous aerial vehicle such as UAV 100. The perception inputs may include images received from one or more image capture devices 114/115, results of processing such images (e.g., disparity images, depth values, semantic data, etc.), sensor data from one or more other sensors 112 on board the UAV 100 or associated with other computing devices (e.g., mobile device 104) in communication with the UAV 100, and/or data generated by, or otherwise transmitted from, other systems on board the UAV 100.

In some embodiments, where the processor performing step 702 is on board the UAV 100, step 702 may include receiving perception inputs via an onboard communication bus or other signal line that communicatively couples an onboard sensor device (e.g., image capture devices 114/115) to the processor. In other embodiments, where the processor performing step 702 is remote from the UAV 100, step 702 may include receiving images via a wired or wireless communication link between the UAV 100 and the computing device that includes the processor (e.g., mobile device 104).

Process 700 continues at step 704 with processing the perception inputs to detect a physical object in the physical environment and at step 706 with estimating a position, orientation, motion, etc. of the detected physical object. As previously discussed, using one or more localization and object tracking techniques, the relative positions, orientations, motion, etc. of the UAV 100 and/or other objects can be estimated based on perception inputs from various sensors on board the UAV 100 and/or other devices. Techniques for localizing, detecting, and tracking objects based on perception inputs are described in more detail with regard to FIGS. 16-24. In an illustrative example, by applying computer vision techniques, one or more objects can be detected by processing images of the surrounding physical environment. This may involve processing perception inputs (e.g., images) using one or more machine-learning models (e.g., artificial neural networks with deep learning) to detect, classify, and track multiple instances of various objects.

Process 700 continues at step 708 with updating a shared virtual environment that is representative of the physical environment to include a virtual representation of the physical object detected at step 704. In some embodiments the virtual representation of the physical object is placed at a virtual location in the shared virtual environment that corresponds with the position of the physical object estimated at step 706.

As previously discussed, the shared virtual environment may include a 3D representation of the physical environment or a 2D representation of the physical environment. For example, a 3D representation of the physical environment may include computer generated 3D models (or single model) that are dimensioned, oriented, positioned, etc. to represent the various detected physical objects in the physical environment.

In some embodiments, updating the shared virtual environment includes generating the virtual representation of the detected physical object. The virtual representation can include a 3D model that is representative of the 3D geometry of a detected physical object. In such embodiments, the process of generating the 3D model of the physical object may include first determining the 3D geometry of the detected physical object, for example, by processing the perception inputs received at step 702 and generating the 3D model based on the determined 3D geometry of the detected physical object. In other embodiments, the virtual representation may instead include a 2D or 3D virtual object that does not necessarily represent the actual 3D geometry of the detected physical object. For example, with respect to FIG. 6, the location marker 683 representing tracked object 603 may comprise a 2D virtual object that is placed at a location in a 2D virtual map that corresponds with the location of the tracked physical object 603 in the physical environment 630.

As alluded to above, the shared virtual environment can be continually updated based on perception inputs from multiple devices. In such embodiments, example process 700 may further include tracking changes in the position and/or orientation of the detected physical object over time and continually updating a virtual location of the virtual representation of the physical object in the shared virtual environment in real-time based on the tracking. In this way the virtual representation of the tracked physical object is representative of a real-time position and/or orientation of the physical object. In this context real-time can mean "near-real-time" (e.g., within seconds) to account for delay due to transfer and processing of data.

Process 700 concludes at step 710 with enabling access to the shared virtual environment to a plurality of network-connected devices. For example, in some embodiments, the shared virtual environment can be hosted by one or more server computers that are communicatively coupled to one or more networks such as the Internet. A network-connected device such as UAV 100, mobile device 104, other UAVs, or other user devices can then access the shared virtual environment, for example, by communicating with the one or more hosting server computers via the computer network. In some embodiments, the one or more server computers hosting the shared virtual environment may operate as part of a public or private cloud-computing platform.

The manner in which network-connected devices access the shared virtual environment will vary based on use. For example, a UAV 100 may access the shared virtual environment for autonomous navigation. The shared virtual environment may comprise a continually updated 3D occupancy map that includes voxels that correspond to occupied portions of space in the physical environment. Since the 3D occupancy map is continually updated (e.g., based on perception inputs from multiple device), a motion planner 130 associated with the UAV 100 autonomously maneuvers the UAV 100 through the physical environment by generating a planned trajectory that avoids the voxels in the 3D occupancy map. Additional details reading the use of a 3D occupancy map for autonomous navigation are described with respect to FIG. 18.

A user device such as mobile device 104 can also access the shared virtual environment to display views of the shared virtual environment. For example, in some embodiments enabling access to the shared virtual environment can include displaying or causing display of a view of the shared virtual environment at a network-connected user device. The view displayed may include a 2D view (e.g., as shown at detail 610 in FIG. 6) or may include a 3D view of the shared virtual environment. In the case of a shared virtual environment comprising a 3D model, a 3D view may include a rendering of the 3D model from the perspective of a virtual camera located at a 3D point in the shared virtual environment. In some situations, the virtual camera used to display the view may correspond with a location of another physical object in the physical environment such as the UAV 100.

The view displayed at the network-connected user device may depict a virtual representation of the physical object at the virtual location in the virtual environment. In some embodiments, depiction of the virtual representation of the physical object may include a rendering of the virtual representation. For example, if the virtual representation includes a 3D model that is representative of the 3D geometry of a detected physical object, the view may include a rendering of the 3D model. In other embodiments the view of the virtual representation may include a rendering of a 2D or 3D virtual object that does not necessarily represent the actual 3D geometry of the detected physical object. For example, detail 610 in FIG. 6 shows an example view of a 2D virtual map that includes a 2D rendering of a location marker 683 representing tracked object 603.

Notably, multiple different user devices can access the shared virtual environment to display views of the shared virtual environment. For example, in some embodiments, enabling access to the shared virtual environment can include displaying or causing display of a first view of the shared virtual environment at a first network-connected user device and displaying or causing display of a second view of the shared virtual environment at a second network-connected user device. The views can be displayed simultaneously at the respective devices and may be from different perspectives (e.g., from different virtual cameras) in the shared virtual environment.

Fusing Perception Inputs from Multiple Devices

In some embodiments, virtual representations of physical objects in the physical environment can be generated based on perception inputs from sensors associated with multiple different devices located at various positions in the physical environment. For example, the perception inputs may be from sensors on board one or more aerial vehicles, such as UAV 100 and/or from sensors that are associated with other devices such as a mobile device 104. The perception inputs from the multiple different devices can be fused to generate the virtual representations of the physical objects. Fusing perception inputs from multiple devices can increase overall accuracy of the virtual representations of detected objects (i.e., accuracy in shape, dimensions, position, orientation, etc.) for various reasons. For example, fusing perception inputs from devices at different vantage points in the physical environment allows the system to more accurately resolve the location of a given physical object by triangulating depth measurements. As another example, perception inputs from devices on opposite sides of a physical object can fill in information regarding features of a physical object that would otherwise be occluded to either one of the devices individually. As another example, error introduced, for example by perception inputs from a mis-calibrated or otherwise faulty first device, can be identified and/or otherwise mitigated by comparing such inputs to perception inputs from a second device that is different than the first device.

Figure 8:
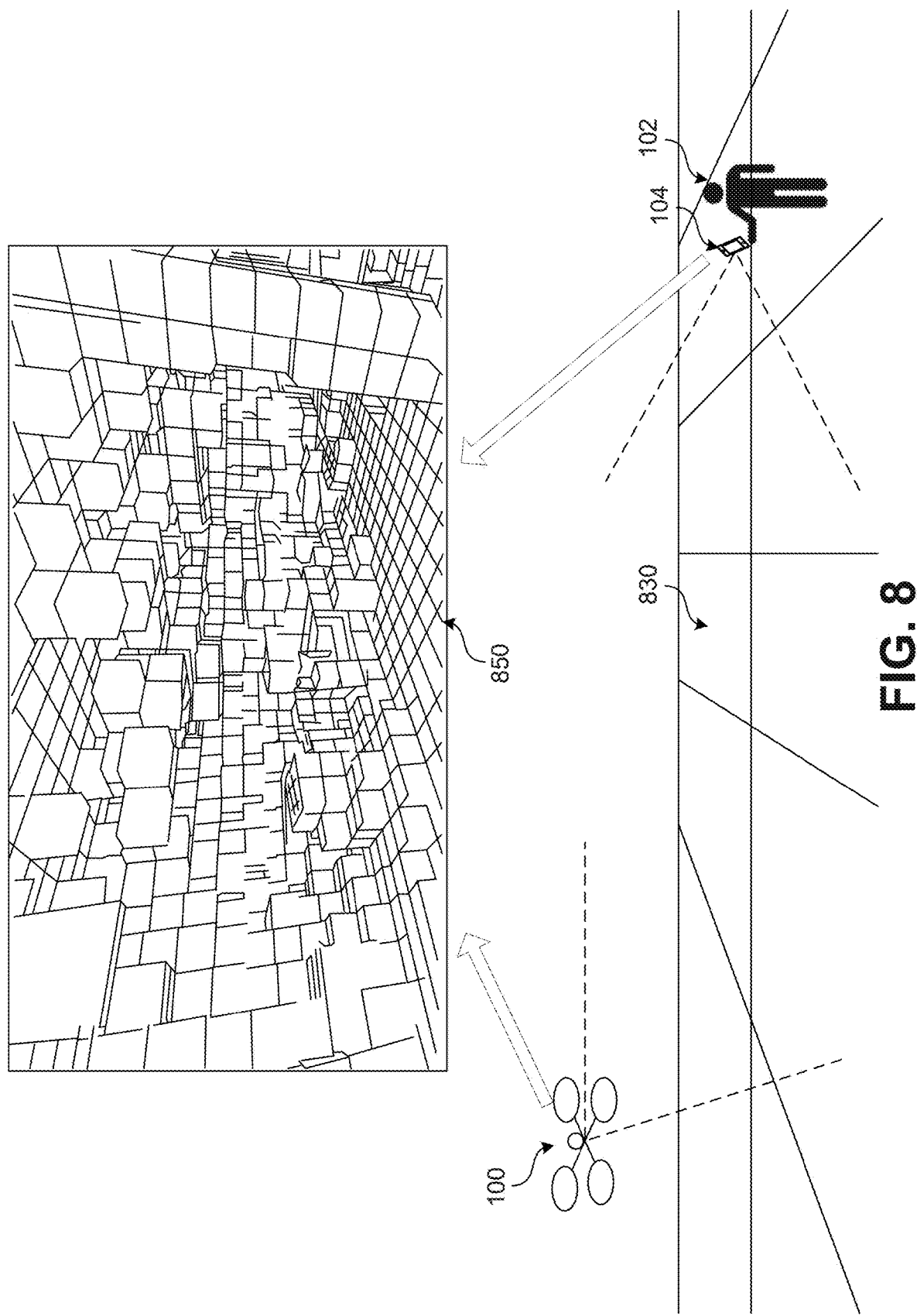
FIG. 8 shows a diagram that illustrates the fusing of perception inputs from multiple devices.

FIG. 8 shows a UAV 100 and user 102 (with associated mobile device 104) occupying a physical environment 830. Both the UAV 100 and mobile device 104 include one or more sensors including optical sensors such as cameras. Accordingly, the perception inputs (e.g., captured images) from the UAV 100 and mobile device 104 as well as other UAVs or other devices can be fused, for example, to generate a 3D model of the physical environment 830. In FIG. 8, the result of the fusing of perception inputs from multiple devices is depicted in the form of a 3D model 850 of the physical environment 830. The 3D model 850 of the physical environment 830 can be utilized for various purposes. For example, in some embodiments, the 3D model 850 can be utilized as an occupancy map to guide motion planning by the navigation system 120 associated with an autonomous vehicle such as UAV 100. Additional details regarding the use of a 3D occupancy map for motion planning are described with respect to FIG. 18. In other embodiments the 3D model 850 can be utilized to generate renderings that can be viewed by a display device such as mobile device 104.

In some embodiments, the 3D model 850 can be utilized as a shared virtual environment, for example, as described with respect to FIG. 6. For example, the UAV 100, mobile device 104, and other devices may occupy a shared virtual environment based in part on the generated 3D model 850. In other words, other UAVs passing through a portion of the physical environment 830 corresponding to the generated 3D model 850 may utilize the 3D model 850 for navigation or for generating visual outputs. Further, the portion of the 3D model 850 generated based on initial perception inputs from UAV 100 and mobile device 104 may be updated, modified, corrected, supplemented, or otherwise changed based on perception inputs from other UAVs or other devices passing through an area of the physical environment corresponding to the portion of the 3D model 850. In this way, the shared virtual environment (i.e., 3D model 850) is continually updated based on new perception inputs from various devices occupying the physical environment 830. In such an embodiment, the shared virtual environment in the form of 3D model 850 would be a real-time dynamic representation of the physical environment 850 as opposed to a static representation of the physical environment 830 at a particular moment in time.

Figure 9:
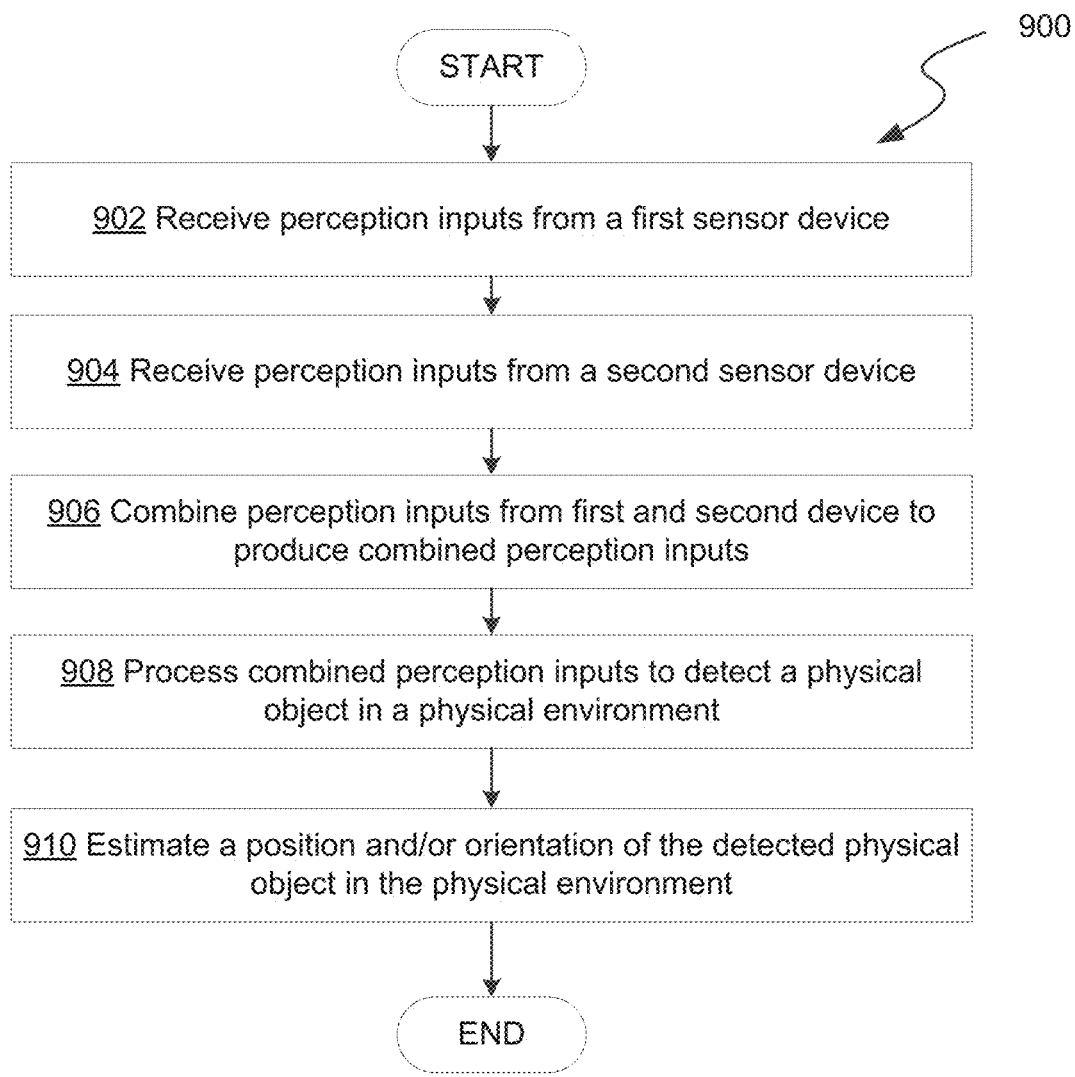
FIG. 9 shows a flow diagram of an example process for fusing of perception inputs from multiple devices.

FIG. 9 shows a flow diagram of an example process 900 for fusing perception inputs from multiple devices. One or more steps of the example process 900 may be performed by any one or more of the components of the example systems described with respect to FIG. 25 or 26. For example, the process 900 depicted in FIG. 9 may be represented in instructions stored in memory that are then executed by a processing unit. The process 900 described with respect to FIG. 9 is an example provided for illustrative purposes and is not to be construed as limiting. Other processes may include more or fewer steps than depicted while remaining within the scope of the present disclosure. Further, the steps depicted in example process 900 may be performed in a different order than is shown.

Example process 900 begins at step 902 with receiving perception inputs generated by a first sensor device located in the physical environment and continues at step 904 with receiving perception inputs from a second sensor device located in the physical environment. In some embodiments, the perception inputs may include images received from cameras, results of processing such images (e.g., disparity images, depth values, semantic data, etc.), or sensor data from one or more other types of sensors.

The two sensor devices may be associated with different devices at different locations in the physical environment. For example, the first sensor device may be a first camera on board a UAV 100 while the second sensor device is a second camera associated with a user's mobile device 104 (e.g., as depicted in FIG. 8). Similarly, the first sensor device may be a first camera on board a first UAV while the second sensor device is a second camera on board a second UAV.

In some embodiments, the first sensor device and sensor devices may be different types of sensor devices. For example, the first sensor device may be an optical sensor device such as a camera while the second sensor device is proximity sensor or range sensor.

Example process 900 continues at step 906 with fusing or combining the perception inputs generated by the first sensor device with the perception inputs generated by the second sensor device to produce fused or combined perception inputs. In some embodiments, the fused or combined perception inputs may include a collection of all the perception inputs received at steps 902 and 904. In other words, step 906 may include aggregating the perception inputs from multiple sources. Alternatively or in addition, the fused or combined perception inputs may represent a combined processing of the perception inputs at step 902 and 904, for example, to normalize the perception input data, supplement one source or the other, etc. For example, portions of the perception inputs from a first sensor device that are determined to be unreliable (e.g., due to errors in the data) can be supplemented in part using perception inputs from the second sensor device.

Example process 900 continues at step 908 with processing the combined perception inputs to detect a physical object in the physical environment and at step 910 with estimating a position, orientation, motion, etc. of the detected physical object, for example, as described with respect to steps 705 and 706 in process 700.

In some embodiments, processing the combined perception inputs may include processing at least some of the perception inputs received from both the first sensor device and second sensor device to detect a physical object in the physical environment and estimate a position, orientation, motion, etc. of the detected physical object. For example, perception inputs from both the first sensor device and second sensor device may be input into a machine-learning model (e.g., an artificial neural network with deep learning) that is trained for object detection and tracking.

Alternatively, or in addition, processing the combined perception inputs may include a pre-processing stage during which the perception inputs from the multiple sources are aggregated, transformed, normalized, supplemented, etc. before being input, for example, into a machine-learning model that is trained for object detection and tracking.

The estimated position and/or orientation of the detected physical object can be used to inform various other processes. For example, in some embodiments, an autonomous aerial vehicle such as UAV 100 may utilize the position and/or orientation estimates to inform the motion planning process. Further, in some embodiments, the estimated position and/or orientation of the detected object may be used to update a shared virtual environment, for example, as described with respect to step 708 in process 700.

Identifying Objects for Image Capture by an Aerial Vehicle

In some embodiments, a user can identify objects or other portions of the physical environment for image capture by an aerial vehicle such as UAV 100 by capturing images of the objects and/or portions of the physical environment using a separate camera at a mobile device. Using such a technique, the user can intuitively identify an object for image capture, for example, by pointing a camera associated with a mobile device at the object. Using the perception inputs from the mobile device 104, a system can determine which physical object in the physical environment has been identified, determine the position of the physical object, and determine the relative position between the mobile device and the physical object. This information can then be utilized to autonomously maneuver an aerial vehicle such as UAV 100 to captured images of the identified physical object.

Figure 10:
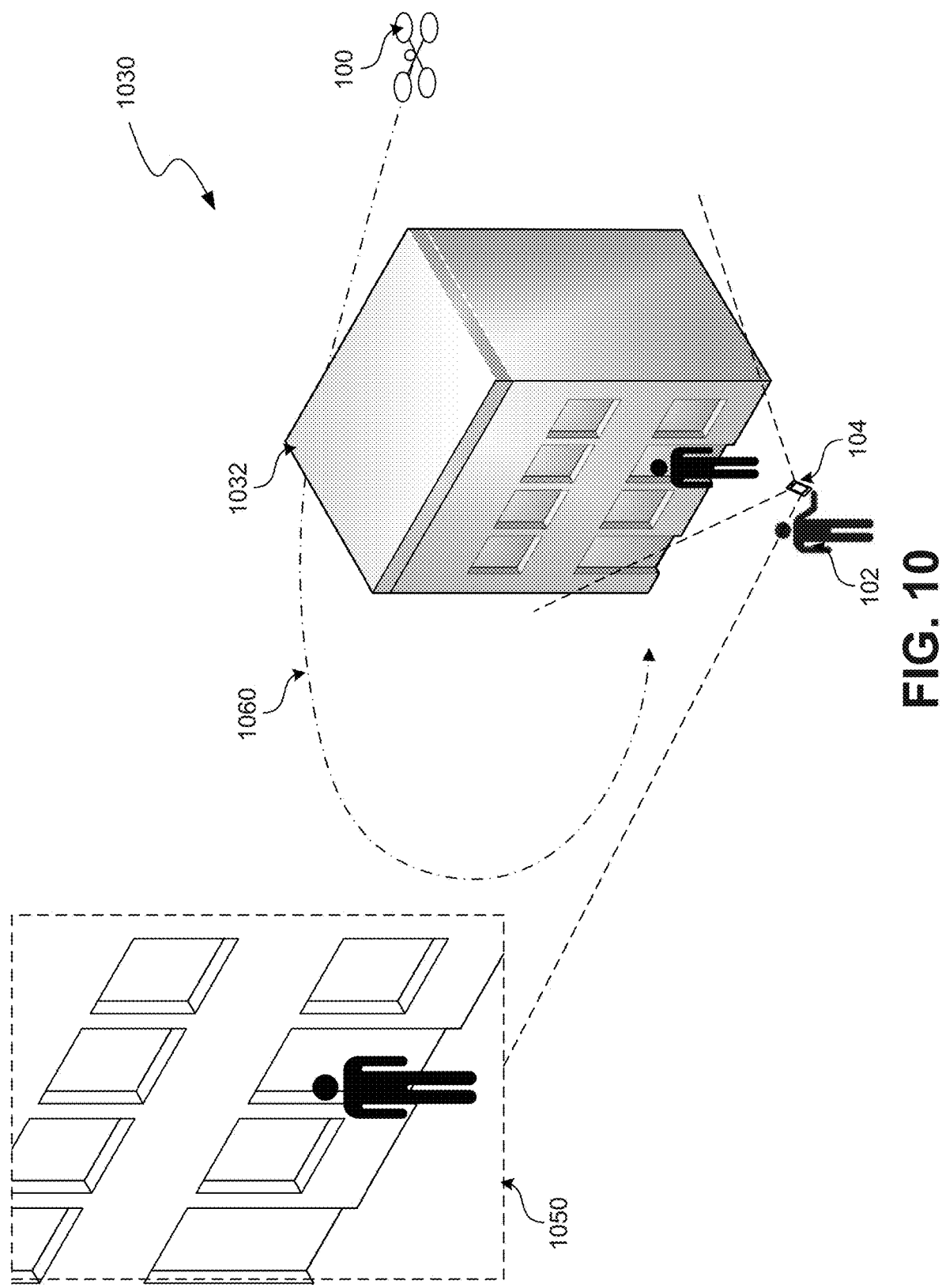
FIG. 10 shows a diagram that illustrates using a mobile device to identify an object for image capture by a UAV.

FIG. 10 illustrates an example scenario in which an object is identified for image capture by an aerial vehicle using a mobile device. Specifically, FIG. 10 depicts an autonomous UAV 100 in flight through a physical environment 1030 that includes a physical object 1032 in the form of a building. Also occupying the physical environment 630 is a user 102 with an associated mobile device 104. Instead of inputting flight control commands (either direct or indirect) to the UAV 100 to fly to a particular position and capture images of the building 1032, the user 102 may point the mobile device 104 at the building 1032. For example, in this scenario, the mobile device 104 includes a camera. The view captured by the camera of the mobile device 104 is depicted at detail 1050.

A processing system, for example, associated with navigation system 120, can analyze the images captured by the mobile device 104 to determine that an object captured in the images corresponds to a physical object in the physical environment such as building 1032. For example, the processing system may detect and recognize various objects captured in the images by processing the images using one or more machine-learning models. In some embodiments, a convolutional neural network applying deep learning can be utilized to process images for object detection and recognition. The detection and recognition of objects based on captured images is described in more detail with regard to FIGS. 16-24.

In some embodiments, the detection and recognition of objects can be used to extract or generate semantic understanding of the scene captured in images. For example, the image captured by mobile device 104 that is depicted at detail 1050 can be processed (e.g., using machine-learning models) to determine that the captured image depicts a person standing in front of building 1032. Further, by fusing this semantic information regarding the objects captured with information regarding the position and or orientation of the mobile device 104 (e.g., based on a GPS receiver and/or other motion sensors in the mobile device), the processing system can estimate a position and/or orientation of the camera in the physical environment 1030 and an intended object for image capture. This information can then be used as an input to a navigation system 120 of the UAV 100 to guide autonomous behavior of the UAV 100. For example, in response to the user 102 pointing the camera of the mobile device 104 at the building 1032, a navigation system 120 may generate control commands configured to cause the UAV 100 to autonomously fly along a planned trajectory 1060 to capture images of the building 1032 from a position and orientation that corresponds with the position and/or orientation of the camera of the mobile device 104. In response to the user's selection (i.e., by pointing the camera at the building), the UAV 100 may also maneuver along a predetermined or selected pattern to capture various angles of the building 1032 even if they do not directly correspond to position and/or orientation of the mobile device 104.

Figure 11:
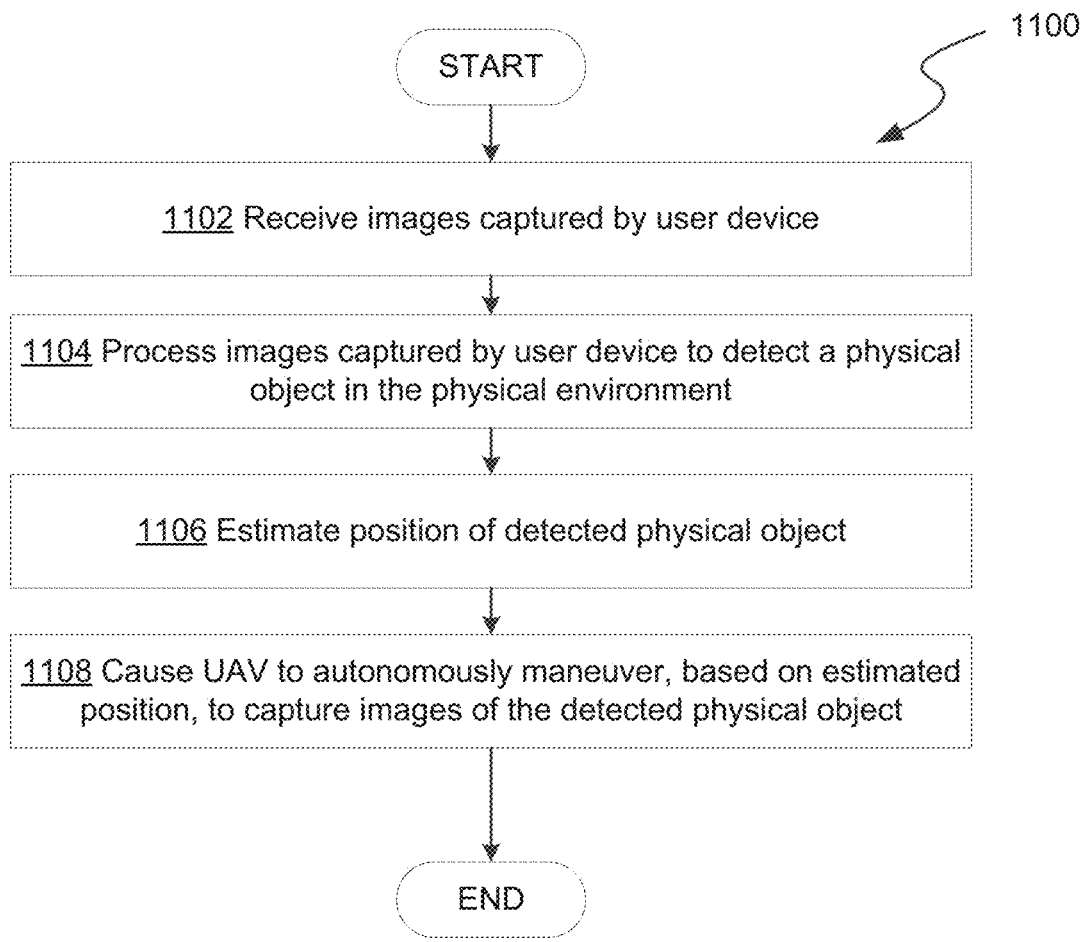
FIG. 11 shows a flow diagram of an example process for identifying an object for image capture by a UAV.

FIG. 11 shows a flow diagram of an example process 1100 for identifying objects for image capture by an autonomous aerial vehicle such as UAV 100. One or more steps of the example process 1100 may be performed by any one or more of the components of the example systems described with respect to FIG. 25 or 26. For example, the process 1100 depicted in FIG. 11 may be represented in instructions stored in memory that are then executed by a processing unit. The process 1100 described with respect to FIG. 11 is an example provided for illustrative purposes and is not to be construed as limiting. Other processes may include more or fewer steps than depicted while remaining within the scope of the present disclosure. Further, the steps depicted in example process 1100 may be performed in a different order than is shown.

Example process 1100 begins at step 1102 with receiving images of a physical environment that are captured by a user device such as mobile device 104.

Example process 1100 continues at step 1104 with processing the received images to detect a physical object in the physical environment and at step 1106 with estimating a position, orientation, motion, etc. of the detected physical object, for example, as described with respect to steps 704 and 706 in example process 700.

Example process 1100 concludes at step 1108 with causing an aerial vehicle such as UAV 100 to autonomously maneuver, based on the estimated position, orientation, motion etc., to capture images of the detected physical object.

In some embodiments, step 1108 may include determining a target position in the physical environment that is within a line of sight of the estimated position of the physical objects, generating a planned trajectory to the target position, and generating control commands configured to cause the aerial vehicle to autonomously maneuver along the planned trajectory to the target position.

In some embodiments, this process of determining the target position and generating the planned trajectory can be performed using a 3D occupancy map that is continually updated based on perception inputs from sensors (including image capture devices 114/115) on board the UAV 100. For example, to determine a target position that is in line of sight to the estimated position of the physical object, a processing system may generate one or more virtual lines in the 3D occupancy map that extend from the estimated position of the physical object to various candidate positions that at least roughly correspond with a position of the device that captured the images (e.g., mobile device 104). One of the candidate positions can then be selected as the target position in response to determining that an associated virtual line does not intersect any of the voxels in the 3D occupancy map (i.e., indicating that the view will not be obfuscated).

As alluded to above, in some embodiments, the target position may correspond with an estimated position of the user device (e.g., mobile device 104) in the physical environment. For example, a mobile device 104 may be equipped with a location sensor (e.g., GPS) and may transmit, for example, via a wireless link, location information including an estimated position of the mobile device to the UAV 100. The motion planner 130 of the UAV 100 can then generate a planned trajectory to a target position that at least roughly corresponds with the estimated position of the mobile device 104. In some embodiments, the target position may be set at a particular altitude (e.g., 30 ft.) above the estimated position of the mobile device 104. In other embodiments, the target position may be set to be as close to the estimated position of the mobile device 104 as possible without risking collision with the ground or other objects.

The orientation of an associated image capture device 115 can also be adjusted, for example using a gimbal mechanism, to capture images of the detected physical object. Accordingly, although not depicted in FIG. 11, in some embodiments, example process 1100 may continue with causing a gimbal mechanism to adjust an orientation of an image capture device 115 associated with the UAV 100 such that the physical object remains in a field of view (FOV) of the image capture device 115 while capturing images of the physical environment. In other words, the gimbal mechanism can be actuated while the UAV 100 is autonomously maneuvering to track the estimated position of the physical object.

Augmented Reality Applications

In some embodiments, a shared virtual environment, for example, based on perception inputs from aerial vehicles, can be utilized for various augmented reality (AR) applications. Devices configured for augmented reality (AR devices) can deliver to a user a direct or indirect view of a physical environment which includes objects that are augmented (or supplemented) by computer-generated sensory outputs such as sound, video, graphics, or any other data that may augment (or supplement) a user's perception of the physical environment. For example, graphical virtual objects (e.g., 3D objects) can be displayed to a user in the form of graphical overlays via an AR device while the UAV 100 is in flight through the physical environment and/or as an augmentation to video recorded by the UAV 100 after the flight has completed. Examples of AR devices that may be utilized to implement such functionality include smartphones, tablet computers, laptops, head mounted display devices (e.g., Microsoft HoloLens™, Google Glass™), virtual retinal display devices, heads up display (HUD) devices in vehicles, etc. For example, the previously mentioned mobile device 104 may be configured as an AR device. Note that for illustrative simplicity the term AR device is used herein to describe any type of device capable of presenting augmentations (visible, audible, tactile, etc.) to a user. The term "AR device" shall be understood to also include devices not commonly referred to as AR devices, such as virtual reality (VR) headset devices (e.g., Oculus Rift™).

Figure 12:
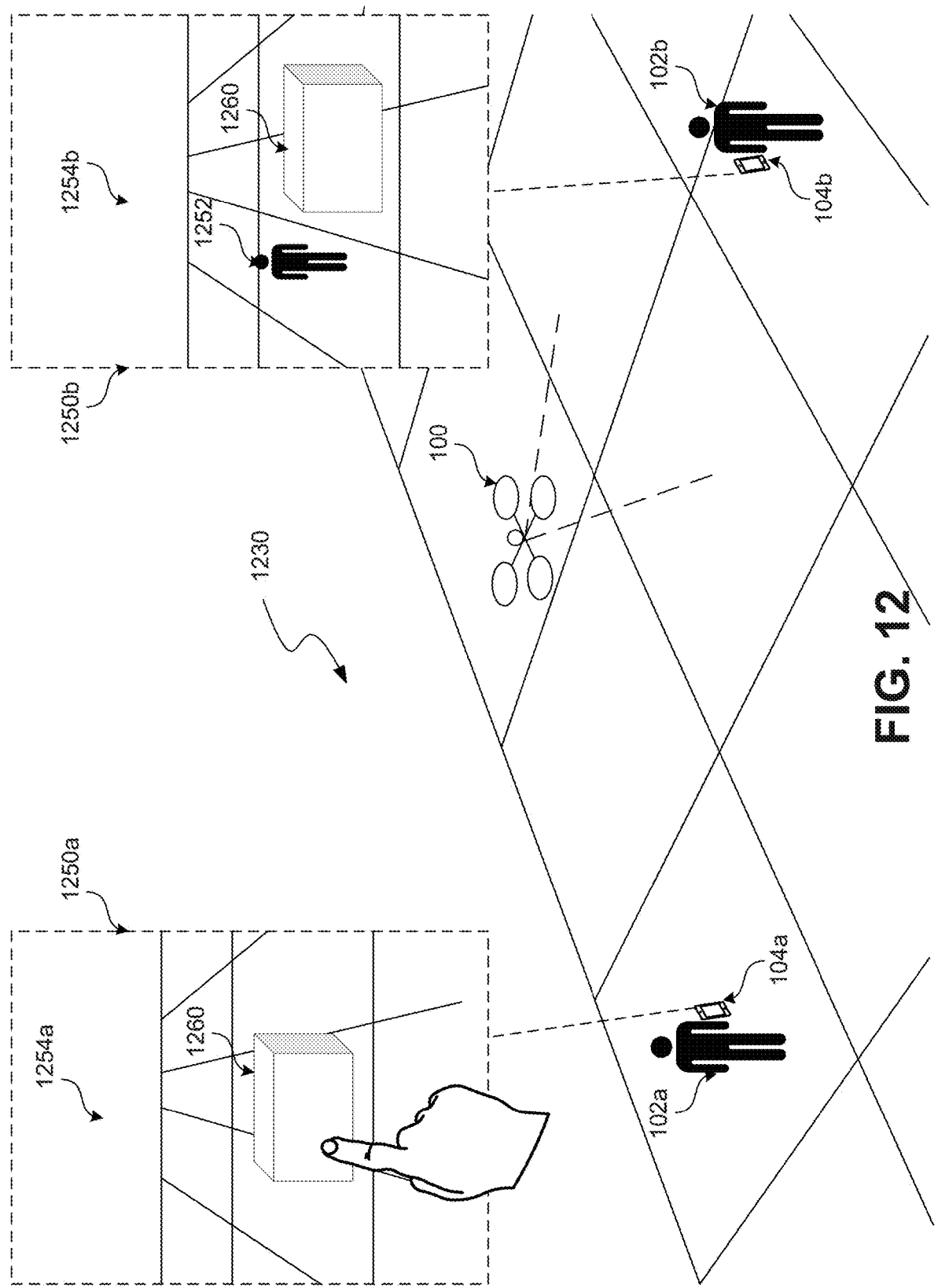
FIG. 12 shows a diagram that illustrates an augmented reality application for a UAV.

FIG. 12 illustrates an example AR application using an autonomous aerial vehicle such as a UAV 100. Specifically, FIG. 12 depicts a UAV 100 in autonomous flight in a physical environment 1230. Also occupying the physical environment 1230 are two users 102a and 102b with associated mobile devices 104a and 104b (respectively). In an example embodiment, a first user 102a can place a virtual object into a shared virtual environment corresponding to the physical environment 1230. For example, detail 1250a shows a view of a representation 1254a of the physical environment 1230 presented at the mobile device 104a of the first user 102a. The representation 1254a of the physical environment 730 may comprise live video captured at the mobile device and/or rendered graphical elements (e.g., 3D models, etc.) of the shared virtual environment from a virtual camera corresponding to the location of the mobile device. In the depicted example, the first user 102a places a virtual graphical object 1260 (e.g., a 3D cube object) into the shared virtual environment, for example, by dragging the virtual graphical object 1260 into the representation 1254a of the physical environment 1230.

The virtual graphical object 1260 then exists in the shared virtual environment at a location corresponding to a particular location in the physical environment 1230 and is therefore accessible to other users via other devices. For example, detail 1250b shows a view of a representation 1254b of the physical environment 1230. The representation 1254b of the physical environment 730 may comprise live video captured at the UAV 100 and/or rendered graphical elements (e.g., 3D models, etc.) of the shared virtual environment from a virtual camera corresponding to the location of the UAV 100. As shown in detail 1250b, the view shows a representation 1252 of the second user 102b captured by the UAV 100 as well as the virtual graphical object 1260 placed by the first user 102a. In some embodiments, the virtual graphical objects (e.g., object 1260) are automatically composited into video captured by the UAV 100 in real-time, near real-time, or after the UAV 100 has completed its flight. Alternatively, or in addition, such graphical virtual objects may be displayed as overlays using a see-through screen of a head-mounted AR display device such as Microsoft HoloLens™ or Google Glass™.

Similarly, any number of other users may place virtual objects (graphical or otherwise) into the shared virtual environment at locations corresponding to particular locations in the physical environment 1230. Virtual objects may be designated for public access (i.e., viewable via all devices), or for limited access (i.e., viewable only through authorized devices), by setting permissions for the virtual objects. For example, a user placing a virtual object into the shared virtual environment can designate the object to be accessible only to other users authorized by the placing user, such as friends in a social media network (e.g., Facebook™).

Figure 13:
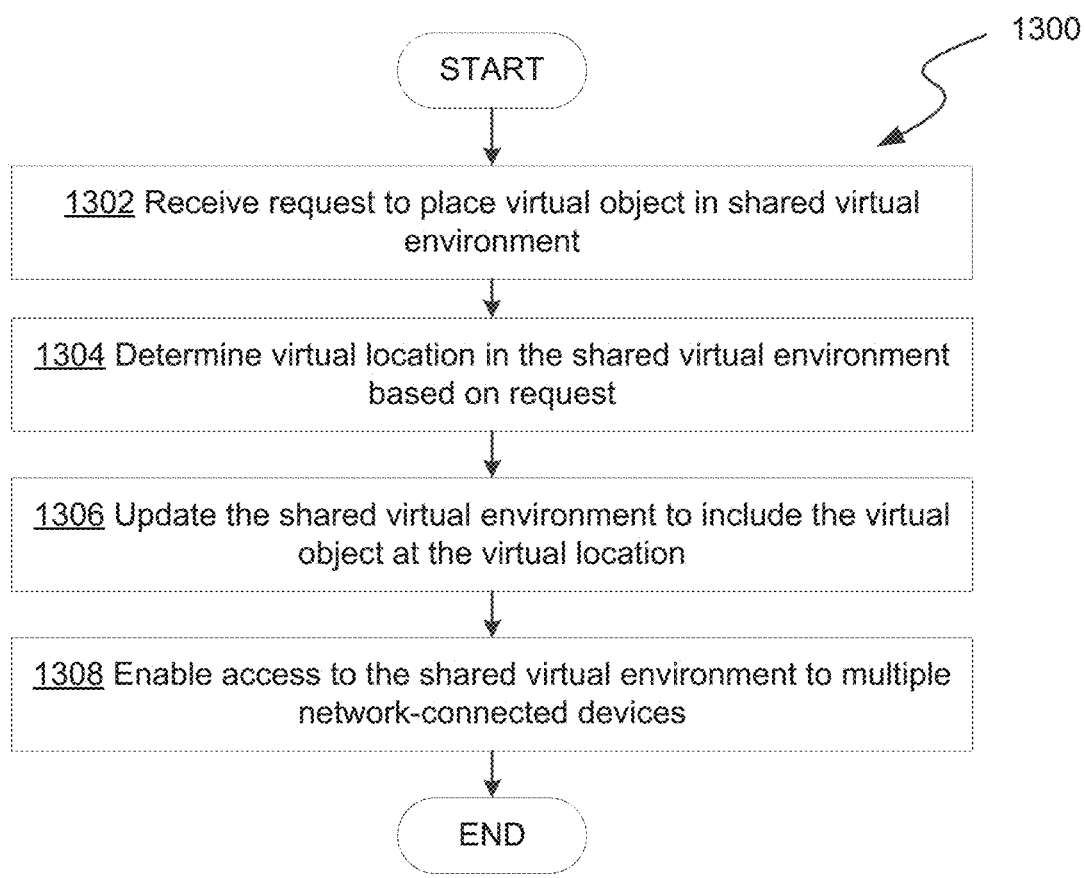
FIG. 13 shows a flow diagram of an example process for placing virtual objects in a shared virtual environment.

FIG. 13 shows a flow diagram of an example process 1300 for utilizing virtual objects in a shared virtual environment. One or more steps of the example process 1300 may be performed by any one or more of the components of the example systems described with respect to FIG. 25 or 26. For example, the process 1300 depicted in FIG. 13 may be represented in instructions stored in memory that are then executed by a processing unit. The process 1300 described with respect to FIG. 13 is an example provided for illustrative purposes and is not to be construed as limiting. Other processes may include more or fewer steps than depicted, while remaining within the scope of the present disclosure. Further, the steps depicted in example process 1300 may be performed in a different order than is shown.

Example process 1300 begins at step 1302 with receiving a request from a user device to place a virtual object in a shared virtual environment. For example, as described with respect to FIG. 12, a user 102a may input a request to place a virtual object 1260 (e.g., a 3D cube object) into a shared virtual environment, for example, by dragging a representation of the virtual object 1260 into the representation 1254a of the shared virtual environment or the physical environment 1230. In an example embodiment, a user may select a particular virtual object, for example, from a library of multiple available virtual objects and drag the representation (e.g., an icon or some other rendering) of the virtual object into a rendered view of the shared virtual environment, or a physical environment to place the virtual object at a particular location in the shared virtual environments. This is just an example interface mechanism provided for illustrative purposes and is not to be construed as limiting.

Example process 1300 continues at step 1304 with determining a virtual location in the shared virtual environment to place the virtual object. In some embodiments, user may expressly specify a location, for example, by inputting a coordinate value associated with the request. Alternatively, the virtual location may be specified based on how the request is input at the user device. For example, if a touch-based gesture input is used to drag and drop an icon into a displayed view of the shared virtual environment, the virtual location to place the virtual object can be determined based on where in the displayed view the icon is placed. Again, this is just an example interface mechanism provided for illustrative purposes and is not to be construed as limiting.

Example process 1300 continues at step 1306 with updating the shared virtual environment to include the virtual object at the virtual location in the shared virtual environment specified based on the request, for example, as described with respect to step 708 in process 700.

Example process 1300 concludes at step 1308 with enabling access to the shared virtual environment to multiple different network-connected user devices, for example, as described with respect to step 710 in process 700.

In some embodiments, step 1308 may include displaying or causing display of a view of the virtual object at a network-connected user device such as a mobile device 104. Because the shared virtual environment is representative of the physical environment, the virtual location where the virtual object is placed will correspond with a particular physical location in the physical environment. Accordingly, in some embodiments, the virtual object can be viewable as a graphical augmentation via an AR device when the AR device is in proximity to the particular location in the physical environment, for example, as described with respect to FIG. 12.

Figure 14:
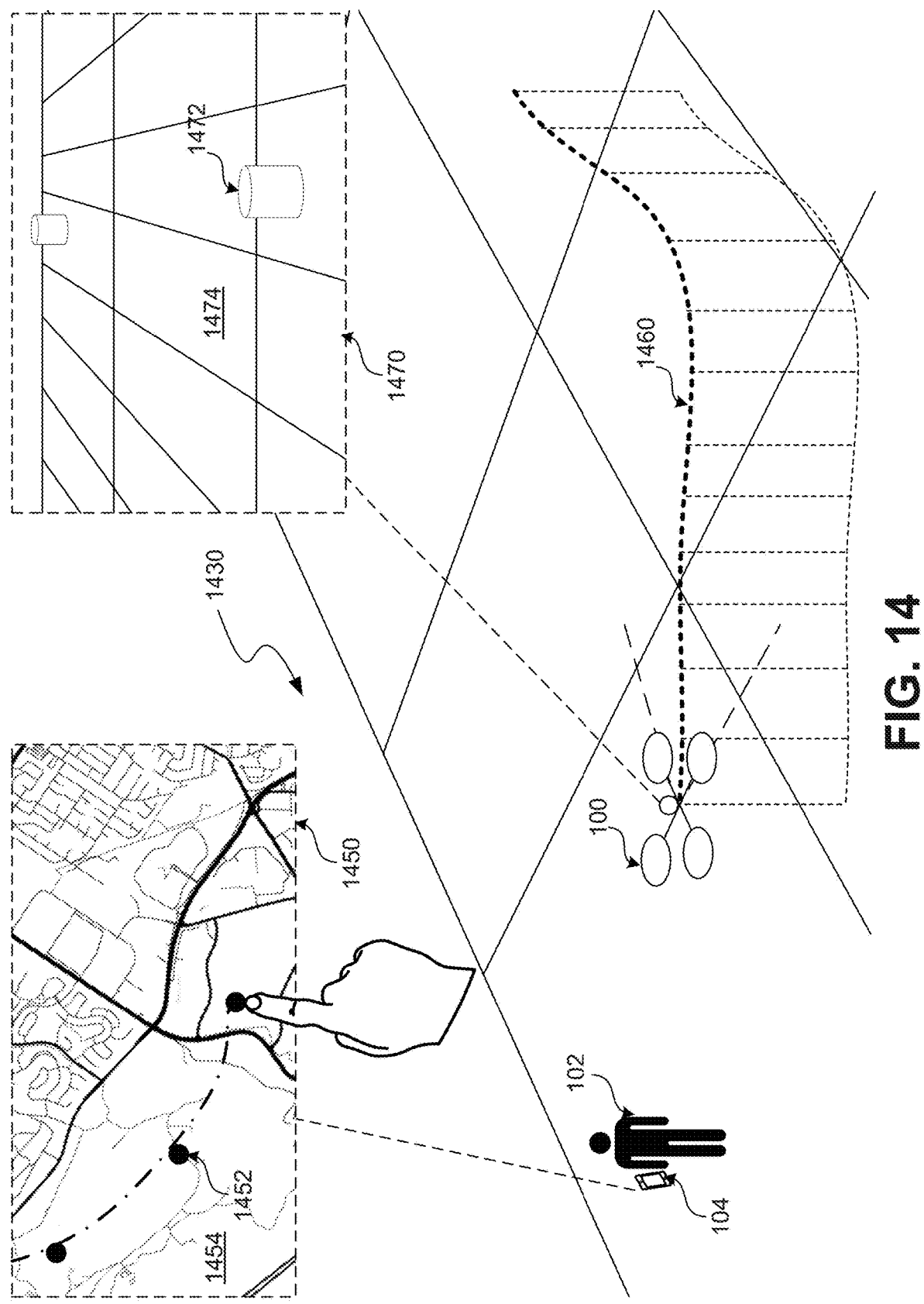
FIG. 14 shows a diagram that illustrates using virtual objects in a shared virtual environment to guide autonomous flight by a UAV.

Virtual objects placed by users may be passive in that they are only perceived and incorporated into a presentation (video or otherwise) to a user. Alternatively, or in addition, virtual objects placed in the shared virtual environment can impact behavior by the autonomous UAV 100. For example, a user may place virtual objects in a shared virtual environment that function as waypoints or other navigational indicators to guide autonomous flight by the UAV 100. For example, FIG. 14 illustrates an example AR application that involves placing virtual navigational markers in a shared virtual environment. Specifically, FIG. 14 depicts a UAV 100 in autonomous flight through a physical environment 1430. A user 102 can place virtual objects into a shared virtual environment corresponding to the physical environment 1430 to guide autonomous flight by the UAV 100. In FIG. 14, detail 1450 shows a view of a representation 1454 of the physical environment 1430 in the form of an overhead 2D map of the physical environment 1430. Using a device (e.g., mobile device 104), a user can place virtual objects 1452 into the shared virtual environment, for example, using a touch screen interface.

The virtual objects 1452 may function as navigational markers that guide autonomous navigation of the UAV 100 through the physical environment 1430. Specifically, the navigation system 120 of the UAV 100 may generate control commands configured to cause the UAV 100 to follow a flight path 1460 that is based at least in part on the positions of one or more virtual objects 1452 placed by the user. Note, the navigation system 120 may still cause the UAV 100 to deviate from the flight path 1460, for example, to avoid collision with obstacles and/or to satisfy other navigational objectives.

In some embodiments, the user 102 may tag such navigational markers with various objectives (besides flyby) for the UAV 100. For example, using a mobile device 104, the user 102 may place a virtual object 1452 and define a set of behavioral objectives (e.g., hover/circle for a period of time, land, fly at set altitude, capture video, track physical objects, etc.) for the autonomous UAV 100 when it approaches or reaches an area in the physical environment 1430 that corresponds with an area in the shared virtual environment in which the virtual object 1452 was placed. Similarly, other users (e.g., any users and/or specifically authorized users such as friends of user 102) may also place virtual objects to impact the autonomous flight of the UAV 100.

In some embodiments, virtual objects 1452 may be presented to users as augmentations, for example, in a view from a camera on board the UAV 100. For example, detail 1470 shows a view of a representation 1474 of the physical environment 1430. The representation 1474 of the physical environment 1430 may comprise video captured at the UAV 100 and/or rendered graphical elements (e.g., 3D models, etc.) of the shared virtual environment from a virtual camera corresponding to the location of the UAV 100. As shown in detail 1470, graphical virtual objects 1472 (corresponding to placed virtual objects 1452) are rendered as augmentations in the view of the representation 1474 of the physical environment 1430. As described with respect to FIG. 12, these augmentations may involve compositing (in real time, near real-time, or post production) the rendered graphical objects 1472 with video captured by the UAV 100 and/or displaying the rendered graphical objects as overlays using a see-through screen of a head-mounted AR display device such as Microsoft HoloLens™ or Google Glass™.

Figure 15:
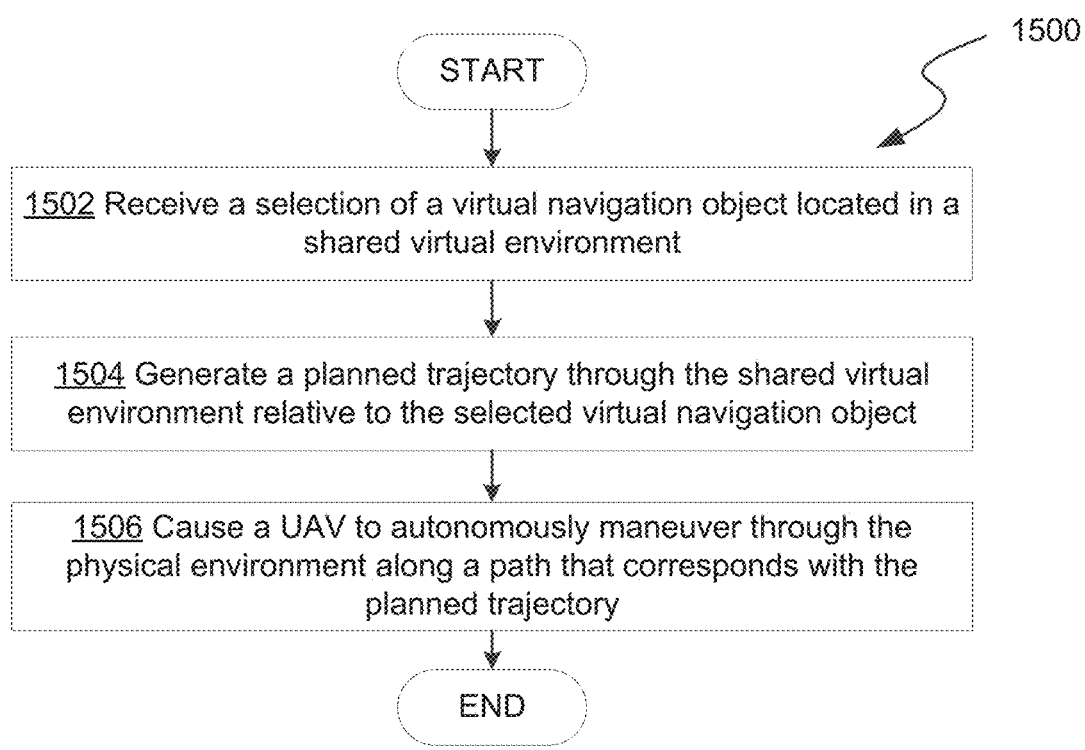
FIG. 15 shows a flow diagram of an example process for autonomously maneuvering a UAV using virtual navigation objects in a shared virtual environment.

FIG. 15 shows a flow diagram of an example process 1500 for utilizing virtual objects for autonomous navigation. One or more steps of the example process 1500 may be performed by any one or more of the components of the example systems described with respect to FIG. 25 or 26. For example, the process 1500 depicted in FIG. 15 may be represented in instructions stored in memory that are then executed by a processing unit. The process 1500 described with respect to FIG. 15 is an example provided for illustrative purposes and is not to be construed as limiting. Other processes may include more or fewer steps than depicted while remaining within the scope of the present disclosure. Further, the steps depicted in example process 1500 may be performed in a different order than is shown.

Example process 1500 begins at step 1502 with receiving a signal indicative of a user selection of a virtual navigation object located in a shared virtual environment from a user device such as mobile device 104. For example, as described with respect to FIG. 14, a user may interact with a mobile device 104 to either place a virtual object in a shared virtual environment or select an existing virtual object that was previously placed in the shared virtual environment. The virtual object can be used to guide autonomous navigation by an aerial vehicle such as UAV 100 and is therefore referred to as a "virtual navigation object." In an example illustrative embodiment, a selectable virtual navigation object is displayed to the user in a view of the shared virtual environment that is displayed, for example, at a touch screen display of the mobile device 104 or as a visual augmentation at an AR device. The user can select the virtual navigation object, for example, by touching a portion of the displayed view that corresponds to a rendered representation of the virtual navigation object.

Example process 1500 continues at step 1504 with generating a planned trajectory through the shared virtual environment relative to the virtual navigation object. In other words, step 1504 may include generating a planned trajectory that is based, at least in part, on the virtual position of the selected virtual navigation object (and any other selected virtual navigation objects) in the shared virtual environment. Because the shared virtual environment is representative of the physical environment, the virtual location where the virtual navigation object is located will correspond with a particular physical location in the physical environment. Accordingly, the planned trajectory in the shared virtual environment will correspond with a counterpart flight path for the aerial vehicle in the physical environment. Further, as previously discussed, the shared virtual environment may comprise a continually updated 3D occupancy map that includes voxels that correspond to occupied portions of space in the physical environment. Since the 3D occupancy map is continually updated (e.g., based on perception inputs from multiple device) a motion planner 130 associated with the UAV 100 can generate a 3D planned trajectory based on a location of the virtual navigation object in the 3D occupancy map that also avoids the voxels.

The manner in which the planned trajectory is generated relative to the position of the virtual navigation object can depend on behavioral objectives associated with the virtual navigation object. A behavioral objective associated with a virtual navigation object can set parameters for guiding the behavior of an autonomous aerial vehicle when the autonomous aerial vehicle in proximity (e.g., a threshold distance) to a physical location in the physical environment that corresponds to a virtual location of the virtual navigation object in the shared virtual environment. In a straightforward example, a behavioral object can be set to cause an aerial vehicle to fly over a position in the physical environment that corresponds with a position of the virtual navigation object in the shared virtual environment. In this example, the motion planner 130 may generate a planned trajectory that passes over (or in close proximity to) a location of the virtual navigation object in the shared virtual environment.

Other more complicated behavioral objectives can also be associated with virtual navigation objects. For example, a behavioral objective can be configured that causes an autonomous aerial vehicle to hover at a particular altitude at a physical location in the physical environment that corresponds to a virtual location of the virtual navigation object in the shared virtual environment. As another example, a behavioral objective can be configured that causes an autonomous aerial vehicle to circle or fly some other preset pattern when in proximity to a physical location in the physical environment that corresponds to a virtual location of the virtual navigation object in the shared virtual environment. As another example, a behavioral objective can be configured that causes an autonomous aerial vehicle to initiate image capture (e.g., using image capture device 115) when in proximity to a physical location in the physical environment that corresponds to a virtual location of the virtual navigation object in the shared virtual environment. As another example, a behavioral objective can be configured that causes an autonomous aerial vehicle to begin tracking any available subjects (e.g., human subjects) when in proximity to a physical location in the physical environment that corresponds to a virtual location of the virtual navigation object in the shared virtual environment. These are just example behavioral objectives that can be associated with a virtual navigation object and are not to be construed as limiting. Other types of behavioral objectives can similarly be associated with a virtual navigation object.

Example process 1500 concludes at step 1506 with causing the autonomous aerial vehicle to maneuver through the physical environment along a path that corresponds with the planned trajectory generated at step 1504.

Localization

Figure 16:
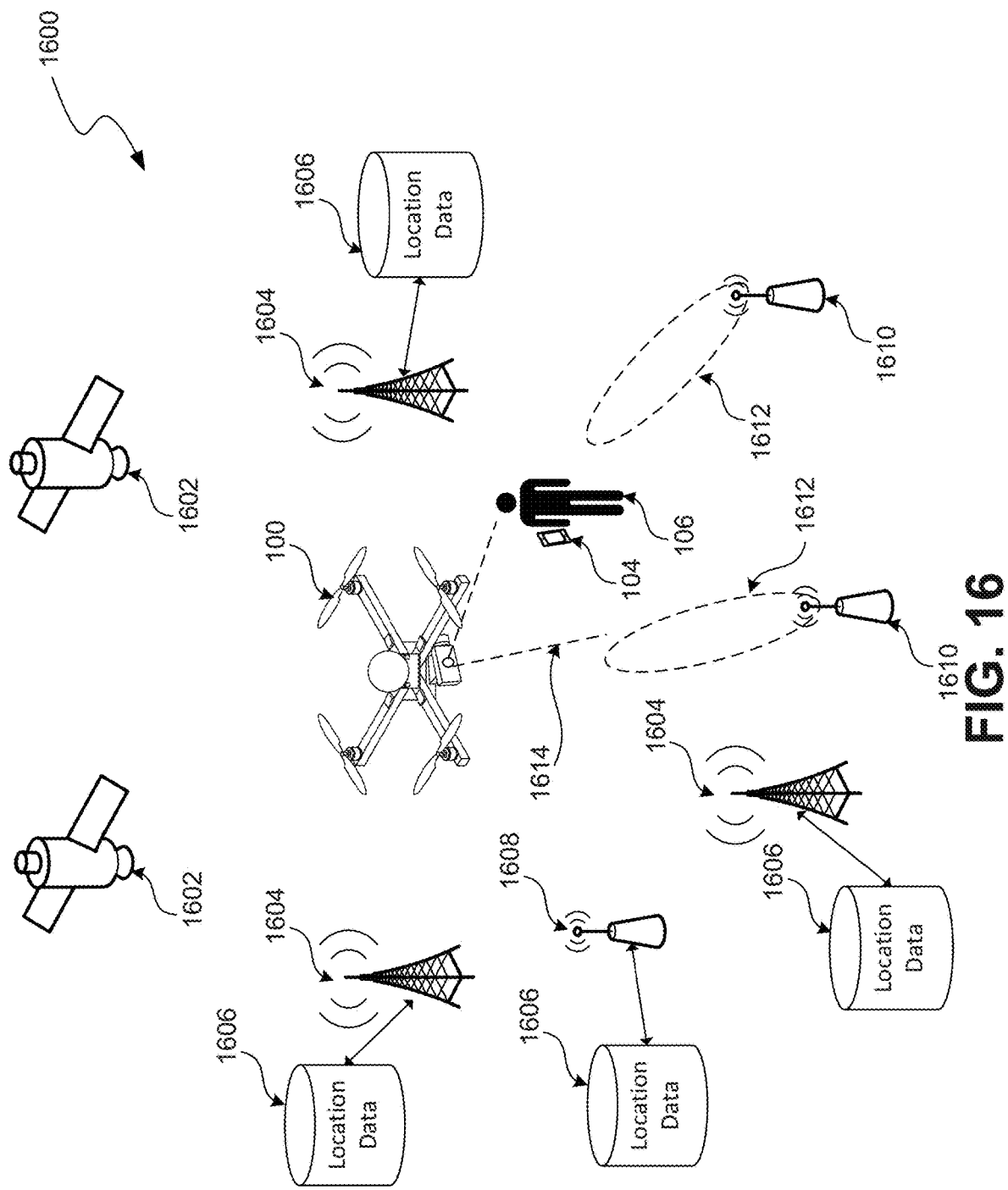
FIG. 16 shows a diagram of an example localization system with which at least some operations described in this disclosure can be implemented.

A navigation system 120 of a UAV 100 may employ any number of other systems and techniques for localization. FIG. 16 shows an illustration of an example localization system 1600 that may be utilized to guide autonomous navigation of a vehicle such as a UAV 100. In some embodiments, the positions and/or orientations of the UAV 100 and various other physical objects in the physical environment can be estimated using any one or more of the subsystems illustrated in FIG. 16. By tracking changes in the positions and/or orientations over time (continuously or at regular or irregular time intervals (i.e., continually)), the motions (e.g., velocity, acceleration, etc.) of UAV 100 and other objects may also be estimated. Accordingly, any systems described herein for determining position and/or orientation may similarly be employed for estimating motion.

As shown in FIG. 16, the example localization system 1600 may include the UAV 100, a global positioning system (GPS) comprising multiple GPS satellites 1602, a cellular system comprising multiple cellular antennae 3004 (with access to sources of localization data 1606), a Wi-Fi system comprising multiple Wi-Fi access points 1608 (with access to sources of localization data 1606), and/or a mobile device 104 operated by a user 106.

Satellite-based positioning systems such as GPS can provide effective global position estimates (within a few meters) of any device equipped with a receiver. For example, as shown in FIG. 16, signals received at a UAV 100 from satellites of a GPS system 1602 can be utilized to estimate a global position of the UAV 100. Similarly, positions relative to other devices (e.g., a mobile device 104) can be determined by communicating (e.g., over a wireless communication link 116) and comparing the global positions of the other devices.

Localization techniques can also be applied in the context of various communications systems that are configured to transmit communication signals wirelessly. For example, various localization techniques can be applied to estimate a position of UAV 100 based on signals transmitted between the UAV 100 and any of cellular antennae 1604 of a cellular system or Wi-Fi access points 1608, 1610 of a Wi-Fi system. Known positioning techniques that can be implemented include, for example, time of arrival (ToA), time difference of arrival (TDoA), round trip time (RTT), angle of Arrival (AoA), and received signal strength (RSS). Moreover, hybrid positioning systems implementing multiple techniques such as TDoA and AoA, ToA and RSS, or TDoA and RSS can be used to improve the accuracy.

Some Wi-Fi standards, such as 802.11ac, allow for radiofrequency (RF) signal beamforming (i.e., directional signal transmission using phased-shifted antenna arrays) from transmitting Wi-Fi routers. Beamforming may be accomplished through the transmission of RF signals at different phases from spatially distributed antennas (a "phased antenna array") such that constructive interference may occur at certain angles while destructive interference may occur at others, thereby resulting in a targeted directional RF signal field. Such a targeted field is illustrated conceptually in FIG. 16 by dotted lines 1612 emanating from Wi-Fi routers 1610.

An inertial measurement unit (IMU) may be used to estimate position and/or orientation of a device. An IMU is a device that measures a vehicle's angular velocity and linear acceleration. These measurements can be fused with other sources of information (e.g., those discussed above) to accurately infer velocity, orientation, and sensor calibrations. As described herein, a UAV 100 may include one or more IMUs. Using a method commonly referred to as "dead reckoning," an IMU (or associated systems) may estimate a current position based on previously measured positions using measured accelerations and the time elapsed from the previously measured positions. While effective to an extent, the accuracy achieved through dead reckoning based on measurements from an IMU quickly degrades due to the cumulative effect of errors in each predicted current position. Errors are further compounded by the fact that each predicted position is based on a calculated integral of the measured velocity. To counter such effects, an embodiment utilizing localization using an IMU may include localization data from other sources (e.g., the GPS, Wi-Fi, and cellular systems described above) to continually update the last known position and/or orientation of the object. Further, a nonlinear estimation algorithm (one embodiment being an "extended Kalman filter") may be applied to a series of measured positions and/or orientations to produce a real-time optimized prediction of the current position and/or orientation based on assumed uncertainties in the observed data. Kalman filters are commonly applied in the area of aircraft navigation, guidance, and controls.

Computer vision may be used to estimate the position and/or orientation of a capturing camera (and by extension a device to which the camera is coupled), as well as other objects in the physical environment. The term, "computer vision" in this context may generally refer to any method of acquiring, processing, analyzing and "understanding" captured images. Computer vision may be used to estimate position and/or orientation using a number of different methods. For example, in some embodiments, raw image data received from one or more image capture devices (onboard or remote from the UAV 100) may be received and processed to correct for certain variables (e.g., differences in camera orientation and/or intrinsic parameters (e.g., lens variations)). As previously discussed with respect to FIG. 1A, the UAV 100 may include two or more image capture devices 114/115. By comparing the captured image from two or more vantage points (e.g., at different time steps from an image capture device in motion), a system employing computer vision may calculate estimates for the position and/or orientation of a vehicle on which the image capture device is mounted (e.g., UAV 100) and/or of captured objects in the physical environment (e.g., a tree, building, etc.).

Figure 17:
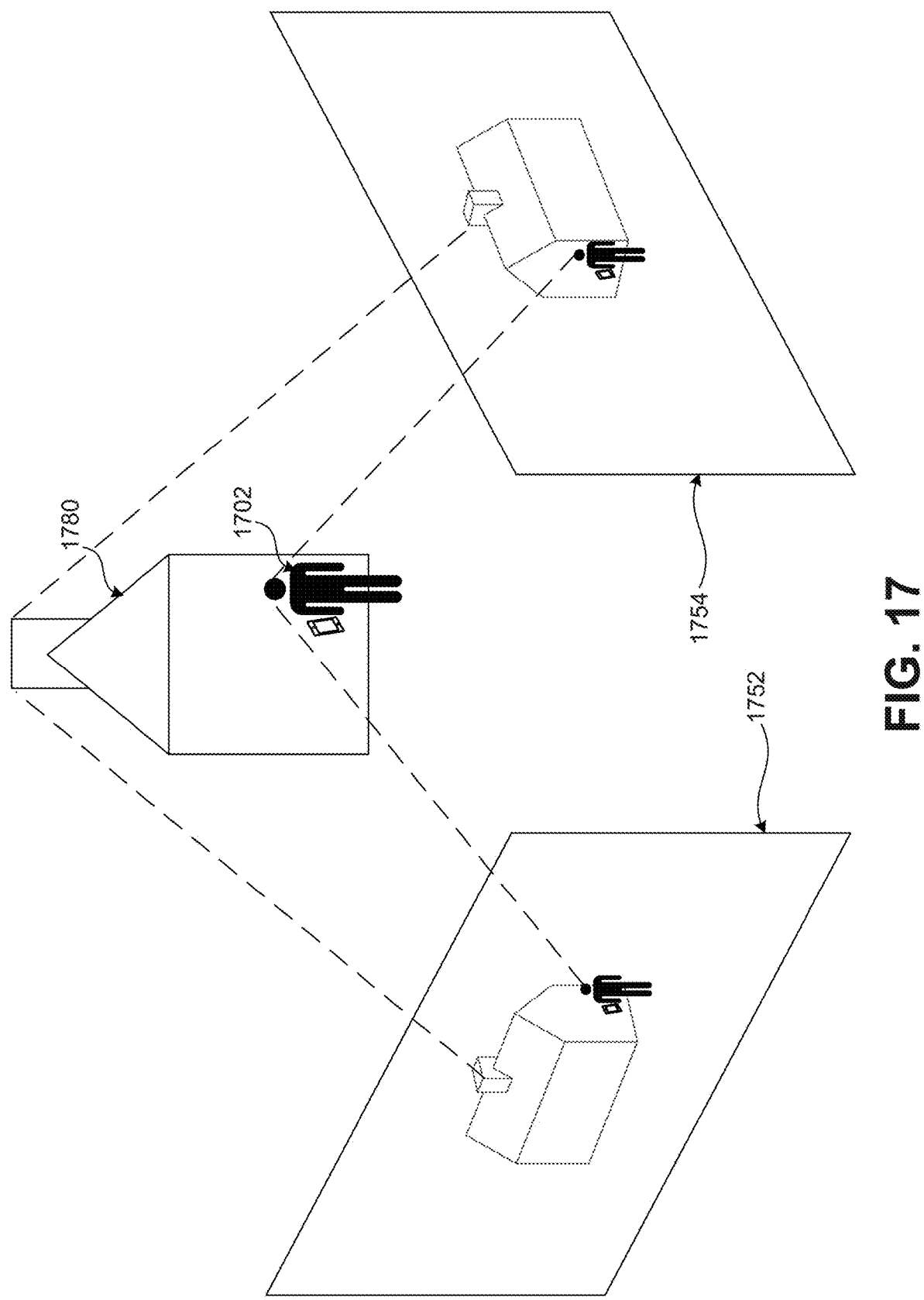
FIG. 17 shows a diagram illustrating the concept of visual odometry based on captured images.

Computer vision can be applied to estimate position and/or orientation using a process referred to as "visual odometry." FIG. 17 illustrates the working concept behind visual odometry at a high level. A plurality of images are captured in sequence as an image capture device moves through space. Due to the movement of the image capture device, the images captured of the surrounding physical environment change from frame to frame. In FIG. 17, this is illustrated by initial image capture FOV 1752 and a subsequent image capture FOV 1754 captured as the image capture device has moved from a first position to a second position over a period of time. In both images, the image capture device may capture real world physical objects, for example, the house 1780 and/or the person 1702. Computer vision techniques are applied to the sequence of images to detect and match features of physical objects captured in the FOV of the image capture device. For example, a system employing computer vision may search for correspondences in the pixels of digital images that have overlapping FOV. The correspondences may be identified using a number of different methods such as correlation-based and feature-based methods. As shown in FIG. 17, features such as the head of a human subject 1702 or the corner of the chimney on the house 1780 can be identified, matched, and thereby tracked. By incorporating sensor data from an IMU (or individual accelerometer(s) or gyroscope(s)) associated with the image capture device to the tracked features of the image capture, estimations may be made for the position and/or orientation of the image capture relative to the objects 1780, 1702 captured in the images. Further, these estimates can be used to calibrate various other systems, for example, through estimating differences in camera orientation and/or intrinsic parameters (e.g., lens variations) or IMU biases and/or orientation. Visual odometry may be applied at both the UAV 100 and any other computing device, such as a mobile device 104, to estimate the position and/or orientation of the UAV 100 and/or other objects. Further, by communicating the estimates between the systems (e.g., via a wireless communication link 116) estimates may be calculated for the respective positions and/or orientations relative to each other. Position and/or orientation estimates based in part on sensor data from an on board IMU may introduce error propagation issues. As previously stated, optimization techniques may be applied to such estimates to counter uncertainties. In some embodiments, a nonlinear estimation algorithm (one embodiment being an "extended Kalman filter") may be applied to a series of measured positions and/or orientations to produce a real-time optimized prediction of the current position and/or orientation based on assumed uncertainties in the observed data. Such estimation algorithms can be similarly applied to produce smooth motion estimations.

In some embodiments, data received from sensors onboard UAV 100 can be processed to generate a 3D map of the surrounding physical environment while estimating the relative positions and/or orientations of the UAV 100 and/or other objects within the physical environment. This process is sometimes referred to as simultaneous localization and mapping (SLAM). In such embodiments, using computer vision processing, a system in accordance with the present teaching, can search for dense correspondence between images with overlapping FOV (e.g., images taken during sequential time steps and/or stereoscopic images taken at the same time step). The system can then use the dense correspondences to estimate a depth or distance to each pixel represented in each image. These depth estimates can then be used to continually update a generated 3D model of the physical environment taking into account motion estimates for the image capture device (i.e., UAV 100) through the physical environment.

Figure 18:
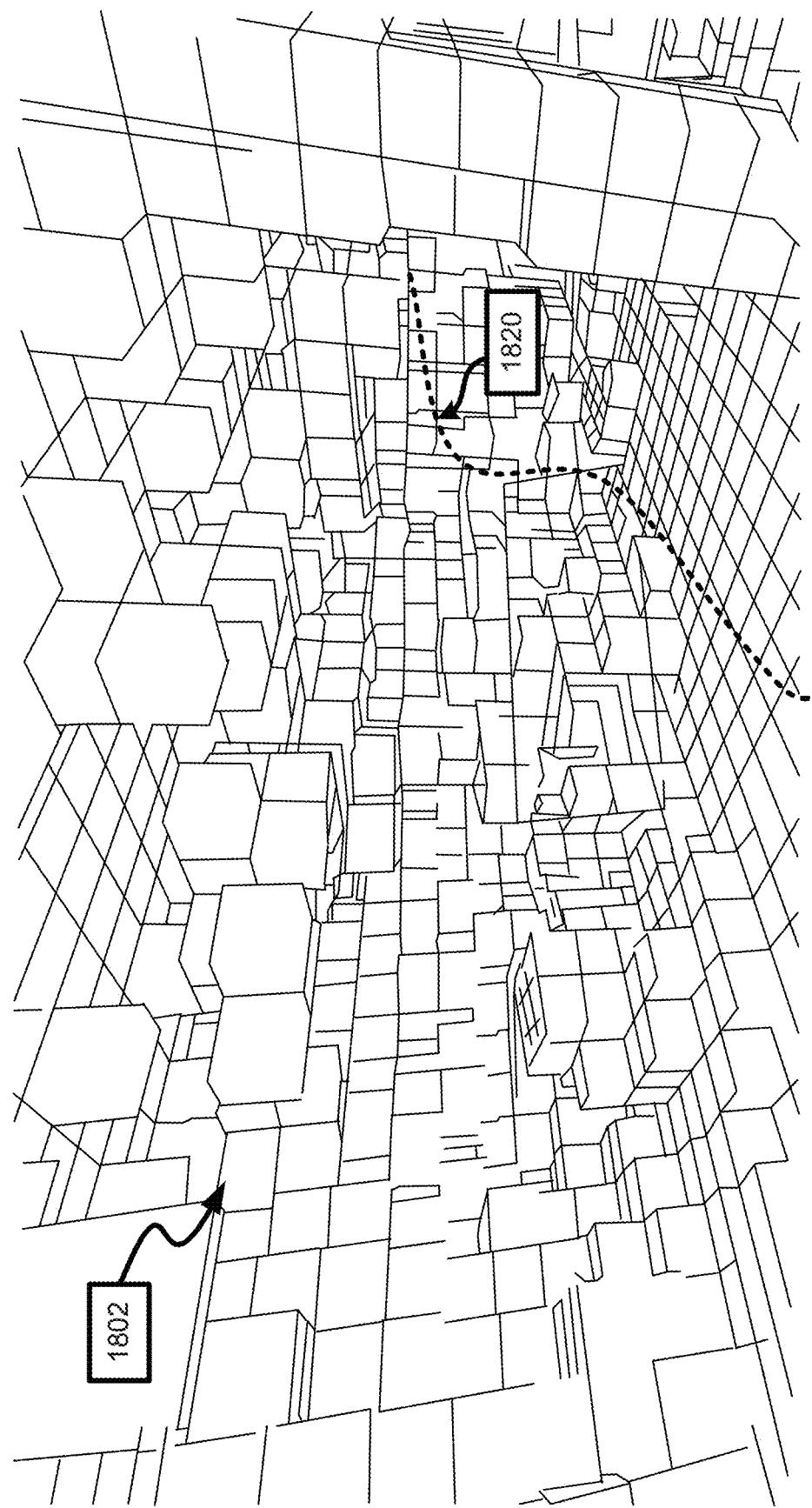
FIG. 18 shows an example view of a three-dimensional (3D) occupancy map of a physical environment.

In some embodiments, a 3D model of the surrounding physical environment may be generated as a 3D occupancy map that includes multiple voxels with each voxel corresponding to a 3D volume of space in the physical environment that is at least partially occupied by a physical object. For example, FIG. 18 shows an example view of a 3D occupancy map 1802 of a physical environment including multiple cubical voxels. Each of the voxels in the 3D occupancy map 1802 correspond to a space in the physical environment that is at least partially occupied by a physical object. A navigation system 120 of a UAV 100 can be configured to navigate the physical environment by planning a 3D trajectory 1820 through the 3D occupancy map 1802 that avoids the voxels. In some embodiments, this 3D trajectory 1820 plan using the 3D occupancy map 1802 can be optimized by applying an image space motion planning process. In such an embodiment, the planned 3D trajectory 1820 of the UAV 100 is projected into an image space of captured images for analysis relative to certain identified high cost regions (e.g., regions having invalid depth estimates).

Computer vision may also be applied using sensing technologies other than cameras, such as light detection and ranging (LIDAR) technology. For example, a UAV 100 equipped with LIDAR may emit one or more laser beams in a scan up to 360 degrees around the UAV 100. Light received by the UAV 100 as the laser beams reflect off physical objects in the surrounding physical world may be analyzed to construct a real-time 3D computer model of the surrounding physical world. Depth sensing through the use of LIDAR may in some embodiments augment depth sensing through pixel correspondence as described earlier. Further, images captured by cameras (e.g., as described earlier) may be combined with the laser constructed 3D models to form textured 3D models that may be further analyzed in real-time or near-real-time for physical object recognition (e.g., by using computer vision algorithms).

The computer vision-aided localization techniques described above may calculate the position and/or orientation of objects in the physical world in addition to the position and/or orientation of the UAV 100. The estimated positions and/or orientations of these objects may then be fed into a motion planner 130 of the navigation system 120 to plan paths that avoid obstacles while satisfying certain objectives (e.g., as previously described). In addition, in some embodiments, a navigation system 120 may incorporate data from proximity sensors (e.g., electromagnetic, acoustic, and/or optics based) to estimate obstacle positions with more accuracy. Further refinement may be possible with the use of stereoscopic computer vision with multiple cameras, as described earlier.

The localization system 1600 of FIG. 16 (including all of the associated subsystems as previously described) is only one example of a system configured to estimate positions and/or orientations of a UAV 100 and other objects in the physical environment. A localization system 1600 may include more or fewer components than shown, may combine two or more components, or may have a different configuration or arrangement of the components. Some of the various components shown in FIG. 16 may be implemented in hardware, software or a combination of both hardware and software, including one or more signal processing and/or application specific integrated circuits.

Object Tracking

A UAV 100 can be configured to track one or more objects, for example, to enable intelligent autonomous flight. The term "objects" in this context can include any type of physical object occurring in the physical world. Objects can include dynamic objects such as a people, animals, and other vehicles. Objects can also include static objects such as landscape features, buildings, and furniture. Further, certain descriptions herein may refer to a "subject" (e.g., human subject 102). The terms "subject" as used in this disclosure may simply refer to an object being tracked using any of the disclosed techniques. The terms "object" and "subject" may, therefore, be used interchangeably.

With reference to FIG. 2, A tracking system 140 associated with a UAV 100 can be configured to track one or more physical objects based on images of the objects captured by image capture devices (e.g., image capture devices 114 and/or 115) onboard the UAV 100. While a tracking system 140 can be configured to operate based only on input from image capture devices, the tracking system 140 can also be configured to incorporate other types of information to aid in the tracking. For example, various other techniques for measuring, estimating, and/or predicting the relative positions and/or orientations of the UAV 100 and/or other objects are described with respect to FIGS. 16-18.

Figure 19:
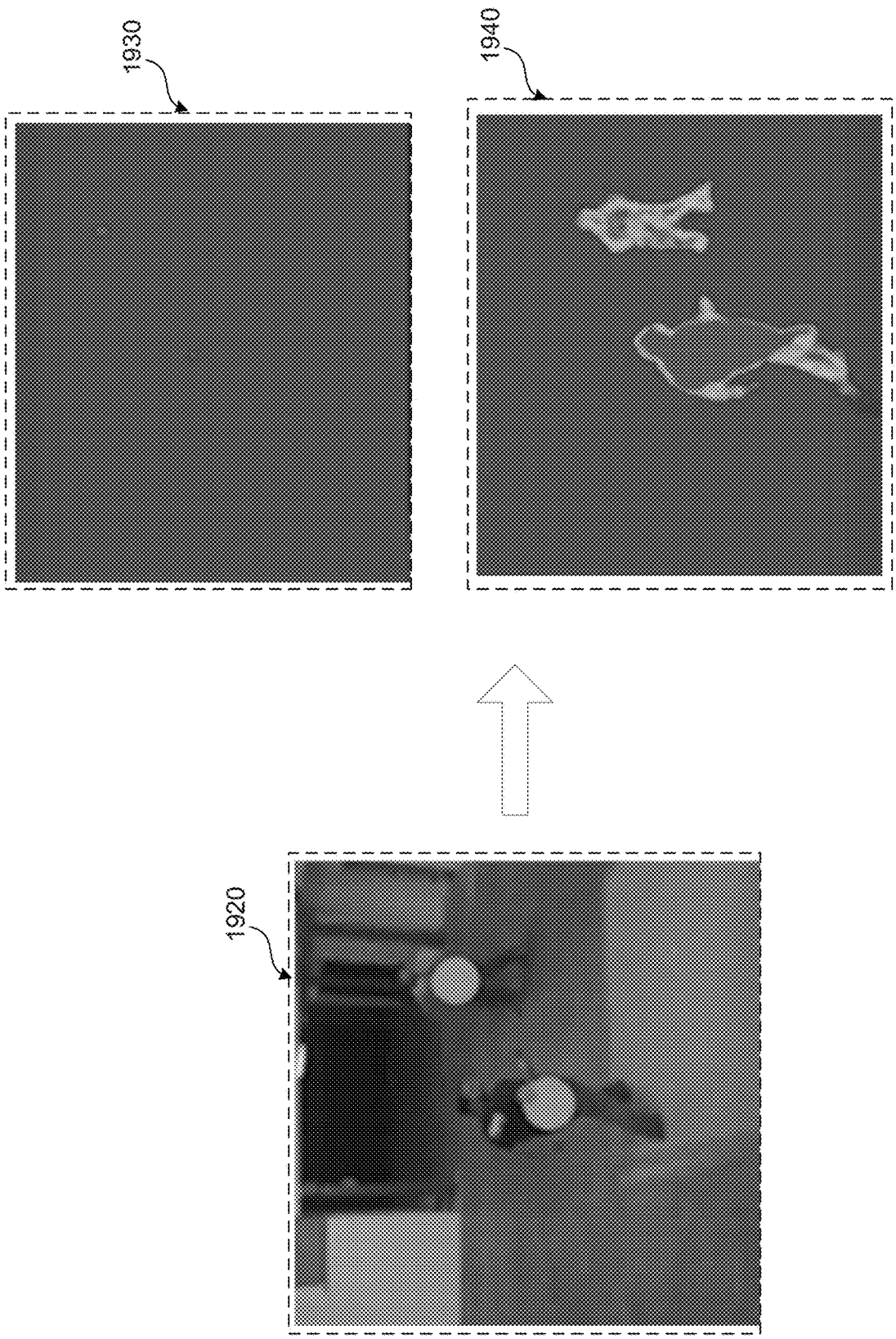
FIG. 19 shows an example image captured by a UAV in flight through a physical environment with associated visualizations of data regarding tracked objects based on processing of the captured image.

In some embodiments, a tracking system 140 can be configured to fuse information pertaining to two primary categories: semantics and 3D geometry. As images are received, the tracking system 140 may extract semantic information regarding certain objects captured in the images based on an analysis of the pixels in the images. Semantic information regarding a captured object can include information such as an object's category (i.e., class), location, shape, size, scale, pixel segmentation, orientation, interclass appearance, activity, and pose. In an example embodiment, the tracking system 140 may identify general locations and categories of objects based on captured images and then determine or infer additional more detailed information about individual instances of objects based on further processing. Such a process may be performed as a sequence of discrete operations, a series of parallel operations, or as a single operation. For example, FIG. 19 shows an example image 1920 captured by a UAV in flight through a physical environment. As shown in FIG. 19, the example image 1920 includes captures of two physical objects, specifically, two people present in the physical environment. The example image 1920 may represent a single frame in a series of frames of video captured by the UAV. A tracking system 140 may first identify general locations of the captured objects in the image 1920. For example, pixel map 1930 shows two dots corresponding to the general locations of the captured objects in the image. These general locations may be represented as image coordinates. The tracking system 140 may further process the captured image 1920 to determine information about the individual instances of the captured objects. For example, pixel map 2440 shows a result of additional processing of image 1920 identifying pixels corresponding to the individual object instances (i.e., people in this case). Semantic cues can be used to locate and identify objects in captured images as well as associate identified objects occurring in multiple images. For example, as previously mentioned, the captured image 1920 depicted in FIG. 19 may represent a single frame in a sequence of frames of a captured video. Using semantic cues, a tracking system 140 may associate regions of pixels captured in multiple images as corresponding to the same physical object occurring in the physical environment.

In some embodiments, a tracking system 140 can be configured to utilize 3D geometry of identified objects to associate semantic information regarding the objects based on images captured from multiple views in the physical environment. Images captured from multiple views may include images captured by multiple image capture devices having different positions and/or orientations at a single time instant. For example, each of the image capture devices 114 shown mounted to a UAV 100 in FIG. 1A may include cameras at slightly offset positions (to achieve stereoscopic capture). Further, even if not individually configured for stereoscopic image capture, the multiple image capture devices 114 may be arranged at different positions relative to the UAV 100, for example, as shown in FIG. 1A. Images captured from multiple views may also include images captured by an image capture device at multiple time instants as the image capture device moves through the physical environment. For example, any of the image capture devices 114 and/or 115 mounted to UAV 100 will individually capture images from multiple views as the UAV 100 moves through the physical environment.

Figure 20:
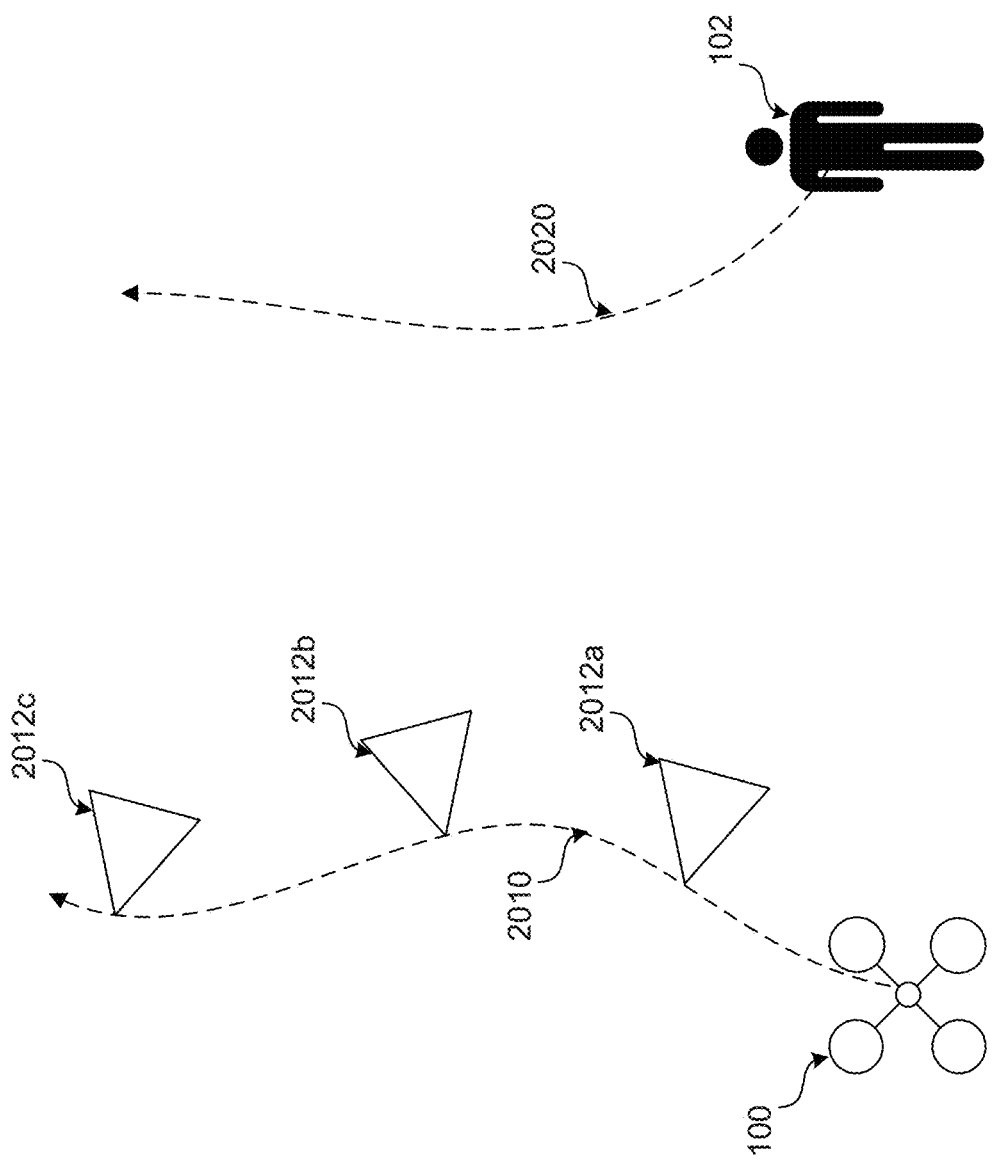
FIG. 20 shows a diagram illustrating an example process for estimating a trajectory of an object based on multiple images captured by a UAV.

Using an online visual-inertial state estimation system, a tracking system 140 can determine or estimate a trajectory of the UAV 100 as it moves through the physical environment. Thus, the tracking system 140 can associate semantic information in captured images, such as locations of detected objects, with information about the 3D trajectory of the objects, using the known or estimated 3D trajectory of the UAV 100. For example, FIG. 20 shows a trajectory 2010 of a UAV 100 moving through a physical environment. As the UAV 100 moves along trajectory 2010, the one or more image capture devices (e.g., devices 114 and/or 115) capture images of the physical environment at multiple views 2012a-c. Included in the images at multiple views 2012a-c are captures of an object such as a human subject 102. By processing the captured images at multiple views 2012a-c, a trajectory 2020 of the object can also be resolved.

Object detections in captured images create rays from a center position of a capturing camera to the object along which the object lies, with some uncertainty. The tracking system 140 can compute depth measurements for these detections, creating a plane parallel to a focal plane of a camera along which the object lies, with some uncertainty. These depth measurements can be computed by a stereo vision algorithm operating on pixels corresponding with the object between two or more camera images at different views. The depth computation can look specifically at pixels that are labeled to be part of an object of interest (e.g., a subject 102). The combination of these rays and planes over time can be fused into an accurate prediction of the 3D position and velocity trajectory of the object over time.

While a tracking system 140 can be configured to rely exclusively on visual data from image capture devices onboard a UAV 100, data from other sensors (e.g., sensors on the object, on the UAV 100, or in the environment) can be incorporated into this framework when available. Additional sensors may include GPS, IMU, barometer, magnetometer, and cameras or other devices such as a mobile device 104. For example, a GPS signal from a mobile device 104 held by a person can provide rough position measurements of the person that are fused with the visual information from image capture devices onboard the UAV 100. An IMU sensor at the UAV 100 and/or a mobile device 104 can provide acceleration and angular velocity information, a barometer can provide relative altitude, and a magnetometer can provide heading information. Images captured by cameras on a mobile device 104 held by a person can be fused with images from cameras onboard the UAV 100 to estimate relative pose between the UAV 100 and the person by identifying common features captured in the images. Various other techniques for measuring, estimating, and/or predicting the relative positions and/or orientations of the UAV 100 and/or other objects are described with respect to FIGS. 16-18.

Figure 21:
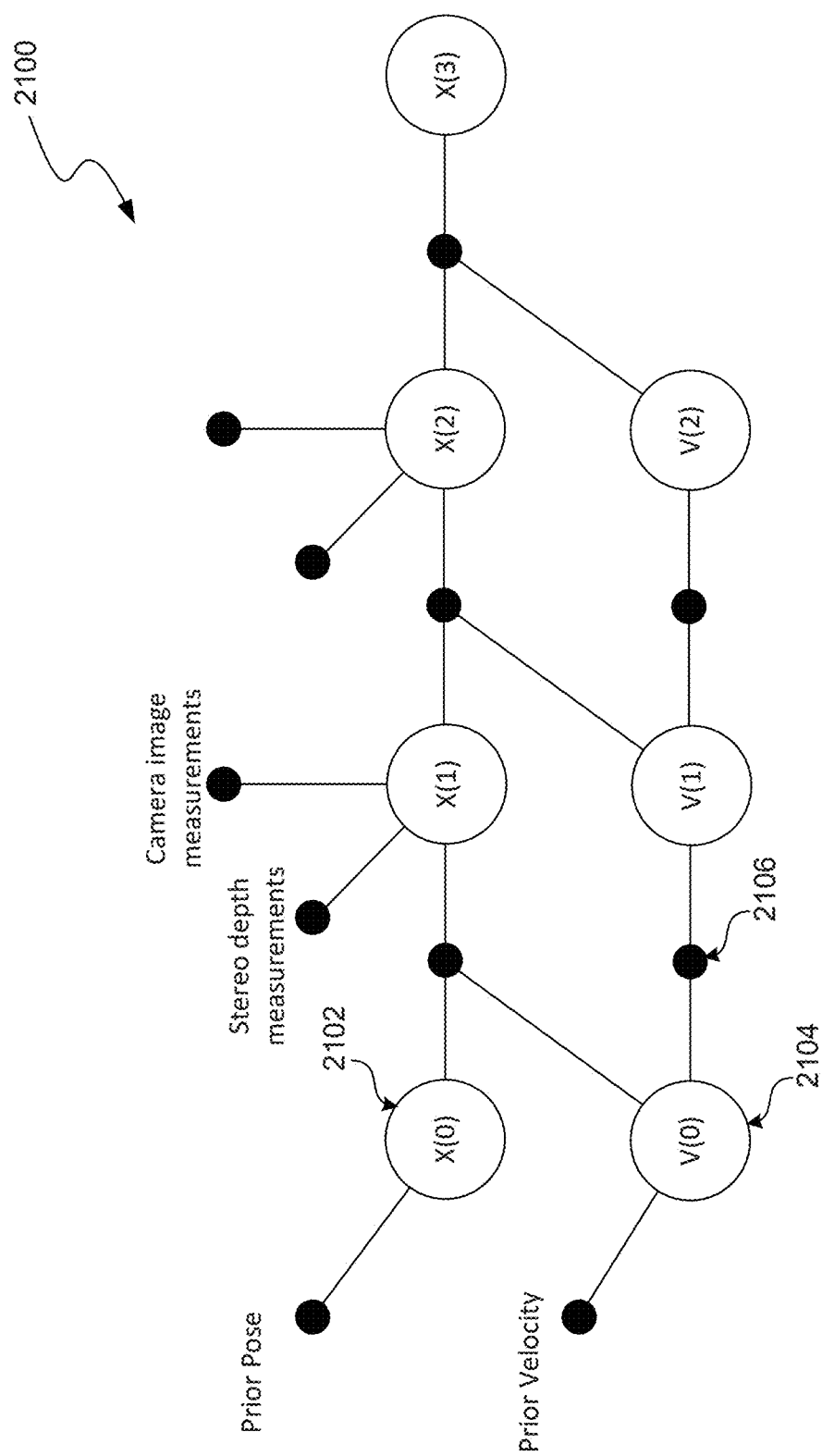
FIG. 21 shows a diagrammatic representation of an example spatiotemporal factor graph.

In some embodiments, data from various sensors are input into a spatiotemporal factor graph to probabilistically minimize total measurement error using non-linear optimization. FIG. 21 shows a diagrammatic representation of an example spatiotemporal factor graph 2100 that can be used to estimate a 3D trajectory of an object (e.g., including pose and velocity over time). In the example, spatiotemporal factor graph 2100 depicted in FIG. 21, variable values such as the pose and velocity (represented as nodes (2102 and 2104 respectively)) connected by one or more motion model processes (represented as nodes 2106 along connecting edges). For example, an estimate or prediction for the pose of the UAV 100 and/or other object at time step 1 (i.e., variable X(1)) may be calculated by inputting estimated pose and velocity at a prior time step (i.e., variables X(0) and V(0)) as well as various perception inputs such as stereo depth measurements and camera image measurements via one or more motion models. A spatiotemporal factor model can be combined with an outlier rejection mechanism wherein measurements deviating too far from an estimated distribution are thrown out. In order to estimate a 3D trajectory from measurements at multiple time instants, one or more motion models (or process models) are used to connect the estimated variables between each time step in the factor graph. Such motion models can include any one of constant velocity, zero velocity, decaying velocity, and decaying acceleration. Applied motion models may be based on a classification of a type of object being tracked and/or learned using machine learning techniques. For example, a cyclist is likely to make wide turns at speed, but is not expected to move sideways. Conversely, a small animal such as a dog may exhibit a more unpredictable motion pattern.

Figure 22:
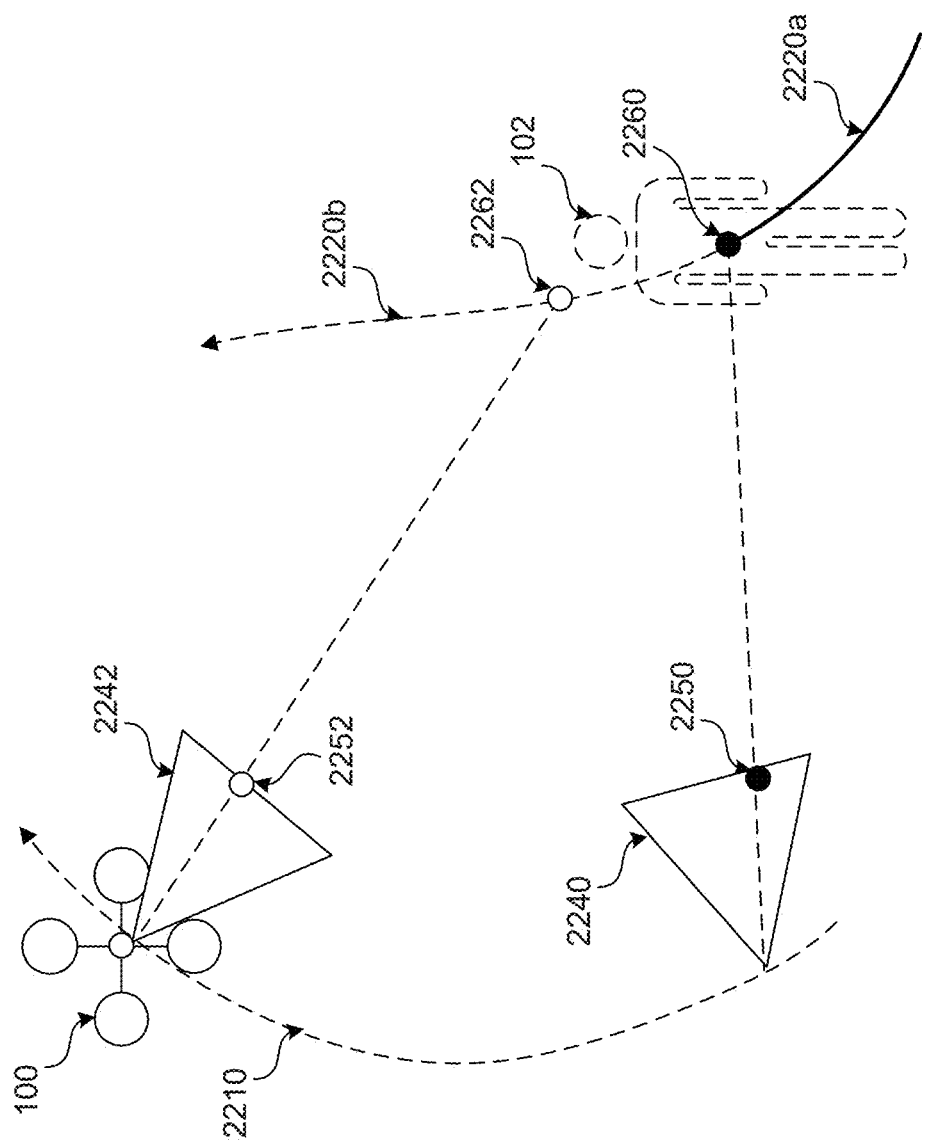
FIG. 22 shows a diagram that illustrates an example process of generating an intelligent initial estimate for where a tracked object will appear in a subsequently captured image.

In some embodiments, a tracking system 140 can generate an intelligent initial estimate for where a tracked object will appear in a subsequently captured image based on a predicted 3D trajectory of the object. FIG. 22 shows a diagram that illustrates this concept. As shown in FIG. 22, a UAV 100 is moving along a trajectory 2210 while capturing images of the surrounding physical environment, including of a human subject 102. As the UAV 100 moves along the trajectory 2210, multiple images (e.g., frames of video) are captured from one or more mounted image capture devices 114/115.

FIG. 22 shows a first FOV of an image capture device at a first pose 2240 and a second FOV of the image capture device at a second pose 2242. In this example, the first pose 2240 may represent a previous pose of the image capture device at a time instant t(0) while the second pose 2242 may represent a current pose of the image capture device at a time instant t(1). At time instant t(0), the image capture device captures an image of the human subject 102 at a first 3D position 2260 in the physical environment. This first position 2260 may be the last known position of the human subject 102. Given the first pose 2240 of the image capture device, the human subject 102 while at the first 3D position 2260 appears at a first image position 2250 in the captured image. An initial estimate for a second (or current) image position 2252 can therefore be made based on projecting a last known 3D trajectory 2220a of the human subject 102 forward in time using one or more motion models associated with the object. For example, predicted trajectory 2220b shown in FIG. 22 represents this projection of the 3D trajectory 2220a forward in time. A second 3D position 2262 (at time t(1)) of the human subject 102 along this predicted trajectory 2220b can then be calculated based on an amount of time elapsed from t(0) to t(1). This second 3D position 2262 can then be projected into the image plane of the image capture device at the second pose 2242 to estimate the second image position 2252 that will correspond to the human subject 102. Generating such an initial estimate for the position of a tracked object in a newly captured image narrows down the search space for tracking and enables a more robust tracking system, particularly in the case of a UAV 100 and/or tracked object that exhibits rapid changes in position and/or orientation.

In some embodiments, the tracking system 140 can take advantage of two or more types of image capture devices onboard the UAV 100. For example, as previously described with respect to FIG. 1A, the UAV 100 may include image capture device 114 configured for visual navigation, as well as an image capture device 115 for capturing images that are to be viewed. The image capture devices 114 may be configured for low-latency, low-resolution, and high FOV, while the image capture device 115 may be configured for high resolution. An array of image capture devices 114 about a perimeter of the UAV 100 can provide low-latency information about objects up to 360 degrees around the UAV 100 and can be used to compute depth using stereo vision algorithms. Conversely, the other image capture device 115 can provide more detailed images (e.g., high resolution, color, etc.) in a limited FOV.

Combining information from both types of image capture devices 114 and 115 can be beneficial for object tracking purposes in a number of ways. First, the high-resolution color information from an image capture device 115 can be fused with depth information from the image capture devices 114 to create a 3D representation of a tracked object. Second, the low-latency of the image capture devices 114 can enable more accurate detection of objects and estimation of object trajectories. Such estimates can be further improved and/or corrected based on images received from a high-latency, high resolution image capture device 115. The image data from the image capture devices 114 can either be fused with the image data from the image capture device 115, or can be used purely as an initial estimate.

By using the image capture devices 114, a tracking system 140 can achieve tracking of objects up to 360 degrees around the UAV 100. The tracking system 140 can fuse measurements from any of the image capture devices 114 or 115 when estimating a relative position and/or orientation of a tracked object as the positions and orientations of the image capture devices 114 and 115 change over time. The tracking system 140 can also orient the image capture device 115 to get more accurate tracking of specific objects of interest, fluidly incorporating information from both image capture modalities. Using knowledge of where all objects in the scene are, the UAV 100 can exhibit more intelligent autonomous flight.

As previously discussed, the high-resolution image capture device 115 may be mounted to an adjustable mechanism such as a gimbal that allows for one or more degrees of freedom of motion relative to the body of the UAV 100. Such a configuration is useful in stabilizing image capture as well as tracking objects of particular interest. An active gimbal mechanism configured to adjust an orientation of a higher-resolution image capture device 115 relative to the UAV 100 so as to track a position of an object in the physical environment may allow for visual tracking at greater distances than may be possible through use of the lower-resolution image capture devices 114 alone. Implementation of an active gimbal mechanism may involve estimating the orientation of one or more components of the gimbal mechanism at any given time. Such estimations may be based on any of hardware sensors coupled to the gimbal mechanism (e.g., accelerometers, rotary encoders, etc.), visual information from the image capture devices 114/115, or a fusion based on any combination thereof.

Figure 23:
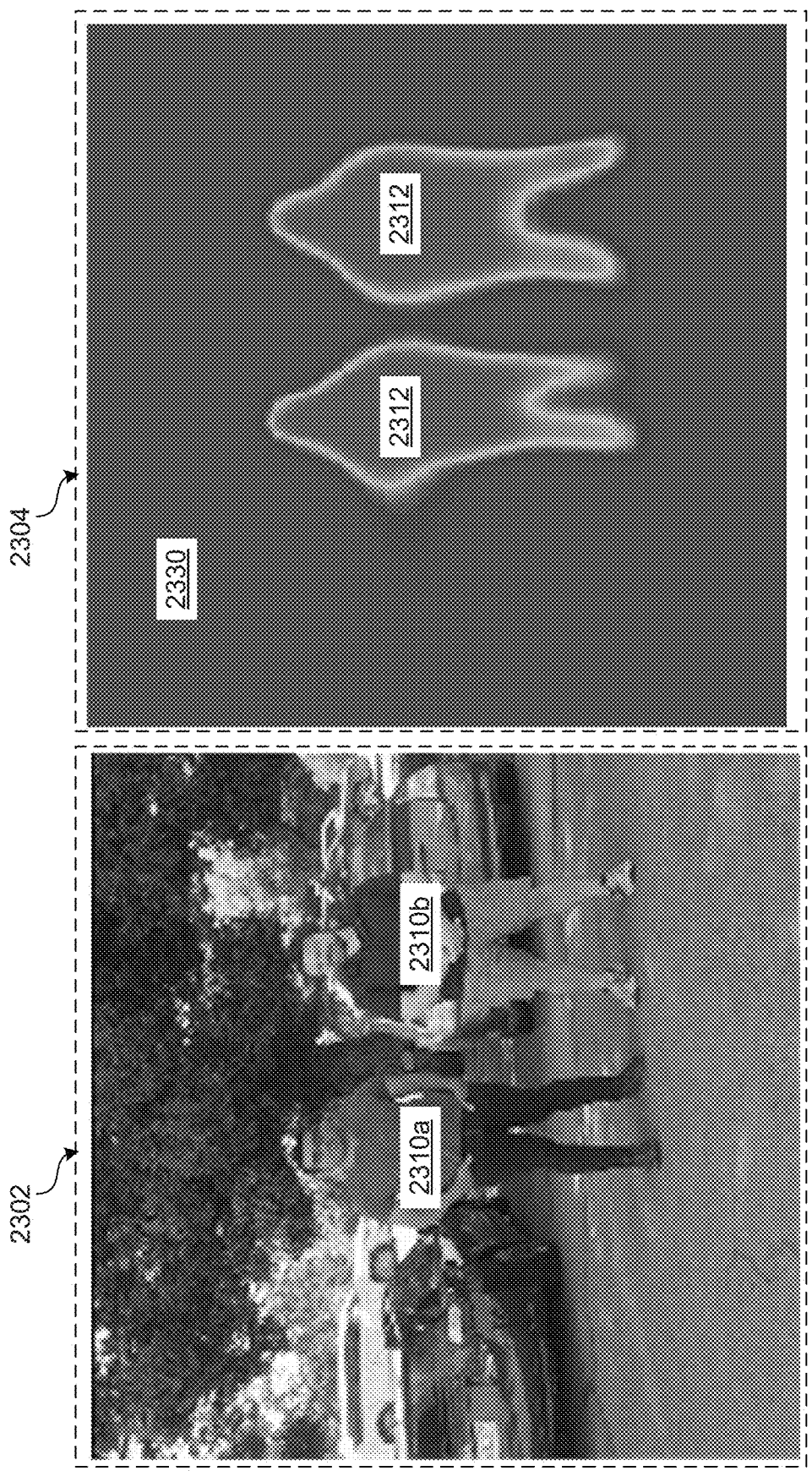
FIG. 23 shows a visualization representative of a dense per-pixel segmentation of a captured image.

A tracking system 140 may include an object detection system for detecting and tracking various objects. Given one or more classes of objects (e.g., humans, buildings, cars, animals, etc.), the object detection system may identify instances of the various classes of objects occurring in captured images of the physical environment. Outputs by the object detection system can be parameterized in a few different ways. In some embodiments, the object detection system processes received images and outputs a dense per-pixel segmentation, where each pixel is associated with a value corresponding to either an object class label (e.g., human, building, car, animal, etc.) and/or a likelihood of belonging to that object class. For example, FIG. 23 shows a visualization 2304 of a dense per-pixel segmentation of a captured image 2302 where pixels corresponding to detected objects 2310a-b classified as humans are set apart from all other pixels in the image 2302. Another parameterization may include resolving the image location of a detected object to a particular image coordinate, for example, based on centroid of the representation of the object in a received image.

In some embodiments, the object detection system can utilize a deep convolutional neural network for object detection. For example, the input may be a digital image (e.g., image 2302), and the output may be a tensor with the same spatial dimension. Each slice of the output tensor may represent a dense segmentation prediction, where each pixel's value is proportional to the likelihood of that pixel belonging to the class of object corresponding to the slice. For example, the visualization 2304 shown in FIG. 23 may represent a particular slice of the aforementioned tensor where each pixel's value is proportional to the likelihood that the pixel corresponds with a human. In addition, the same deep convolutional neural network can also predict the centroid locations for each detected instance, as described in the following section.

A tracking system 140 may also include an instance segmentation system for distinguishing between individual instances of objects detected by the object detection system. In some embodiments, the process of distinguishing individual instances of detected objects may include processing digital images captured by the UAV 100 to identify pixels belonging to one of a plurality of instances of a class of physical objects present in the physical environment and captured in the digital images. As previously described with respect to FIG. 23, a dense per-pixel segmentation algorithm can classify certain pixels in an image as corresponding to one or more classes of objects. This segmentation process output may allow a tracking system 140 to distinguish the objects represented in an image and the rest of the image (i.e., a background). For example, the visualization 2304 distinguishes pixels that correspond to humans (e.g., included in region 2312) from pixels that do not correspond to humans (e.g., included in region 2330). However, this segmentation process does not necessarily distinguish between individual instances of the detected objects. A human viewing the visualization 2304 may conclude that the pixels corresponding to humans in the detected image actually correspond to two separate humans; however, without further analysis, a tracking system 140 may be unable to make this distinction.

Figure 24:
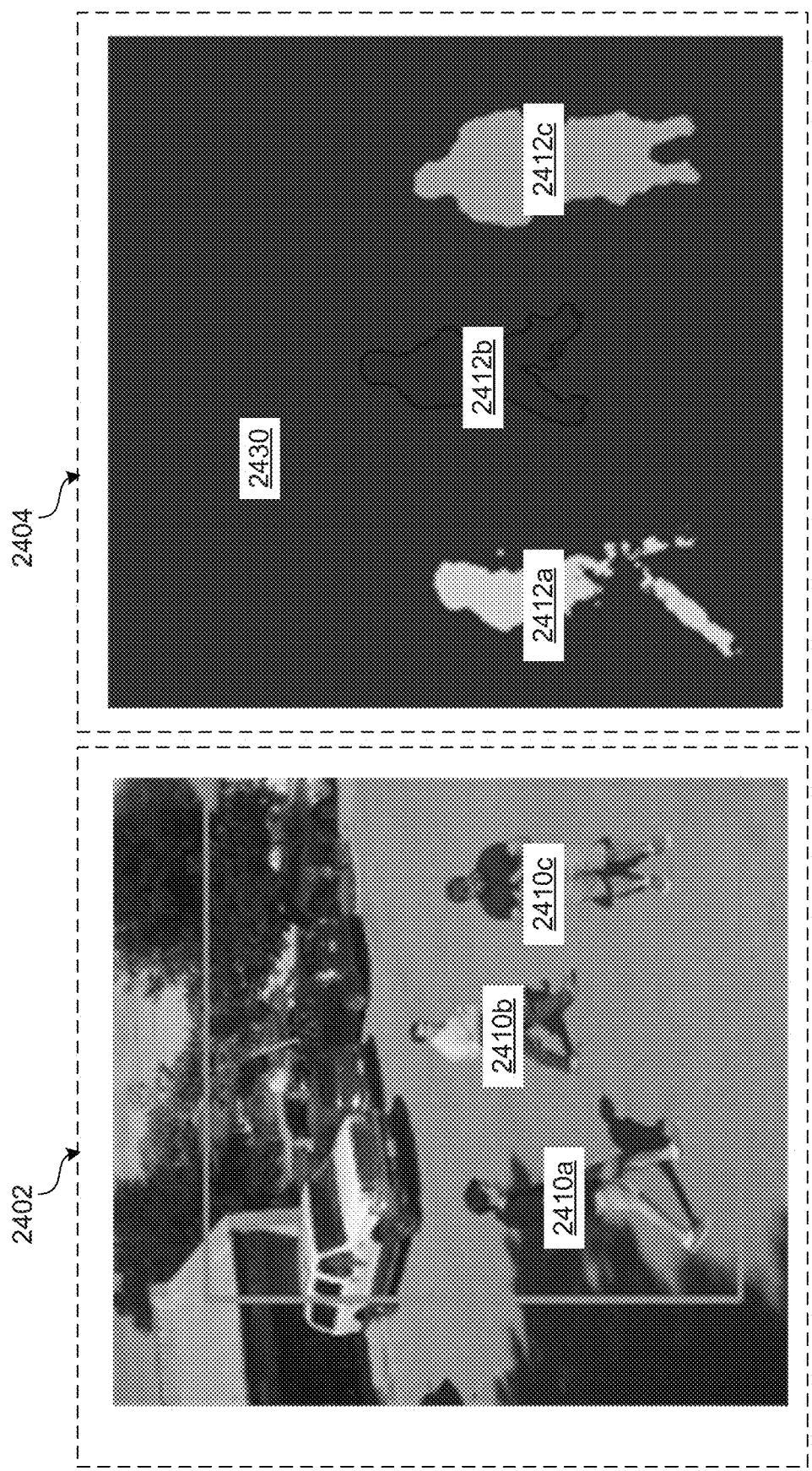
FIG. 24 shows a visualization representative of an instance segmentation of a captured image.

Effective object tracking may involve distinguishing pixels that correspond to distinct instances of detected objects. This process is known as "instance segmentation." FIG. 24 shows an example visualization 2404 of an instance segmentation output based on a captured image 2402. Similar to the dense per-pixel segmentation process described with respect to FIG. 23, the output represented by visualization 2404 distinguishes pixels (e.g., included in regions 2412*a*-*c*) that correspond to detected objects 2410*a*-*c* of a particular class of objects (in this case humans) from pixels that do not correspond to such objects (e.g., included in region 2430). Notably, the instance segmentation process goes a step further to distinguish pixels corresponding to individual instances of the detected objects from each other. For example, pixels in region 2412*a* correspond to a detected instance of a human 2410*a*, pixels in region 2412*b* correspond to a detected instance of a human 2410*b*, and pixels in region 2412*c* correspond to a detected instance of a human 2410*c*.

Distinguishing between instances of detected objects may be based on an analysis of pixels corresponding to detected objects. For example, a grouping method may be applied by the tracking system 140 to associate pixels corresponding to a particular class of object to a particular instance of that class by selecting pixels that are substantially similar to certain other pixels corresponding to that instance, pixels that are spatially clustered, pixel clusters that fit an appearance-based model for the object class, etc. Again, this process may involve applying a deep convolutional neural network to distinguish individual instances of detected objects.

Instance segmentation may associate pixels corresponding to particular instances of objects; however, such associations may not be temporally consistent. Consider again, the example described with respect to FIG. 24. As illustrated in FIG. 24, a tracking system 140 has identified three instances of a certain class of objects (i.e., humans) by applying an instance segmentation process to a captured image 2402 of the physical environment. This example captured image 2402 may represent only one frame in a sequence of frames of captured video. When a second frame is received, the tracking system 140 may not be able to recognize newly identified object instances as corresponding to the same three people 2410*a*-*c* as captured in image 2402.

To address this issue, the tracking system 140 can include an identity recognition system. An identity recognition system may process received inputs (e.g., captured images) to learn the appearances of instances of certain objects (e.g., of particular people). Specifically, the identity recognition system may apply a machine-learning appearance-based model to digital images captured by one or more image capture devices 114/115 associated with a UAV 100. Instance segmentations identified based on processing of captured images can then be compared against such appearance-based models to resolve unique identities for one or more of the detected objects.

Identity recognition can be useful for various different tasks related to object tracking. As previously alluded to, recognizing the unique identities of detected objects allows for temporal consistency. Further, identity recognition can enable the tracking of multiple different objects (as will be described in more detail). Identity recognition may also facilitate object persistence that enables re-acquisition of previously tracked objects that fell out of view due to limited FOV of the image capture devices, motion of the object, and/or occlusion by another object. Identity recognition can also be applied to perform certain identity-specific behaviors or actions, such as recording video when a particular person is in view.

In some embodiments, an identity recognition process may employ a deep convolutional neural network to learn one or more effective appearance-based models for certain objects. In some embodiments, the neural network can be trained to learn a distance metric that returns a low distance value for image crops belonging to the same instance of an object (e.g., a person), and a high distance value otherwise.

In some embodiments, an identity recognition process may also include learning appearances of individual instances of objects such as people. When tracking humans, a tracking system 140 may be configured to associate identities of the humans, either through user-input data or external data sources such as images associated with individuals available on social media. Such data can be combined with detailed facial recognition processes based on images received from any of the one or more image capture devices 114/115 onboard the UAV 100. In some embodiments, an identity recognition process may focus on one or more key individuals. For example, a tracking system 140 associated with a UAV 100 may specifically focus on learning the identity of a designated owner of the UAV 100 and retain and/or improve its knowledge between flights for tracking, navigation, and/or other purposes such as access control.

In some embodiments, a tracking system 140 may be configured to focus tracking on a specific object detected in captured images. In such a single-object tracking approach, an identified object (e.g., a person) is designated for tracking while all other objects (e.g., other people, trees, buildings, landscape features, etc.) are treated as distractors and ignored. While useful in some contexts, a single-object tracking approach may have some disadvantages. For example, an overlap in trajectory, from the point of view of an image capture device, of a tracked object and a distractor object may lead to an inadvertent switch in the object being tracked such that the tracking system 140 begins tracking the distractor instead. Similarly, spatially close false positives by an object detector can also lead to inadvertent switches in tracking.

A multi-object tracking approach addresses these shortcomings, and introduces a few additional benefits. In some embodiments, a unique track is associated with each object detected in the images captured by the one or more image capture devices 114/115. In some cases, it may not be practical, from a computing standpoint, to associate a unique track with every single object that is captured in the images. For example, a given image may include hundreds of objects, including minor features such as rocks or leaves or trees. Instead, unique tracks may be associate with certain classes of objects that may be of interest from a tracking standpoint. For example, the tracking system 140 may be configured to associate a unique track with every object detected that belongs to a class that is generally mobile (e.g., people, animals, vehicles, etc.).

Each unique track may include an estimate for the spatial location and movement of the object being tracked (e.g., using the spatiotemporal factor graph described earlier) as well as its appearance (e.g., using the identity recognition feature). Instead of pooling together all other distractors (i.e., as may be performed in a single object tracking approach), the tracking system 140 can learn to distinguish between the multiple individual tracked objects. By doing so, the tracking system 140 may render inadvertent identity switches less likely. Similarly, false positives by the object detector can be more robustly rejected as they will tend to not be consistent with any of the unique tracks.

An aspect to consider when performing multi-object tracking includes the association problem. In other words, given a set of object detections based on captured images (including parameterization by 3D location and regions in the image corresponding to segmentation), an issue arises regarding how to associate each of the set of object detections with corresponding tracks. To address the association problem, the tracking system 140 can be configured to associate one of a plurality of detected objects with one of a plurality of estimated object tracks based on a relationship between a detected object and an estimate object track. Specifically, this process may involve computing a "cost" value for one or more pairs of object detections and estimate object tracks. The computed cost values can take into account, for example, the spatial distance between a current location (e.g., in 3D space and/or image space) of a given object detection and a current estimate of a given track (e.g., in 3D space and/or in image space), an uncertainty of the current estimate of the given track, a difference between a given detected object's appearance and a given track's appearance estimate, and/or any other factors that may tend to suggest an association between a given detected object and given track. In some embodiments, multiple cost values are computed based on various different factors and fused into a single scalar value that can then be treated as a measure of how well a given detected object matches a given track. The aforementioned cost formulation can then be used to determine an optimal association between a detected object and a corresponding track by treating the cost formulation as an instance of a minimum cost perfect bipartite matching problem, which can be solved using, for example, the Hungarian algorithm.

In some embodiments, effective object tracking by a tracking system 140 may be improved by incorporating information regarding a state of an object. For example, a detected object such as a human may be associated with any one or more defined states. A state in this context may include an activity by the object such as sitting, standing, walking, running, or jumping. In some embodiments, one or more perception inputs (e.g., visual inputs from image capture devices 114/115) may be used to estimate one or more parameters associated with detected objects. The estimated parameters may include an activity type, motion capabilities, trajectory heading, contextual location (e.g., indoors vs. outdoors), interaction with other detected objects (e.g., two people walking together, a dog on a leash held by a person, a trailer pulled by a car, etc.), and any other semantic attributes.

Generally, object state estimation may be applied to estimate one or more parameters associated with a state of a detected object based on perception inputs (e.g., images of the detected object captured by one or more image capture devices 114/115 onboard a UAV 100 or sensor data from any other sensors onboard the UAV 100). The estimated parameters may then be applied to assist in predicting the motion of the detected object and thereby assist in tracking the detected object. For example, future trajectory estimates may differ for a detected human depending on whether the detected human is walking, running, jumping, riding a bicycle, riding in a car, etc. In some embodiments, deep convolutional neural networks may be applied to generate the parameter estimates based on multiple data sources (e.g., the perception inputs) to assist in generating future trajectory estimates and thereby assist in tracking.

As previously alluded to, a tracking system 140 may be configured to estimate (i.e., predict) a future trajectory of a detected object based on past trajectory measurements and/or estimates, current perception inputs, motion models, and any other information (e.g., object state estimates). Predicting a future trajectory of a detected object is particularly useful for autonomous navigation by the UAV 100. Effective autonomous navigation by the UAV 100 may depend on anticipation of future conditions just as much as current conditions in the physical environment. Through a motion planning process, a navigation system of the UAV 100 may generate control commands configured to cause the UAV 100 to maneuver, for example, to avoid a collision, maintain separation with a tracked object in motion, and/or satisfy any other navigation objectives.

Predicting a future trajectory of a detected object is generally a relatively difficult problem to solve. The problem can be simplified for objects that are in motion according to a known and predictable motion model. For example, an object in free fall is expected to continue along a previous trajectory while accelerating at rate based on a known gravitational constant and other known factors (e.g., wind resistance). In such cases, the problem of generating a prediction of a future trajectory can be simplified to merely propagating past and current motion according to a known or predictable motion model associated with the object. Objects may of course deviate from a predicted trajectory generated based on such assumptions for a number of reasons (e.g., due to collision with another object). However, the predicted trajectories may still be useful for motion planning and/or tracking purposes.

Dynamic objects such as people and animals, present a more difficult challenge when predicting future trajectories because the motion of such objects is generally based on the environment and their own free will. To address such challenges, a tracking system 140 may be configured to take accurate measurements of the current position and motion of an object and use differentiated velocities and/or accelerations to predict a trajectory a short time (e.g., seconds) into the future and continually update such prediction as new measurements are taken. Further, the tracking system 140 may also use semantic information gathered from an analysis of captured images as cues to aid in generating predicted trajectories. For example, a tracking system 140 may determine that a detected object is a person on a bicycle traveling along a road. With this semantic information, the tracking system 140 may form an assumption that the tracked object is likely to continue along a trajectory that roughly coincides with a path of the road. As another related example, the tracking system 140 may determine that the person has begun turning the handlebars of the bicycle to the left. With this semantic information, the tracking system 140 may form an assumption that the tracked object will likely turn to the left before receiving any positional measurements that expose this motion. Another example, particularly relevant to autonomous objects such as people or animals is to assume that that the object will tend to avoid collisions with other objects. For example, the tracking system 140 may determine a tracked object is a person heading on a trajectory that will lead to a collision with another object such as a light pole. With this semantic information, the tracking system 140 may form an assumption that the tracked object is likely to alter its current trajectory at some point before the collision occurs. A person having ordinary skill will recognize that these are only examples of how semantic information may be utilized as a cue to guide prediction of future trajectories for certain objects.

In addition to performing an object detection process in one or more captured images per time frame, the tracking system 140 may also be configured to perform a frame-to-frame tracking process, for example, to detect motion of a particular set or region of pixels in images at subsequent time frames (e.g., video frames). Such a process may involve applying a mean-shift algorithm, a correlation filter, and/or a deep network. In some embodiments, frame-to-frame tracking may be applied by a system that is separate from an object detection system wherein results from the frame-to-frame tracking are fused into a spatiotemporal factor graph. Alternatively, or in addition, an object detection system may perform frame-to-frame tracking if, for example, the system has sufficient available computing resources (e.g., memory). For example, an object detection system may apply frame-to-frame tracking through recurrence in a deep network and/or by passing in multiple images at a time. A frame-to-frame tracking process and object detection process can also be configured to complement each other, with one resetting the other when a failure occurs.

As previously discussed, the tracking system 140 may be configured to process images (e.g., the raw pixel data) received from one or more image capture devices 114/115 onboard a UAV 100. Alternatively, or in addition, the tracking system 140 may also be configured to operate by processing disparity images. A "disparity image" may generally be understood as an image representative of a disparity between two or more corresponding images. For example, a stereo pair of images (e.g., left image and right image) captured by a stereoscopic image capture device will exhibit an inherent offset due to the slight difference in position of the two or more cameras associated with the stereoscopic image capture device. Despite the offset, at least some of the objects appearing in one image should also appear in the other image; however, the image locations of pixels corresponding to such objects will differ. By matching pixels in one image with corresponding pixels in the other and calculating the distance between these corresponding pixels, a disparity image can be generated with pixel values that are based on the distance calculations. Such a disparity image will tend to highlight regions of an image that correspond to objects in the physical environment since the pixels corresponding to the object will have similar disparities due to the object's 3D location in space. Accordingly, a disparity image, that may have been generated by processing two or more images according to a separate stereo algorithm, may provide useful cues to guide the tracking system 140 in detecting objects in the physical environment. In many situations, particularly where harsh lighting is present, a disparity image may actually provide stronger cues about the location of objects than an image captured from the image capture devices 114/115. As mentioned, disparity images may be computed with a separate stereo algorithm. Alternatively, or in addition, disparity images may be output as part of the same deep network applied by the tracking system 140. Disparity images may be used for object detection separately from the images received from the image capture devices 114/115, or they may be combined into a single network for joint inference.

In general, a tracking system 140 (e.g., including an object detection system and/or an associated instance segmentation system) may be primarily concerned with determining which pixels in a given image correspond to each object instance. However, these systems may not consider portions of a given object that are not actually captured in a given image. For example, pixels that would otherwise correspond with an occluded portion of an object (e.g., a person partially occluded by a tree) may not be labeled as corresponding to the object. This can be disadvantageous for object detection, instance segmentation, and/or identity recognition because the size and shape of the object may appear in the captured image to be distorted due to the occlusion. To address this issue, the tracking system 140 may be configured to imply a segmentation of an object instance in a captured image even if that object instance is occluded by other object instances. The object tracking system 140 may additionally be configured to determine which of the pixels associated with an object instance correspond with an occluded portion of that object instance. This process is generally referred to as "amodal segmentation" in that the segmentation process takes into consideration the whole of a physical object even if parts of the physical object are not necessarily perceived, for example, received images captured by the image capture devices 114/115. Amodal segmentation may be particularly advantageous when performing identity recognition and in a tracking system 140 configured for multi-object tracking.

Loss of visual contact is to be expected when tracking an object in motion through a physical environment. A tracking system 140 based primarily on visual inputs (e.g., images captured by image capture devices 114/115) may lose a track on an object when visual contact is lost (e.g., due to occlusion by another object or by the object leaving a FOV of an image capture device 114/115). In such cases, the tracking system 140 may become uncertain of the object's location and thereby declare the object lost. Human pilots generally do not have this issue, particularly in the case of momentary occlusions, due to the notion of object permanence. Object permanence assumes that, given certain physical constraints of matter, an object cannot suddenly disappear or instantly teleport to another location. Based on this assumption, if it is clear that all escape paths would have been clearly visible, then an object is likely to remain in an occluded volume. This situation is most clear when there is single occluding object (e.g., boulder) on flat ground with free space all around. If a tracked object in motion suddenly disappears in the captured image at a location of another object (e.g., the bolder), then it can be assumed that the object remains at a position occluded by the other object and that the tracked object will emerge along one of one or more possible escape paths. In some embodiments, the tracking system 140 may be configured to implement an algorithm that bounds the growth of uncertainty in the tracked objects location given this concept. In other words, when visual contact with a tracked object is lost at a particular position, the tracking system 140 can bound the uncertainty in the object's position to the last observed position and one or more possible escape paths given a last observed trajectory. A possible implementation of this concept may include generating, by the tracking system 140, an occupancy map that is carved out by stereo and the segmentations with a particle filter on possible escape paths.

Unmanned Aerial Vehicle—Example System

A UAV 100, according to the present teachings, may be implemented as any type of UAV. A UAV, sometimes referred to as a drone, is generally defined as any aircraft capable of controlled flight without a human pilot onboard. UAVs may be controlled autonomously by onboard computer processors or via remote control by a remotely located human pilot. Similar to an airplane, UAVs may utilize fixed aerodynamic surfaces along with a propulsion system (e.g., propeller, jet, etc.) to achieve lift. Alternatively, similar to helicopters, UAVs may directly use a propulsion system (e.g., propeller, jet, etc.) to counter gravitational forces and achieve lift. Propulsion-driven lift (as in the case of helicopters) offers significant advantages in certain implementations, for example, as a mobile filming platform, because it allows for controlled motion along all axes.

Multi-rotor helicopters, in particular quadcopters, have emerged as a popular UAV configuration. A quadcopter (also known as a quadrotor helicopter or quadrotor) is a multi-rotor helicopter that is lifted and propelled by four rotors. Unlike most helicopters, quadcopters use two sets of two fixed-pitch propellers. A first set of rotors turns clockwise, while a second set of rotors turns counter-clockwise. In turning opposite directions, a first set of rotors may counter the angular torque caused by the rotation of the other set, thereby stabilizing flight. Flight control is achieved through variation in the angular velocity of each of the four fixed-pitch rotors. By varying the angular velocity of each of the rotors, a quadcopter may perform precise adjustments in its position (e.g., adjustments in altitude and level flight left, right, forward and backward) and orientation, including pitch (rotation about a first lateral axis), roll (rotation about a second lateral axis), and yaw (rotation about a vertical axis). For example, if all four rotors are spinning (two clockwise, and two counter-clockwise) at the same angular velocity, the net aerodynamic torque about the vertical yaw axis is zero. Provided the four rotors spin at sufficient angular velocity to provide a vertical thrust equal to the force of gravity, the quadcopter can maintain a hover. An adjustment in yaw may be induced by varying the angular velocity of a subset of the four rotors thereby mismatching the cumulative aerodynamic torque of the four rotors. Similarly, an adjustment in pitch and/or roll may be induced by varying the angular velocity of a subset of the four rotors, but in a balanced fashion such that lift is increased on one side of the craft and decreased on the other side of the craft. An adjustment in altitude from hover may be induced by applying a balanced variation in all four rotors, thereby increasing or decreasing the vertical thrust. Positional adjustments left, right, forward, and backward may be induced through combined pitch/roll maneuvers with balanced applied vertical thrust. For example, to move forward on a horizontal plane, the quadcopter would vary the angular velocity of a subset of its four rotors in order to perform a pitch forward maneuver. While pitching forward, the total vertical thrust may be increased by increasing the angular velocity of all the rotors. Due to the forward pitched orientation, the acceleration caused by the vertical thrust maneuver will have a horizontal component and will, therefore, accelerate the craft forward on a horizontal plane.

Figure 25:
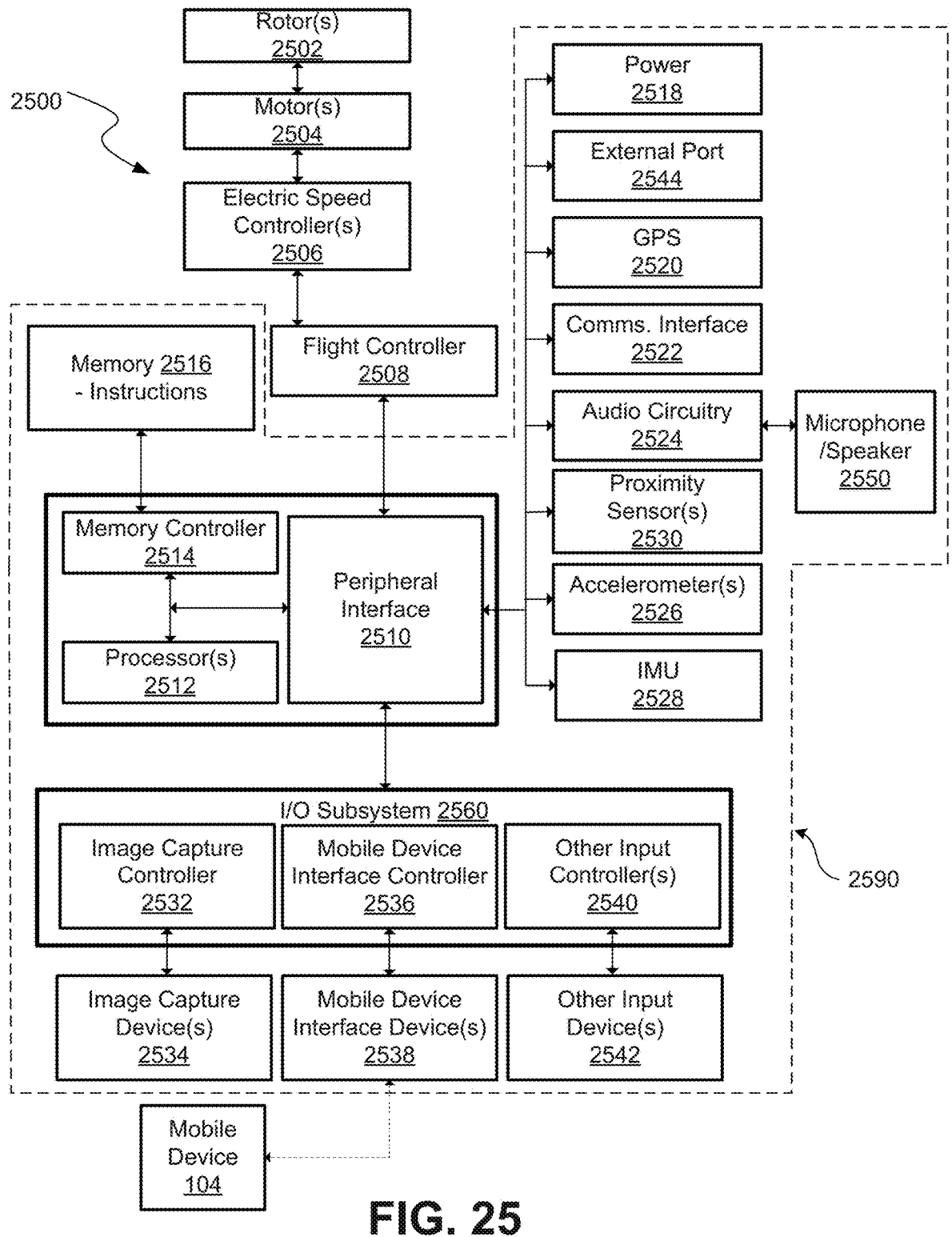
FIG. 25 shows a block diagram of an example UAV system including various functional system components with which at least some operations described in this disclosure can be implemented.

FIG. 25 shows a diagram of an example UAV system 2500 including various functional system components that may be part of a UAV 100, according to some embodiments. UAV system 2500 may include one or more propulsion systems (e.g., rotors 2502 and motor(s) 2504), one or more electronic speed controllers 2506, a flight controller 2508, a peripheral interface 2510, processor(s) 2512, a memory controller 2514, a memory 2516 (which may include one or more computer readable storage media), a power module 2518, a GPS module 2520, a communications interface 2522, audio circuitry 2524, an accelerometer 2526 (including subcomponents, such as gyroscopes), an IMU 2528, a proximity sensor 2530, an optical sensor controller 2532 and associated optical sensor(s) 2534, a mobile device interface controller 2536 with associated interface device(s) 2538, and any other input controllers 2540 and input device(s) 2542, for example, display controllers with associated display device(s). These components may communicate over one or more communication buses or signal lines as represented by the arrows in FIG. 25.

UAV system 2500 is only one example of a system that may be part of a UAV 100. A UAV 100 may include more or fewer components than shown in system 2500, may combine two or more components as functional units, or may have a different configuration or arrangement of the components. Some of the various components of system 2500 shown in FIG. 25 may be implemented in hardware, software or a combination of both hardware and software, including one or more signal processing and/or application specific integrated circuits. Also, UAV 100 may include an off-the-shelf UAV (e.g., a currently available remote-controlled quadcopter) coupled with a modular add-on device (for example, one including components within outline 2590) to perform the innovative functions described in this disclosure.

As described earlier, the means for propulsion 2502-2504 may comprise fixed-pitch rotors. The means for propulsion may also include variable-pitch rotors (for example, using a gimbal mechanism), a variable-pitch jet engine, or any other mode of propulsion having the effect of providing force. The means for propulsion 2502-2504 may include a means for varying the applied thrust, for example, via an electronic speed controller 2506 varying the speed of each fixed-pitch rotor.

Flight controller 2508 may include a combination of hardware and/or software configured to receive input data (e.g., sensor data from image capture devices 2534, and or generated trajectories from an autonomous navigation system 120), interpret the data and output control commands to the propulsion systems 2502-2506 and/or aerodynamic surfaces (e.g., fixed wing control surfaces) of the UAV 100. Alternatively, or in addition, a flight controller 2508 may be configured to receive control commands generated by another component or device (e.g., processors 2512 and/or a separate computing device), interpret those control commands and generate control signals to the propulsion systems 2502-2506 and/or aerodynamic surfaces (e.g., fixed wing control surfaces) of the UAV 100. In some embodiments, the previously mentioned navigation system 120 of the UAV 100 may comprise the flight controller 2508 and/or any one or more of the other components of system 2500. Alternatively, the flight controller 2508 shown in FIG. 25 may exist as a component separate from the navigation system 120, for example, similar to the flight controller 160 shown in FIG. 2.

Memory 2516 may include high-speed random-access memory and may also include non-volatile memory, such as one or more magnetic disk storage devices, flash memory devices, or other non-volatile solid-state memory devices. Access to memory 2516 by other components of system 2500, such as the processors 2512 and the peripherals interface 2510, may be controlled by the memory controller 2514.

The peripherals interface 2510 may couple the input and output peripherals of system 2500 to the processor(s) 2512 and memory 2516. The one or more processors 2512 run or execute various software programs and/or sets of instructions stored in memory 2516 to perform various functions for the UAV 100 and to process data. In some embodiments, processors 2512 may include general central processing units (CPUs), specialized processing units such as graphical processing units (GPUs) particularly suited to parallel processing applications, or any combination thereof. In some embodiments, the peripherals interface 2510, the processor(s) 2512, and the memory controller 2514 may be implemented on a single integrated chip. In some other embodiments, they may be implemented on separate chips.

The network communications interface 2522 may facilitate transmission and reception of communications signals often in the form of electromagnetic signals. The transmission and reception of electromagnetic communications signals may be carried out over physical media such as copper wire cabling or fiber optic cabling, or may be carried out wirelessly, for example, via an RF transceiver. In some embodiments, the network communications interface may include RF circuitry. In such embodiments, RF circuitry may convert electrical signals to/from electromagnetic signals and communicate with communications networks and other communications devices via the electromagnetic signals. The RF circuitry may include well-known circuitry for performing these functions, including, but not limited to, an antenna system, an RF transceiver, one or more amplifiers, a tuner, one or more oscillators, a digital signal processor, a CODEC chipset, a subscriber identity module (SIM) card, memory, and so forth. The RF circuitry may facilitate transmission and receipt of data over communications networks (including public, private, local, and wide area). For example, communication may be over a wide area network (WAN), a local area network (LAN), or a network of networks such as the Internet. Communication may be facilitated over wired transmission media (e.g., via Ethernet) or wirelessly. Wireless communication may be over a wireless cellular telephone network, a wireless LAN (WLAN) and/or a metropolitan area network (MAN), and other modes of wireless communication. The wireless communication may use any of a plurality of communications standards, protocols and technologies, including, but not limited to, Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth™, Wireless Fidelity (Wi-Fi) (e.g., IEEE 802.11n and/or IEEE 802.11ac), voice over Internet Protocol (VoIP), Wi-MAX, or any other suitable communication protocols.

The audio circuitry 2524, including the speaker and microphone 2550, may provide an audio interface between the surrounding environment and the UAV 100. The audio circuitry 2524 may receive audio data from the peripherals interface 2510, convert the audio data to an electrical signal, and transmit the electrical signal to the speaker 2550. The speaker 2550 may convert the electrical signal to human-audible sound waves. The audio circuitry 2524 may also receive electrical signals converted by the microphone 2550 from sound waves. The audio circuitry 2524 may convert the electrical signal to audio data and transmit the audio data to the peripherals interface 2510 for processing. Audio data may be retrieved from and/or transmitted to memory 2516 and/or the network communications interface 2522 by the peripherals interface 2510.

The input/output (I/O) subsystem 2560 may couple input/output peripherals of UAV 100, such as an optical sensor system 2534, the mobile device interface 2538, and other input/control devices 2542, to the peripherals interface 2510. The I/O subsystem 2560 may include an optical sensor controller 2532, a mobile device interface controller 2536, and other input controller(s) 2540 for other input or control devices. The one or more input controllers 2540 receive/send electrical signals from/to other input or control devices 2542.

The other input/control devices 2542 may include physical buttons (e.g., push buttons, rocker buttons, etc.), dials, touch screen displays, slider switches, joysticks, click wheels, and so forth. A touch screen display may be used to implement virtual or soft buttons and one or more soft keyboards. A touch-sensitive touch screen display may provide an input interface and an output interface between the UAV 100 and a user. A display controller may receive and/or send electrical signals from/to the touch screen. The touch screen may display visual output to a user. The visual output may include graphics, text, icons, video, and any combination thereof (collectively termed "graphics"). In some embodiments, some or all of the visual output may correspond to user-interface objects, further details of which are described below.

A touch sensitive display system may have a touch-sensitive surface, sensor or set of sensors that accepts input from the user based on haptic and/or tactile contact. The touch sensitive display system and the display controller (along with any associated modules and/or sets of instructions in memory 2516) may detect contact (and any movement or breaking of the contact) on the touch screen and convert the detected contact into interaction with user-interface objects (e.g., one or more soft keys or images) that are displayed on the touch screen. In an exemplary embodiment, a point of contact between a touch screen and the user corresponds to a finger of the user.

The touch screen may use liquid crystal display (LCD) technology, or light emitting polymer display (LPD) technology, although other display technologies may be used in other embodiments. The touch screen and the display controller may detect contact and any movement or breaking thereof using any of a plurality of touch sensing technologies now known or later developed, including, but not limited to, capacitive, resistive, infrared, and surface acoustic wave technologies, as well as other proximity sensor arrays or other elements for determining one or more points of contact with a touch screen.

The mobile device interface device 2538 along with mobile device interface controller 2536 may facilitate the transmission of data between a UAV 100 and other computing devices such as a mobile device 104. According to some embodiments, communications interface 2522 may facilitate the transmission of data between UAV 100 and a mobile device 104 (for example, where data is transferred over a Wi-Fi network).

UAV system 2500 also includes a power system 2518 for powering the various components. The power system 2518 may include a power management system, one or more power sources (e.g., battery, alternating current (AC), etc.), a recharging system, a power failure detection circuit, a power converter or inverter, a power status indicator (e.g., a light-emitting diode (LED)) and any other components associated with the generation, management and distribution of power in computerized device.

UAV system 2500 may also include one or more image capture devices 2534. Image capture devices 2534 may be the same as the image capture devices 114/115 of UAV 100 described with respect to FIG. 1A. FIG. 25 shows an image capture device 2534 coupled to an image capture controller 2532 in I/O subsystem 2560. The image capture device 2534 may include one or more optical sensors. For example, image capture device 2534 may include a charge-coupled device (CCD) or complementary metal-oxide semiconductor (CMOS) phototransistors. The optical sensors of image capture devices 2534 receive light from the environment, projected through one or more lens (the combination of an optical sensor and lens can be referred to as a "camera") and converts the light to data representing an image. In conjunction with an imaging module located in memory 2516, the image capture device 2534 may capture images (including still images and/or video). In some embodiments, an image capture device 2534 may include a single fixed camera. In other embodiments, an image capture device 2540 may include a single adjustable camera (adjustable using a gimbal mechanism with one or more axes of motion). In some embodiments, an image capture device 2534 may include a camera with a wide-angle lens providing a wider FOV. In some embodiments, an image capture device 2534 may include an array of multiple cameras providing up to a full 360-degree view in all directions. In some embodiments, an image capture device 2534 may include two or more cameras (of any type as described herein) placed next to each other in order to provide stereoscopic vision. In some embodiments, an image capture device 2534 may include multiple cameras of any combination as described above. In some embodiments, the cameras of an image capture device 2534 may be arranged such that at least two cameras are provided with overlapping FOV at multiple angles around the UAV 100, thereby allowing for stereoscopic (i.e., 3D) image/video capture and depth recovery (e.g., through computer vision algorithms) at multiple angles around UAV 100. For example, UAV 100 may include four sets of two cameras each positioned so as to provide a stereoscopic view at multiple angles around the UAV 100. In some embodiments, a UAV 100 may include some cameras dedicated for image capture of a subject and other cameras dedicated for image capture for visual navigation (e.g., through visual inertial odometry).

UAV system 2500 may also include one or more proximity sensors 2530. FIG. 25 shows a proximity sensor 2530 coupled to the peripherals interface 2510. Alternately, the proximity sensor 2530 may be coupled to an input controller 2540 in the I/O subsystem 2560. Proximity sensors 2530 may generally include remote sensing technology for proximity detection, range measurement, target identification, etc. For example, proximity sensors 2530 may include radar, sonar, and LIDAR.

UAV system 2500 may also include one or more accelerometers 2526. FIG. 25 shows an accelerometer 2526 coupled to the peripherals interface 2510. Alternately, the accelerometer 2526 may be coupled to an input controller 2540 in the I/O subsystem 2560.

UAV system 2500 may include one or more IMU 2528. An IMU 2528 may measure and report the UAV's velocity, acceleration, orientation, and gravitational forces using a combination of gyroscopes and accelerometers (e.g., accelerometer 2526).

UAV system 2500 may include a global positioning system (GPS) receiver 2520. FIG. 25 shows an GPS receiver 2520 coupled to the peripherals interface 2510. Alternately, the GPS receiver 2520 may be coupled to an input controller 2540 in the I/O subsystem 2560. The GPS receiver 2520 may receive signals from GPS satellites in orbit around the earth, calculate a distance to each of the GPS satellites (through the use of GPS software), and thereby pinpoint a current global position of UAV 100.

In some embodiments, the software components stored in memory 2516 may include an operating system, a communication module (or set of instructions), a flight control module (or set of instructions), a localization module (or set of instructions), a computer vision module, a graphics module (or set of instructions), and other applications (or sets of instructions). For clarity, one or more modules and/or applications may not be shown in FIG. 25.

An operating system (e.g., Darwin™, RTXC, UNIX™, Linux™, Apple Mac OS™, Microsoft Windows™, or an embedded operating system such as VxWorks™) includes various software components and/or drivers for controlling and managing general system tasks (e.g., memory management, storage device control, power management, etc.) and facilitates communication between various hardware and software components.

A communications module may facilitate communication with other devices over one or more external ports 2544 and may also include various software components for handling data transmission via the network communications interface 2522. The external port 2544 (e.g., USB, Firewire™, etc.) may be adapted for coupling directly to other devices or indirectly over a network (e.g., the Internet, wireless LAN, etc.).

A graphics module may include various software components for processing, rendering and displaying graphics data. As used herein, the term "graphics" may include any object that can be displayed to a user, including, without limitation, text, still images, videos, animations, icons (such as user-interface objects including soft keys), and the like. The graphics module in conjunction with a processor 2512 may process in real-time or near-real-time, graphics data captured by optical sensor(s) 2534 and/or proximity sensors 2530.

A computer vision module, which may be a component of a graphics module, provides analysis and recognition of graphics data. For example, while UAV 100 is in flight, the computer vision module along with a graphics module (if separate), processor 2512, and image capture devices(s) 2534 and/or proximity sensors 2530 may recognize and track the captured image of an object located on the ground. The computer vision module may further communicate with a localization/navigation module and flight control module to update a position and/or orientation of the UAV 100 and to provide course corrections to fly along a planned trajectory through a physical environment.

A localization/navigation module may determine the location and/or orientation of UAV 100 and provide this information for use in various modules and applications (e.g., to a flight control module in order to generate commands for use by the flight controller 2508).

Image capture devices(s) 2534, in conjunction with an image capture device controller 2532 and a graphics module, may be used to capture images (including still images and video) and store them into memory 2516.

Each of the above identified modules and applications correspond to a set of instructions for performing one or more functions described above. These modules (i.e., sets of instructions) need not be implemented as separate software programs, procedures or modules, and, thus, various subsets of these modules may be combined or otherwise re-arranged in various embodiments. In some embodiments, memory 2516 may store a subset of the modules and data structures identified above. Furthermore, memory 2516 may store additional modules and data structures not described above.

Example Computer Processing System

Figure 26:
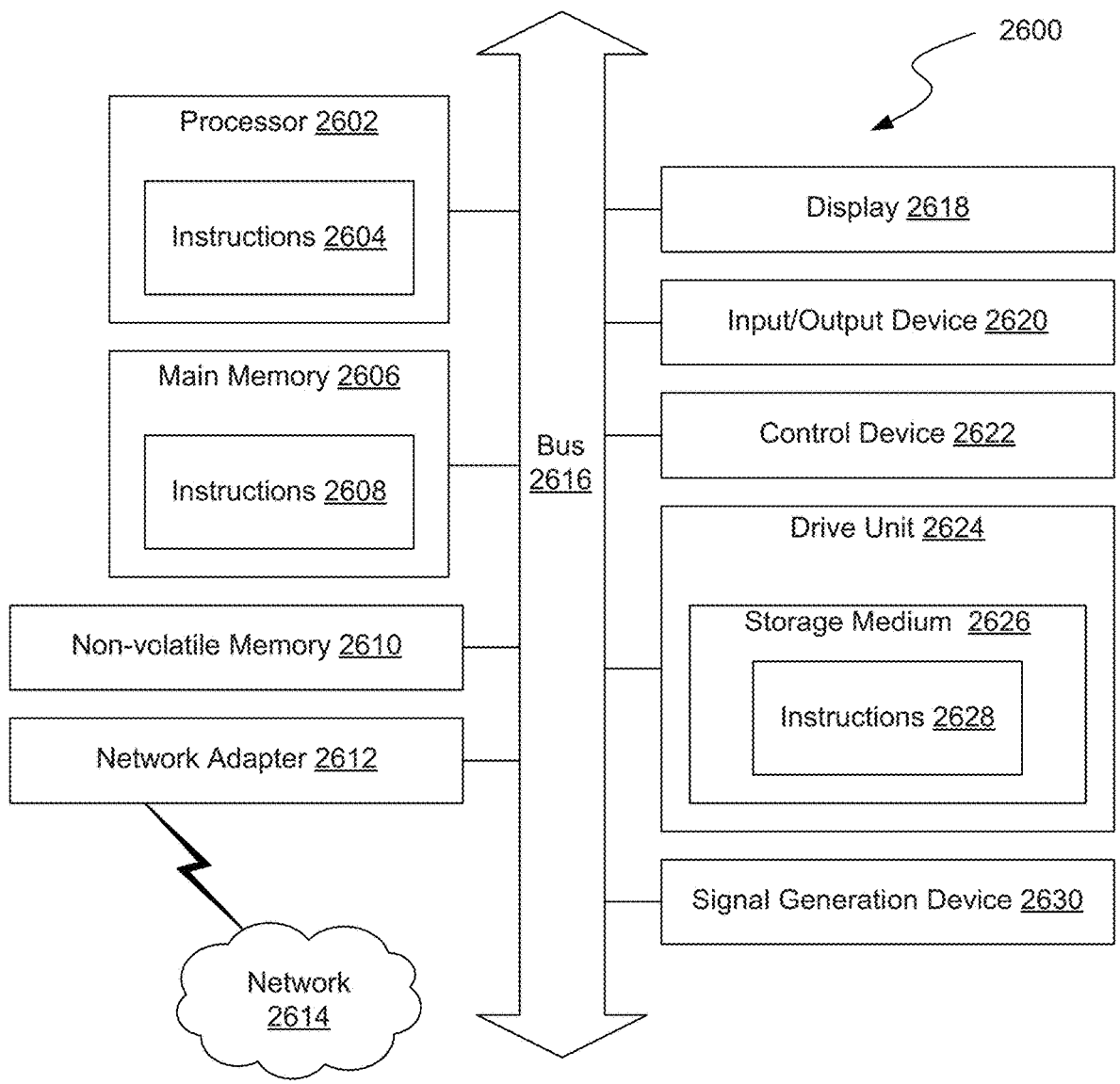
FIG. 26 shows a block diagram of an example of a processing system in which at least some operations described in this disclosure can be implemented.

FIG. 26 is a block diagram illustrating an example of a processing system 2600 in which at least some operations described in this disclosure can be implemented. The example processing system 2600 may be part of any of the aforementioned devices including, but not limited to, UAV 100 and mobile device 104. The processing system 2600 may include one or more central processing units ("processors") 2602, main memory 2606, non-volatile memory 2610, network adapter 2612 (e.g., network interfaces), display 2618, input/output devices 2620, control device 2622 (e.g., keyboard and pointing devices), drive unit 2624 including a storage medium 2626, and signal generation device 2630 that are communicatively connected to a bus 2616. The bus 2616 is illustrated as an abstraction that represents any one or more separate physical buses, point to point connections, or both connected by appropriate bridges, adapters, or controllers. The bus 2616, therefore, can include, for example, a system bus, a Peripheral Component Interconnect (PCI) bus or PCI-Express bus, a HyperTransport or industry standard architecture (ISA) bus, a small computer system interface (SCSI) bus, USB, IIC (I2C) bus, or an Institute of Electrical and Electronics Engineers (IEEE) standard 1394 bus (also called "Firewire"). A bus may also be responsible for relaying data packets (e.g., via full or half duplex wires) between components of the network appliance, such as the switching fabric, network port(s), tool port(s), etc.

While the main memory 2606, non-volatile memory 2610, and storage medium 2626 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 2628. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 2604, 2608, 2628) set at various times in various memory and storage devices in a computer, and that, when read and executed by one or more processing units or processors 2602, cause the processing system 2600 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 2610, floppy and other removable disks, hard disk drives, optical disks (e.g., Compact Disc Read-Only Memory (CD ROMS), Digital Versatile Discs (DVDs)), and transmission type media such as digital and analog communication links.

The network adapter 2612 enables the processing system 2600 to mediate data in a network 2614 with an entity that is external to the processing system 2600, such as a network appliance, through any known and/or convenient communications protocol supported by the processing system 2600 and the external entity. The network adapter 2612 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 2612 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand.

As indicated above, the techniques introduced here may be implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above, or to the extent that any such embodiments might be mutually exclusive in function and/or structure.

What is claimed is:

1. A method comprising:
   receiving, by a computer system, perception inputs generated by a sensor device on board the autonomous aerial vehicle in flight through a physical environment;
   processing, by the computer system, the perception inputs to detect a physical object that is in the physical environment;
   estimating, by the computer system, a position of the detected physical object in the physical environment;
   estimating, by the computer system, a position of the autonomous aerial vehicle within the physical environment;

updating, by the computer system, a shared virtual environment that is representative of the physical environment to include a virtual representation of the physical object at a virtual location in the shared virtual environment that corresponds with the estimated position of the physical object in the physical environment and a virtual representation of the autonomous aerial vehicle at a virtual location in the shared virtual environment that corresponds with the estimated position of the autonomous aerial vehicle within the physical environment;

enabling, by the computer system, access to the shared virtual environment to a plurality of network-connected user devices; and causing visual display of a view of the shared virtual environment including the virtual representation of the physical object and the virtual representation of the autonomous aerial vehicle at a particular network-connected user device of the plurality of network-connected user devices.

2. The method of claim 1, wherein shared virtual environment includes a computer-generated three-dimensional (3D) model of the physical environment.

3. The method of claim 1, wherein enabling access to the shared virtual environment includes:

hosting the shared virtual environment at a server computer system that is accessible, via a computer network, to the plurality of network-connected user devices.

4. The method of claim 1, wherein enabling access to the shared virtual environment includes:

causing display of a first view of the shared virtual environment at a first network-connected user device of the plurality of network-connected user devices;

causing display of a second view of the shared virtual environment at a network-connected second user device of the plurality of network-connected user devices;

wherein the first network-connected user device is different than the second network-connected user device; and wherein the first view is from a different perspective than the second view.

5. The method of claim 1, wherein the view of the shared virtual environment depicts the virtual representation of the physical object at the virtual location in the virtual environment.

6. The method of claim 5, wherein the view is from a perspective of a virtual camera that corresponds with a perspective of the autonomous aerial vehicle in flight in the physical environment.

7. The method of claim 1, further comprising:

receiving, by the computer system, perception inputs generated by a second sensor device located in the physical environment;

combining, by the computer system, the perception inputs generated by the sensor device associated with the autonomous aerial vehicle with the perception inputs generated by the second sensor device to produce combined perception inputs; and processing, by the computer system, the combined perception inputs to detect and track the physical object.

8. The method of claim 7, wherein the sensor device associated with an autonomous aerial vehicle is of a first sensor type and the second sensor device is of a second sensor type, and wherein the first sensor type is different than the second sensor type.

9. The method of claim 7, wherein the second sensor device is associated with a second autonomous aerial vehicle.

10. The method of claim 7, wherein the second sensor device is associated with a mobile device.

11. The method of claim 1, further comprising:

tracking, by the computer system, changes in the position of the physical object in the physical environment over time; and continually updating, by the computer system, the virtual location of the virtual representation of the physical object in the shared virtual environment in real-time based on the tracked changes in position of the physical object in the physical environment.

12. The method of claim 1, further comprising:

receiving, by the computer system, from a first network-connected user device of the plurality of network-connected user devices, a request to place a virtual object in the shared virtual environment; and updating, by the computer system, the shared virtual environment to include the virtual object at a specified virtual location in the shared virtual environment based on the request, wherein the specified virtual location corresponds with a particular physical location in the physical environment.

13. The method of claim 12, wherein the virtual object is viewable as a graphical augmentation via an augmented reality (AR) device when the AR device is in proximity to the particular location in the physical environment.

14. The method of claim 12, wherein the virtual object is useable by the autonomous aerial vehicle as a waypoint for autonomous navigation through the physical environment.

15. The method of claim 12, wherein the request includes permissions that restrict access to the virtual object in the shared virtual environment to a particular subset of the plurality of network-connected devices.

16. The method of claim 1, wherein the shared virtual environment comprises a continually updated 3D occupancy map, and wherein the autonomous aerial vehicle uses the continually updated 3D occupancy map to autonomously maneuver through the physical environment.

17. The method of claim 1, wherein at least one of the plurality of network-connected user devices is a mobile device.

18. The method of claim 1, wherein at least one of the plurality of network-connected user devices is an augmented reality (AR) display device.

19. An aerial vehicle comprising:

a sensor device; and a computer system communicatively coupled to the sensor device, the computer system configured to:

receive perception inputs generated by the sensor device while the aerial vehicle is in flight through a physical environment;

process the perception inputs to detect a physical object that is in the physical environment;

estimate a position of the detected physical object in the physical environment;

estimate a position of the aerial vehicle in the physical environment;

update a shared virtual environment that is representative of the physical environment to include a virtual representation of the physical object and the aerial vehicle at respective virtual locations in the shared virtual environment that corresponds to the estimated position of the physical object in the physical environment;

wherein the shared virtual environment is accessible to a plurality of network-connected devices; and causing display of a view of the shared virtual environment at a particular network-connected user device of the plurality of network-connected user devices.

20. The aerial vehicle of claim 19, wherein the computer system is further configured to:

track changes in the position of the physical object in the physical environment over time; and continually update the virtual location of the virtual representation of the physical object in the shared virtual environment in real-time based on the tracked changes in position of the physical object in the physical environment.

21. The aerial vehicle of claim 19, wherein the shared virtual environment is continually updated based on perception inputs from two or more of the plurality of network-connected devices.

22. The aerial vehicle of claim 19, wherein the plurality of network-connected devices includes any one or more of the aerial vehicle, a second aerial vehicle, and a mobile user device.

23. The aerial vehicle of claim 22, wherein the shared virtual environment includes a virtual navigation object at a virtual location that corresponds to a physical location in the physical environment and wherein the planned trajectory is generated based on the virtual navigation object.

24. The aerial vehicle of claim 23, wherein the behavioral objective sets parameters for guiding the behavior of the autonomous aerial vehicle when the autonomous aerial vehicle is within proximity to the physical location in the physical environment that corresponds to the virtual location of the virtual navigation object in the shared virtual environment.

25. The aerial vehicle of claim 19, wherein the shared virtual environment comprises a continually updated 3D occupancy map that includes a plurality of voxels, each of the plurality of voxels corresponding to a portion of the physical environment that is at least partially occupied by physical objects, and wherein the computer system is further configured to:

cause the aerial vehicle to autonomously maneuver through the physical environment without colliding with physical objects by generating a planned trajectory that does not intersect the plurality of voxels of the 3D occupancy map.

26. The aerial vehicle of claim 25, wherein the virtual navigation object is associated with a behavioral objective, wherein the planned trajectory is generated based on the behavioral objective associated with the virtual navigation object.

27. An apparatus comprising:

one or more memory units storing instructions that, when executed by one or more processors, cause the one or more processors to:

process perception inputs received from a sensor device associated with an autonomous aerial vehicle in flight through a physical environment to detect a physical object within the physical environment;

estimate a position of the detected physical object in the physical environment;

identify a virtual representation of the physical object at a virtual location within a shared virtual environment corresponding with the estimated position of the physical object within the physical environment;

update a shared virtual environment representative of the physical environment to include the virtual representation of the physical object;

enable access to the shared virtual environment to a network-connected user device;

cause display of a view of the shared virtual environment at a particular network-connected user device of the plurality of network-connected user devices.

28. The apparatus of claim 27, wherein the shared virtual environment includes a computer-generated three-dimensional (3D) model of the physical environment.

29. The apparatus of claim 27, wherein to enable access to the shared virtual environment, the instructions, when executed by the one or more processors, cause the one or more processors to:

host the shared virtual environment at a server computer system that is accessible, via a computer network, to the network-connected user devices.

30. The apparatus of claim 27, wherein to enable access to the shared virtual environment, the instructions, when executed by the one or more processors, cause the one or more processors to:

enable access to the shared virtual environment to an additional network-connected user device;

cause display of a second view of the shared virtual environment at the additional network-connected user device;

wherein the network-connected user device is different than the additional network-connected user device; and wherein the first view is displayed from a different perspective than the second view.

31. The apparatus of claim 27, wherein to enable access to the shared virtual environment, the instructions, when executed by the one or more processors, cause the one or more processors to:

cause display of a view of the shared virtual environment at the network-connected user device;

wherein the view of the shared virtual environment depicts the virtual representation of the physical object at the virtual location in the virtual environment; and wherein the view is from a perspective of a virtual camera that corresponds with a perspective of the autonomous aerial vehicle in flight in the physical environment.

32. The apparatus of claim 27, wherein the instructions, when executed by the one or more processors, cause the one or more processors to:

process perception inputs received from a second sensor device located in the physical environment;

combine the perception inputs received by the sensor device with the perception inputs received by the second sensor device to produce combined perception inputs; and process the combined perception inputs to detect and track the physical object.

33. The apparatus of claim 32, wherein the sensor device is of a first sensor type and the second sensor device is of a second sensor type, and wherein the first sensor type is different than the second sensor type.

34. The apparatus of claim 32, wherein the second sensor device is associated with one or more of a second autonomous aerial vehicle or a mobile device.

35. The apparatus of claim 27, wherein the instructions, when executed by the one or more processors, cause the one or more processors to:

track changes in the position of the physical object in the physical environment over time; and continually update the virtual location of the virtual representation of the physical object in the shared virtual environment in real-time based on the tracked changes in position of the physical object in the physical environment.

36. The apparatus of claim 27, wherein the instructions, when executed by the one or more processors, cause the one or more processors to:
- receive from a first network-connected user device of the plurality of network-connected user devices, a request to place a virtual object in the shared virtual environment; and
- update the shared virtual environment to include the virtual object at a specified virtual location in the shared virtual environment based on the request, wherein the specified virtual location corresponds with a particular physical location in the physical environment.

37. The apparatus of claim 36, wherein the virtual object is viewable as a graphical augmentation via an augmented reality (AR) device when the AR device is in proximity to the particular location in the physical environment.

38. The apparatus of claim 36, wherein the virtual object is useable by the autonomous aerial vehicle as a waypoint for autonomous navigation through the physical environment.

39. The apparatus of claim 27, wherein the shared virtual environment comprises a continually updated 3D occupancy map, and wherein the autonomous aerial vehicle uses the continually updated 3D occupancy map to autonomously maneuver through the physical environment.

* * * * *